(12) United States Patent
Blodgett et al.

(10) Patent No.: US 10,378,504 B2
(45) Date of Patent: Aug. 13, 2019

(54) SYSTEMS AND METHODS FOR TIDAL ENERGY CONVERSION AND ELECTRICAL POWER GENERATION

(71) Applicant: BIG MOON POWER, INC., Salt Lake City, UT (US)

(72) Inventors: Lynn Blodgett, Salt Lake City, UT (US); Colin Bagley, Salt Lake City, UT (US)

(73) Assignee: Big Moon Power, Inc., Salt Lake City, UT (US)

( * ) Notice: Subject to any disclaimer, the term of this patent is extended or adjusted under 35 U.S.C. 154(b) by 0 days.

(21) Appl. No.: 15/143,440

(22) Filed: Apr. 29, 2016

(65) Prior Publication Data
US 2016/0319798 A1    Nov. 3, 2016

Related U.S. Application Data

(60) Provisional application No. 62/155,538, filed on May 1, 2015, provisional application No. 62/261,565, filed
(Continued)

(51) Int. Cl.
*H02K 7/18* (2006.01)
*B63B 21/50* (2006.01)
(Continued)

(52) U.S. Cl.
CPC ............ *F03B 13/262* (2013.01); *B63B 35/44* (2013.01); *H02K 7/1853* (2013.01); *B63B 21/50* (2013.01);
(Continued)

(58) Field of Classification Search
CPC ......... Y02E 10/38; Y02E 10/28; F03B 13/20; F03B 13/262; H02K 7/1853; B63B 35/44;
(Continued)

(56) References Cited

U.S. PATENT DOCUMENTS

| 1,722,516 A | 7/1929 | Cook |
| 1,808,599 A | 6/1931 | Galeazzi |

(Continued)

FOREIGN PATENT DOCUMENTS

| DE | 29 05 157 | 8/1980 |
| DE | 10 2012 106009 | 1/2014 |

(Continued)

OTHER PUBLICATIONS

International Search Report and Written Opinion from corresponding PCT Application No. PCT/US2016/030294 dated Nov. 3, 2016, 23 pages.

(Continued)

*Primary Examiner* — Charles Reid, Jr.
(74) *Attorney, Agent, or Firm* — Cadwalader, Wickersham & Taft LLP

(57) ABSTRACT

Assemblies systems, and methods are disclosed for generating energy from natural forces and, more particularly, to energy generation using tidal action. A tidal energy conversion assembly includes a displacement vessel housing a directional converter that is coupled to an electrical power generator. The tidal energy conversion assembly further includes an anchor cable having a first end, a second end connected to the directional converter, and a length in between the first end and the second end. The anchor cable may be threaded through an anchor at a stationary location, such as a sea floor. The rising, falling, and/or drag forces of the tide cause a change in the length of the anchor cable thus exerting a force on the directional converter. The directional converter converts this force into rotational energy that may be harnessed by the electrical power generator to generate electricity for consumption.

24 Claims, 46 Drawing Sheets

Related U.S. Application Data on Dec. 1, 2015, provisional application No. 62/272,759, filed on Dec. 30, 2015, provisional application No. 62/322,501, filed on Apr. 14, 2016.

(51) Int. Cl.
*B63B 35/44* (2006.01)
*F03B 13/26* (2006.01)

(52) U.S. Cl.
CPC ... *B63B 2035/4466* (2013.01); *F05B 2240/93* (2013.01); *Y02E 10/28* (2013.01); *Y02E 10/38* (2013.01)

(58) Field of Classification Search
CPC ............. B63B 21/50; B63B 2035/4466; F05B 2240/93
USPC ..................................................... 290/53, 43
See application file for complete search history.

(56) References Cited

U.S. PATENT DOCUMENTS

| | | | |
|---|---|---|---|
| 3,126,557 | A | 3/1964 | Stevens |
| 4,288,985 | A | 9/1981 | Dyck |
| 5,215,406 | A | 6/1993 | Hudson |
| 5,426,332 | A | 6/1995 | Ullman et al. |
| 5,872,406 | A | 2/1999 | Ullman et al. |
| 7,492,054 | B2 * | 2/2009 | Catlin ................... F03B 13/264 290/43 |
| 7,513,711 | B1 | 4/2009 | Walter |
| 8,102,071 | B2 * | 1/2012 | Catlin ................... F03B 13/264 290/54 |
| 8,246,293 | B2 * | 8/2012 | Landberg ................ F03B 17/00 290/42 |
| 8,823,196 | B1 | 9/2014 | Gehring |
| 8,851,837 | B2 | 10/2014 | Whitelaw |
| 2008/0084067 | A1 | 4/2008 | Hill |
| 2010/0032951 | A1 | 2/2010 | Collee et al. |
| 2010/0132353 | A1 | 6/2010 | Kelly |
| 2010/0140944 | A1 | 6/2010 | Gardiner et al. |
| 2010/0176595 | A1 | 7/2010 | Bear et al. |
| 2011/0068579 | A1 | 3/2011 | Dullaway |
| 2011/0101697 | A1 | 5/2011 | Power, III et al. |
| 2011/0221199 | A1 | 9/2011 | Boyce |
| 2013/0009402 | A1 | 1/2013 | Williams et al. |
| 2013/0134714 | A1 | 5/2013 | Daqian |
| 2013/0200626 | A1 | 8/2013 | Sidenmark et al. |
| 2013/0269333 | A1 | 10/2013 | Williams et al. |
| 2013/0300122 | A1 | 11/2013 | Grubel |
| 2014/0117671 | A1 | 5/2014 | Gregory |
| 2015/0183516 | A1 * | 7/2015 | Vander Lind ......... B64C 39/022 244/155 R |
| 2016/0013703 | A1 * | 1/2016 | Marzelius ................ F03D 5/00 290/43 |

FOREIGN PATENT DOCUMENTS

| | | |
|---|---|---|
| GB | 2 479 348 | 10/2011 |
| JP | 2007-512469 | 5/2007 |
| KR | 10-2014-0141157 | 12/2014 |
| WO | WO 2010/067341 | 6/2010 |
| WO | WO 2011/024209 | 3/2011 |
| WO | WO 2011/116100 | 9/2011 |
| WO | WO 2012/054152 | 4/2012 |
| WO | WO 2014/120058 | 8/2014 |
| WO | WO 2014120058 A1 * | 8/2014 ............... F03D 5/00 |

OTHER PUBLICATIONS

Partial International Search Report from corresponding PCT Appl. No. PCT/US2016/030294 dated Jul. 22, 2016, 4 pages.

* cited by examiner

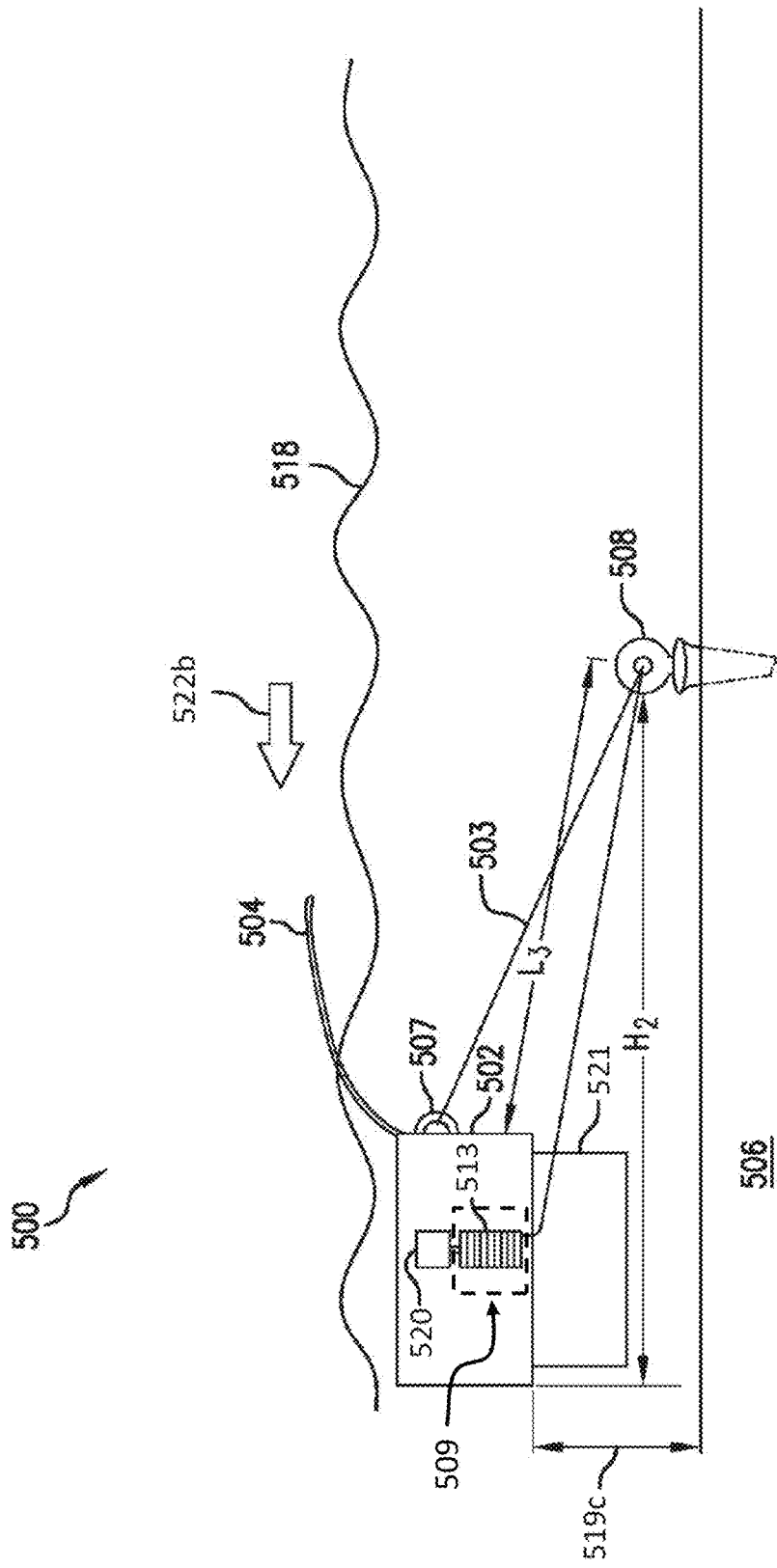

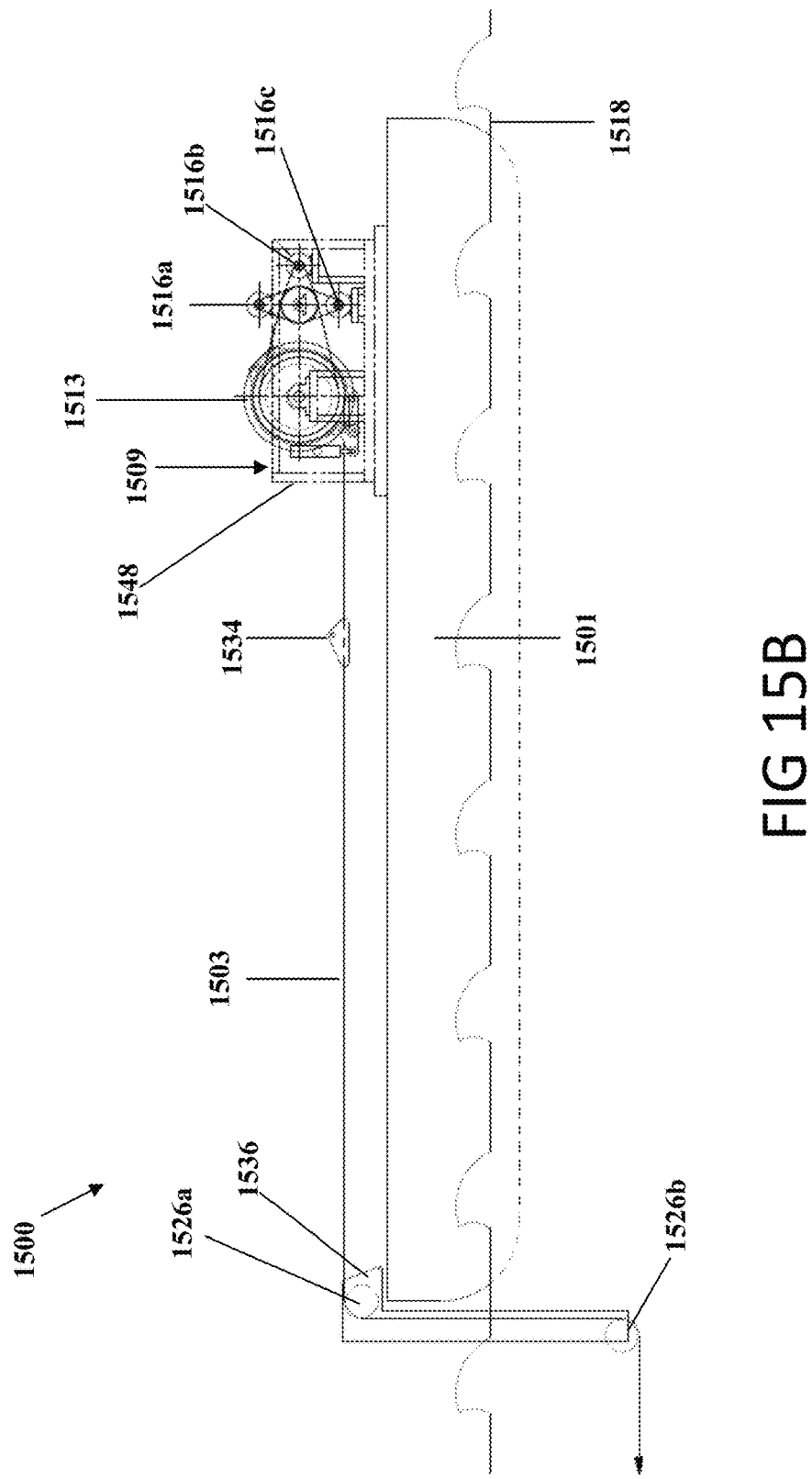

SYSTEMS AND METHODS FOR TIDAL ENERGY CONVERSION AND ELECTRICAL POWER GENERATION

CROSS REFERENCE TO RELATED APPLICATIONS

This application claims the benefit of priority under 35 U.S.C. 119(e) to U.S. Provisional Patent Application No. 62/322,501, filed on Apr. 4, 2016, U.S. Provisional Patent Application No. 62/272,759, filed on Dec. 30, 2015, U.S. Provisional Patent Application No. 62/261,565, filed on Dec. 1, 2015, and U.S. Provisional Patent Application No. 62/155,538, filed on May 1, 2015, each of which is hereby incorporated by reference in its respective entirety.

FIELD OF THE INVENTION

The present invention relates to a system and method for generating electrical power from renewable energy sources such as naturally occurring forces and, more particularly, to electrical energy generation from tidal actions. In particular, the present disclosure illustrates a system and method for converting potential and kinetic energy from ocean tidal movements—from either or both of the vertical rise and fall and/or the lateral ebb and flow of water caused by the constant and repeating pattern of tidal changes—into electrical energy or power that can be stored and/or consumed. In addition, the disclosure describes a novel method for manufacturing a displacement vessel that can be utilized in the tidal energy conversion system according to the invention.

BACKGROUND

Notwithstanding the significant drop in crude oil prices during 2014-15, the long term trend in fossil fuel prices is likely to increase due to diminishing global oil and gas reserves, alternative (preferably renewable) energy generation systems have become an increasingly significant topic of interest for countries around the world, particularly as fossil fuel production threatens to continue unabated. As a result, significant time, resources, and funding have been invested to research and develop alternative electrical energy generation systems utilizing such renewable sources as solar power, water flow, wind power and the like to supply ever-increasing amounts of energy. One relatively untapped renewable energy source receiving increased attention is the potential energy that might be harnessed from ocean movement, such as the potentially endless energy source inherent in the constant tidal, wave, and/or current flows of the ocean.

The potential for generating electrical energy from the action of ocean phenomena generally comes in three sources: ocean thermal power, wave power, and tidal power. Ocean thermal power generation takes advantage of the difference in temperature between cooler deep water and warmer surface water that becomes heated by the sun; that thermal differential is then used to operate a heat engine for generating electricity. Ocean thermal power generation, however, is expensive, has very low thermal efficiencies, and may require equipment that can be an eye sore if located near populated areas. Furthermore, ocean thermal power generation requires large temperature gradients or differentials to function adequately. In many areas of the ocean, the actual thermal differential is not large enough to generate significant amounts of electrical energy to meet demand.

Wave power generation takes advantage of the waves generated on the ocean surface when wind interacts at the free surface of the water. Wave power generation is, however, highly dependent on wavelength and thus only suitable to specific locations of the ocean where large wavelengths are present. Wave power is also unreliable because wave quality is irregular and difficult to forecast, leading to unreliable energy generation. Similar to ocean thermal power, wave power may cause noise or visual pollution if wave energy generators are located near a populated area.

Tidal power generation techniques are expected to take advantage of the differences in the surface level of an ocean or similar body of tidal water due to the gravitational effects of the moon. The vertical difference in the surface level during tidal changes represents potential energy that holds promise for electrical power generation, and is particularly desirable because it follows a relatively regular pattern. Technology using tidal action as a source for energy generation is still in its relative infancy. One known tidal energy generation system utilizes large turbines placed in tidal streams in order to take advantage of the flow of water during tidal changes. A tidal stream is a relatively fast-flowing body of water that is created by the rising and falling of the tide; the turbines are positioned to capture the horizontal flow of water and thereby generate electricity. The fast-flowing water is thus directed through the turbine, which rotates a shaft attached to a magnetic rotor that converts the mechanical energy into electrical energy. These turbines are relatively expensive and may also require significant maintenance over their lifetime, thus increasing operating costs.

Another known method of harnessing tidal energy involves the use of a barrage. A barrage is a large dam where water spills over the dam as the tide rises. The overflowing water may be passed through a turbine, which rotates a shaft attached to a magnetic rotor that converts the mechanical energy into electrical energy. This process of using a barrage suffers from similar downsides as the tidal stream process and is limited to areas where a dam may be constructed such as tidal rivers, bays, and estuaries.

Other known tidal energy systems require the construction and placement of machinery such as hydraulics and moveable tanks that extend far above the surface of the water, such as described in U.S. Pat. Nos. 5,426,332, 5,872, 406, and U.S. Patent Application Publication No. 2013/0134714. As another example, a known tidal energy system may require the construction of a large reservoir on land that must be filled so that a large duct system may capture the flow of water, as described in U.S. Pat. No. 4,288,985. Such tidal energy systems require large structures that are built either above the water or on shore, requiring significant costs in engineering and land.

A need therefore exists for an efficient and cost-effective energy conversion/electrical power generation system that can harness the potential and kinetic energy of tidal action as the water level rises and falls and/or as the water ebbs and flows due to changing tidal action and produce electrical power for subsequent consumption.

SUMMARY OF THE INVENTION

Disclosed herein is a novel tidal energy conversion assembly and method for generating electricity. In one aspect, a tidal energy conversion assembly of the invention captures energy from the rising and/or falling of the tide. In particular, the tidal energy generation assembly may utilize a buoyant displacement vessel anchored to a stationary location (e.g., bay or ocean floor, on land, or a crane). The displacement vessel may house or may be attached to a directional converter operatively coupled to a generator for producing electrical power as a result of translating the energy released by the vertical rise/fall of the tide and/or by the change in distance from the stationary location into rotational energy applied to the generator for producing electrical power. The displacement vessel may be any structure that maintains buoyancy in water, and thus rises or falls generally vertically with the tides, and/or drifts laterally due to drag forces caused by the ebb and flow of water during tidal action or other currents. The displacement vessel may be anchored or tethered to the bay or ocean floor or land by at least one anchor cable which is operatively coupled to the directional converter for translating the vertical movement of the displacement vessel to rotational movement which can be used to operate a generator and produce electric power.

The directional converter may be housed on the displacement vessel or located away from the displacement vessel. As an example of the operative coupling, the directional converter may include a rotatable drum fixed on an axle, with at least a portion of the anchor cable wrapped around the drum. Thus, as the displacement vessel rises with an incoming tide, the anchor cable begins to unwind, causing the drum to rotate such that the directional converter converts the vertical movement of the displacement vessel into mechanical energy (e.g., rotational kinetic energy) which in turn powers the generator to produce electrical energy. In the reverse direction, as the displacement vessel falls with the falling tide, an optional stationary frame may be positioned above the displacement vessel and coupled with a cable or other attachment to the directional converter to capture the change in potential energy in the opposite direction due to the falling of the displacement vessel. The stationary frame is generally immobile with respect to the water movements, and, as the displacement vessel falls with the tide, the displacement vessel pulls upon the cable attached to the frame, and the cable causes the direction converter to turn and capture energy.

The directional converter may utilize a gearing mechanism having at least one sprocket on an axle or a spindle, and a gear box. The gear box converts an input rotations per minute (RPM) into an output RPM that is different than (preferably greater than) the input RPM to increase the rotational energy transmitted to the generator. This may be accomplished by using a series of gears of differing radii coupled to one another or via a chain, for example. The gearing mechanism or alternatively, the gear box, may include a gear multiplication arrangement in order to increase the output RPM of the directional converter and applied to the generator. Because the change in height between the bay/ocean floor and the water surface due to the tide occurs at a relatively slow rate (e.g., even only about 1.8 in/min in the Bay of Fundy which has the largest tidal change in the world), rotation of the drum, and thus the gearing mechanism, due to this change in height may also be relatively slow. The electric generator, however, may require a faster rotational input than can be provided by a relatively simple gearing mechanism that does not include a gear multiplication arrangement. Thus, a slower RPM of the drum may be converted into a faster RPM by a gear multiplication arrangement to cause greater RPM transferred to the generator. The gear multiplication arrangement may include a series of gears of differing radii that are coupled to one another by a chain, for example, such that an input gear has a larger radius with a slower RPM while an output gear has a smaller radius and a faster RPM.

The generator may include a fixed magnet (or permanent magnet) generator. A fixed magnet generator includes a permanent magnet fixed to a shaft and housed within a stationary armature. The armature includes one or more metal wires/coils within the magnetic field of the permanent magnet such that, upon rotation of the permanent magnet, an electric current is induced in the wires. A fixed magnet generator may be suitable for generating electricity using a lower rotational speed, such as a rotational speed of under 1000 RPM, for example. In an alternative embodiment, a rack and pinion mechanism can be used to capture energy from the rising and falling of the tide.

A tidal energy conversion system may include a plurality of the foregoing assemblies of displacement vessels and directional converters in order to increase the potential for power generation, using one or a plurality of generators.

In another aspect of the invention, the invention comprises a method of generating electricity from tidal actions. The method according to the invention involves converting vertical motion caused by rising and falling tidal action into rotational energy and transferring the resulting rotational energy to operate an electrical power generator for producing electricity. As the tide rises and/or falls, a vertical distance between the surface of the water and the stationary location will change. This vertical change in distance may be converted into rotational energy that is used to energize the electrical power generator to generate electricity. In a particular embodiment, a method of the invention comprises the steps of: allowing the tidal action to change a vertical distance between a body at the water surface and a stationary location below the body, wherein the change in vertical distance is defined from a first distance above the stationary location to a second distance above the stationary location; converting the change in vertical distance of the body into mechanical energy; transmitting the mechanical energy to an electrical power generator; and generating electricity with the generator using the mechanical energy. The mechanical energy may be rotational kinetic energy.

The stationary location may be a bay/ocean floor. The body may be a displacement vessel housing a directional converter coupled to a generator and the displacement vessel may be disposed at the first distance from the stationary location. The method may further include providing an anchor cable having a first end and a second end, whereby the second end is attached to the directional converter and the anchor cable extends to an anchor secured at the stationary location. The anchor cable has a first length between the directional converter and the anchor. The second distance may be greater than the first distance, and the change in vertical distance may activate the directional converter. The method may further include storing at least a portion of the mechanical energy as potential energy with a storage mechanism; allowing the tidal action to change the vertical distance between the displacement vessel and the stationary location to a third distance, wherein the third distance is less than the second distance; releasing the stored mechanical energy from the storage mechanism; transmitting the stored mechanical energy to the generator; and generating electricity with the stored mechanical energy. The storage mechanism may be a spring.

In another aspect of the invention, the tidal energy conversion assembly may generate energy utilizing drift/drag forces from the ebb and flow of the tide and/or currents. In this arrangement, the tidal energy conversion assembly may include a displacement vessel and directional converter that is substantially similar to the displacement vessels described above. The displacement vessel may generally be anchored to the stationary location by at least one anchor cable that is operatively coupled to a rotatable drum on the directional converter which is in turn operatively coupled to the generator essentially as described above. In this instance, as the ebb and flow of the tide causes the displacement vessel to drift in a lateral direction relative to the stationary location, the anchor cable causes the drum to rotate as the anchor cable unwinds and the resulting mechanical energy (e.g., rotational kinetic energy) of the directional converter is transmitted to the generator for producing electrical energy. As described above, the assembly may include a gear multiplication arrangement, if desired, to increase the speed (or RPM) of the output applied to the generator.

Thus, as the ebb and flow of the tide, or other currents of the ocean, causes the displacement vessel to drift in a generally lateral direction relative to the stationary location, there may be greater potential for electrical power generation because the lateral drift may provide a significantly greater length of travel for the anchor cable and thereby more rotational energy transferrable to the generator. In addition, with suitable placement of anchored cables on generally opposite sides of the assembly, electrical power generation may be produced as the assembly moves in both directions (incoming and outgoing tides)—i.e., the cables can be mounted on different drums on the directional converter such that as one cable unwinds and operates the generator, the other cable is being re-wound for the next tidal cycle. Of course, it will be understood in view of the foregoing that the vertical and lateral concepts described herein can be combined to potentially maximize the amount of electrical power generation.

In an embodiment of the invention, a system configured to capture drag forces is described, wherein the displacement vessel includes a drag panel extending from an external surface of the displacement vessel. The drag panel may increase the surface area upon which drag forces act due to the ebb and flow caused by tidal action (or drag forces caused by other ocean currents), allowing the displacement vessel to be more effectively moved by the drag forces caused by the ebb and flow of the water. The drag panel may have a height that is between 1 ft and 100 ft. In some embodiments, the height of the drag panel may be 5 ft, although one of skill will recognize that the drag panel may have any suitable height to capture additional drag forces. The thickness of the drag panel may be between 0.1 inch and 24 inches; however, one skilled in the art will recognize that any suitable thickness may be used. In an example, the drag panel may be fabricated from an extruded metal sheet panel or other durable structure.

In an aspect of the invention, a displacement vessel may be coupled by one or more anchor cables to one or more directional converters positioned at a stationary location, such as land, for example. Each of the directional converters may include a drum around which the anchor cables are wound, a gear box operatively coupled to the drum, and a generator operatively coupled to the gear box. Thus, the displacement vessel may be attached to an array of generators. The generators may have similar electrical output ratings or may have different electrical output ratings. If different electrical output ratings are used, each of the generators may be controllably engaged or disengaged based on, for example, the speed of the current.

In another embodiment, the tidal energy generation assembly may include a displacement vessel that is rotatably coupled by an anchor cable to a directional converter positioned at a stationary location, such as land, for example. Because the speed and direction of water varies during a tidal cycle, the displacement vessel may require rotation to orient itself with respect to the flow of water. This rotation may be achieved using a series of control cables attached to the displacement vessel—forming a "bridle"—such that the displacement vessel may capture both directions of water flow. The control cables allow the displacement vessel to rotate about a vertical axis and thus capture drag forces from the flow of water in multiple directions. Additionally, the displacement vessel may rotate such that it operates at an angle to the direction of water flow to adjust the amount of drag force exerted on the displacement vessel, and thus adjust the amount of electricity generated at the generator. The displacement vessel includes a drag panel supported by one or more floatation devices configured to float at or near the surface of the water. The drag panel may include one or more non-flat sides configured to capture drag forces more effectively than a flat side. In an example, the sides of the drag panel may include a parabolic shape, a concave shape, or a lofted cut. In light of the foregoing, a skilled person will appreciate that other shapes may be appropriate to use.

The bridle—i.e., a series of control cables—may include any suitable number of control cables and each control cable may be connected to the displacement vessel at a connection point. Exemplary connection points along the displacement vessel may include the ends or sides of the displacement vessel. For potentially maximum adjustability to the angle of motion, a 4-point harness can be used so that the drag panel can be rotated about a vertical axis and one or more horizontal axis. In another embodiment, redundant cables (and control mechanisms) may be used to create an 8-point harness to improve reliability and/or adjustability of the system. The displacement vessel may further house a control mechanism, such as a motor, a winch, or a drum and spring affixed to an axle, for example, to wind up and/or release the control cables and effect rotation of the displacement vessel.

In another embodiment, the directional converter(s) and generator(s) may be located on a stationary location in the water. The stationary location may comprise, for example, a barge (such as a work barge or spud barge) floating or fixed in the water. In a particularly useful embodiment, one or more directional converters may be mounted on the barge. The directional converter(s) may comprise any of the directional converters described herein. One or more anchor cables may extend from the directional converter(s), through a pivot frame to direct the anchor cable into the water, and out to a displacement vessel in the water. The anchor cable may further comprise a tensiometer to record/transmit data to an operator regarding the forces exerted on the anchor cable from the displacement vessel during operation. The displacement vessel may comprise any of the displacement vessels described herein and may be configured to capture energy from the rise/fall of the water due to tidal action and/or drag forces from water flow due to tidal action or other currents. The barge may further comprise a hydraulic power mechanism to provide power to any components of the directional converter which may require hydraulic power, such as, for example, a reverse motor or winch.

In another aspect, a method according to the invention involves converting into energy the lateral motion caused by the ebb and flow of water due to tidal action. The ebb and flow of the water due to tidal action causes a body in the bay/ocean to drift laterally and change its position with respect to a fixed location at the stationary location. In accordance with the principles described above, this change in lateral distance may be converted into rotational energy that is used to energize the electrical power generator to generate electricity. This method to produce electricity from the lateral ebb and flow of water due to tidal action may include the steps of: allowing the tidal action to change a lateral distance between a body floating in the water and a stationary location below the body; converting the change in lateral distance of the body into mechanical energy; transmitting the mechanical energy to an electrical power generator; and generating electricity with the generator using the mechanical energy. The mechanical energy may be rotational kinetic energy. The stationary location may be a bay/ocean floor. The body may be a displacement vessel housing a directional converter coupled to a generator, and the displacement vessel may be disposed directly above the stationary location. The method may further include providing an anchor cable having a first end and a second end, whereby the second end is attached to said directional converter and the anchor cable extends to an anchor secured at said stationary location. The anchor cable may have a first length between said directional converter and said anchor.

In yet another embodiment, a tidal energy generation assembly may include a turbine mounted within a drag panel of a displacement vessel and a directional converter mounted on the displacement vessel. The displacement vessel may be connected to a stationary location, such as land or a spud barge, for example, by control cables coupled to an anchor cable. One or more rewind assemblies may be housed at the stationary location to control the winding of an anchor cable and alter (i.e., increase or decrease) the distance of the displacement vessel from the stationary location. The displacement vessel may also include a power cable extending from the displacement vessel to the stationary location to transmit electrical power to/from the displacement vessel. Each control cable may be coupled to a respective control mechanism that may be housed within or mounted on the displacement vessel. The control mechanisms may independently control the winding/unwinding of the respective control cables to effectuate steering of the displacement vessel in the water. The control mechanisms may wind/unwind their respective control cable to adjust the orientation of the displacement vessel with respect to the water/current flow, e.g., by adjusting the yaw, pitch, and/or roll of the displacement vessel. For example, the yaw of the displacement vessel may be adjusted using the control cables to rotate the displacement vessel in a clockwise direction in the water.

The control mechanisms may also be used to control the amount of electricity generated. For example, by rotating the displacement vessel to an angle away from the direction of water flow, less drag force may be exerted on the drag panel (and the turbine) thus reducing the amount of electricity generated by the electrical power generator.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout. It will be appreciated that certain reference characters herein have been changed from the priority provisional applications to provide better correspondence among analogous structures.

FIGS. 5A-5C show a tidal energy conversion assembly having a directional converter comprising a drag energy converter.

FIG. 15B shows a side view of a layout for a tidal energy generation system comprising a directional converter positioned on a barge.

DETAILED DESCRIPTION OF THE INVENTION

Figure 1A:
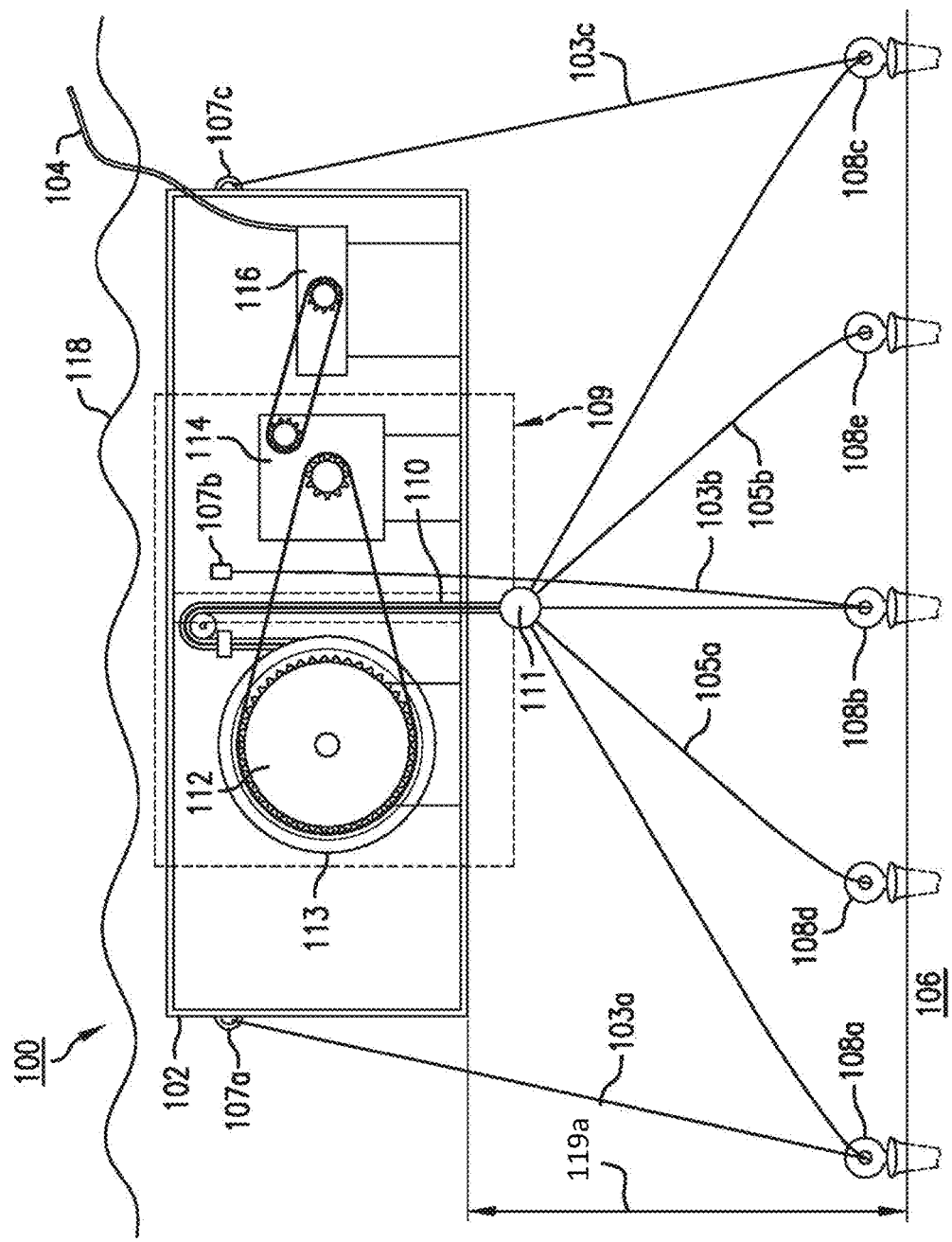
FIG. 1A shows a cross-section of a tidal energy conversion assembly in accordance with an implementation of the disclosure.

To provide an overall understanding of the systems, devices, assemblies, and methods described herein, certain illustrative embodiments will be described. For the purpose of clarity and illustration, these systems and methods will be described with respect to tidal energy conversion assemblies for generating electrical energy. It will be understood by one of ordinary skill in the art that the systems, devices and methods described herein may be adapted and modified as is appropriate, and that these systems, devices and methods may be employed in other suitable applications, such as for other types of energy conversion devices, and that other such additions and modifications will not depart from the scope of invention and claims hereof.

A tidal electrical energy generation assembly of the present invention utilizes the vertical rising/falling of tidal action, and/or the lateral drift due to drag forces caused by the ebb and flow of water during tidal action to generate energy. According to one basic concept of the invention, the tidal energy conversion assembly is secured or tethered by an anchor cable to a stationary location, which may be, for example, a bay/ocean floor (sometimes referred to generally as a seabed), on a crane, or on shore, or on a barge, platform, or pier secured to the sea floor, to float upwardly and downwardly with the rising and falling tides. In general, the tidal energy conversion assembly comprises at least one anchor cable connecting a displacement vessel to a stationary location, and the anchor cable may be secured at the stationary location. The movement of the assembly resulting from the tidal actions relative to the stationary location causes the anchor cable to exert a force upon the assembly, which force may be converted into mechanical energy through a conversion mechanism which then transmits the mechanical energy to a generator which produces electricity for storage and/or consumption. Except as set forth below in FIGS. 17-19, the tidal energy generation system does not include a turbine. In another aspect of the invention, the tidal energy generation assembly generates electrical energy primarily as a result of the lateral movement, or drift, of the assembly relative to a stationary location due to the ebb and flow of the water during tidal action. To increase the generation of electric power, the tidal energy conversion system of the invention may comprise a plurality of the tidal energy conversion assemblies as described herein.

The displacement vessel is a structure that is capable of floating at a distance above or away from a stationary location, e.g., a bay/ocean floor or a fixed barge or platform elevated from the bay/ocean floor (described in more detail below), or on shore, or on a crane, such that the displacement vessel changes its distance to the stationary location as the tide rises and falls or is capable of being dragged laterally by the ebb and flow of water during tidal action (or both). Exemplary, but non-limiting, dimensions for height, width, and length of a displacement vessel or barge may range between 1 m and 100 m, with a volume ranging between 1 $m^3$ and 1,000,000 $m^3$. The displacement vessel may be manufactured using materials such as polymer (e.g., polyethylene terephthalate), concrete, cement, fiberglass, pumice, steel, amorphous metal alloys, or other suitable materials. At least one anchor cable connects the displacement vessel to the stationary location. The anchor cable is also operatively connected to a directional converter supported by the displacement vessel. The vertical rise and fall of the tide, and/or lateral drift due to drag forces caused by the ebb and flow of water during tidal action, causes the displacement vessel to move relative to the stationary location, and thus changing the length of the anchor cable between the displacement vessel and the stationary location. Such movement in the position of the displacement vessel relative to the stationary location causes the anchor cables to exert a force on the directional converter and transmit that force to a generator for producing electrical energy.

The displacement vessel may be anchored by at least one anchor cable to a stationary location, for example, the sea floor, land, or a submerged or fixed platform. Each anchor cable may be attached to the same or different anchors at the same or different stationary locations to secure the displacement vessel. Anchor cables may be made of braided steel, composite, fiber, nylon, amorphous metal alloys, or any other suitable material to secure the displacement vessel and withstand the sea environment. Each anchor cable may have a diameter in the range of 0.1 inch to 8 inches and the anchor cables may each have lengths in the range of 50 ft to 150,000 ft. The skilled person will understand that the diameter of an anchor cable should be large enough to withstand the force of the displacement vessel pulling axially on the anchor cable. For example, if a single anchor cable is used to anchor the displacement vessel, a larger diameter cable may be required to withstand the pulling force of the displacement vessel moves vertically with the rising and falling of the tide or moves horizontally from the ebb and flow of tidal action. Nevertheless, the skilled person will recognize the appropriate length and diameter needed for such anchor cables.

Where a submerged or fixed floating platform is used as a stationary location, the platform may include a substantially solid structure or frame that is elevated above the bay/ocean floor by a fixed distance or elevation. The platform may be elevated by, for example, a truss structure that is secured to the seabed or by one or more anchor cables similar to the anchor cables described above. If the platform is connected to the bay/ocean floor by one or more anchor cables, the platform may further include one or more buoyancy chambers to provide buoyant forces that allow the platform to float above the bay/ocean floor. These chambers may be substantially similar to the chambers described below with respect to FIG. 4.

The displacement vessel houses, supports, or is attached to a directional converter operatively coupled to at least one anchor cable and a generator. As used herein, a directional converter is a device that converts motion or forces in one direction to motion or forces in another direction. For example, a directional converter may convert generally linear (e.g., vertical) motion of a member into rotational motion of an axle, using, for example, a drum. The directional converter may include hydraulic actuators, such as a hydraulic motor coupled to the drum, for example, to provide rotational power to reel in the anchor cable. The directional converter may comprise a drive cable connected to at least one anchor cable and a drive gear that couples the drive cable and the generator. Upon the vertical rising/falling of the displacement vessel with the rising/falling tide, a change in the position of the displacement vessel relative to the stationary location causes the anchor cable to exert a force upon the direction converter (such as by a cable wrapped around a drum on the directional converter or a rack and pinion gear arrangement), which, in turn, converts the force or motion into, for example, a rotational force which is then transmitted to a generator for producing electrical power. In an embodiment having a rack and pinion or like mechanism, energy can be produced with both the rising and falling of the tide.

As a non-limiting example, the generator may be a fixed magnet (or permanent magnet) generator. A fixed magnet generator includes a permanent magnet fixed to a shaft, and the rotation of the permanent magnet induces an electric current in a stationary armature within the generator. The armature includes one or more metal wires/coils within the magnetic field of the permanent magnet such that the rotation of the magnet induces an electrical current in the wires thus generating electrical power. The generated electrical power may be transmitted to a storage facility or directly to consumers for consumption. A fixed magnet generator may be suitable for generating electrical power using a lower rotational speed of an axle, such as a rotational speed under 1000 RPM, for example. Because a fixed magnet generator may produce electrical power at lower rotational speeds than traditional electric generators, a direct drive approach may be used to operatively couple the directional converter to the generator. A direct drive approach involves coupling the directional converter directly to the generator via a chain, for example, without the use of gearing mechanisms or gear boxes to convert the RPM of the directional converter into a different RPM input for the generator. In one example, an axle on which the drum is fixed may include a gear that is operatively coupled by a chain to a gear on an axle of the fixed magnet generator. As the drum turns, thus causing the axle on which the drum is fixed to also turn, the chain will transfer rotational power directly to the axle of the fixed magnet generator, causing the permanent magnet to rotate and induce an electric current within the armature to produce electrical power for storage or consumption. A fixed magnet generator may have an output in the range of 1 kW to 1 MW or more (as a potentially practical embodiment, a 5-6 MW generator can be used), although one of skill in the art will recognize that any suitable generator may be used to convert the rising and falling of the tide and/or ebb and flow of the water due to tidal action into electrical power. An example generator that may be used with the present invention is a Ginlong Technologies GL-PMG-15K generator rated for 15 kW at 125 RPM. In a particularly practical embodiment, a 100 kW generator may be used with the present invention in addition, or alternatively, to the generators described herein. Other exemplary generators that are within the scope of the invention are discussed in Generators, a 2014 G E Power Conversion Product Catalogue.

The displacement vessel may further include a drag energy converter as a directional converter, where the drag energy converter is capable of being engaged by at least one anchor cable or drive cable and coupled to a generator. When the tide changes, tidal currents due to the ebb and flow of water during tidal action may drag the displacement vessel laterally with respect to an initial starting point (as well as rise or fall with the tide). Other ocean currents, such as those caused by the wind or thermal differences in the water, may further contribute to the lateral drag of the displacement vessel. In one embodiment, the drag energy converter may comprise a spindle or rotatable drum that is connected to a generator by a gearing mechanism, where at least one anchor cable is wound around the drum. As the currents caused by the ebb and flow of water during tidal action drag the displacement vessel laterally from the initial starting point, the lateral movement of the displacement vessel will cause the anchor cable to exert tension forces on the drum, and the drum will rotate. As the drum rotates, the rotational kinetic energy of the drum is transferred via a gearing mechanism to the generator, such that the rotational kinetic energy may be converted into electrical energy to be consumed or stored as desired. As the tide changes again and the displacement vessel moves laterally in a (generally opposite) different direction with respect to the stationary location, any slack on the anchor cable may be wound back into the drum by any conventional mechanism, for example, by a motor or spring.

In another embodiment, the directional converter may include a plurality of drums and a plurality of cables to utilize lateral motion in multiple directions to generate electricity (to be further discussed below). For example, two drums—each attached to at least one anchor cable—may be disposed on the displacement vessel or at different points on shore or a mix of both such that as the displacement vessel moves laterally in a first direction, a first anchor cable unwinds from a first drum causing the first drum to rotate. This rotation of the first drum is transferred to the electrical power generator to generates electricity as the displacement vessel moves in the first lateral direction. When moving in the first lateral direction, the second anchor cable may gain slack. The directional converter may include a control mechanism (for example, a spring or a motor) to reel the second anchor cable back around a second drum. Alternatively, the two drums may be operatively coupled such that the second cable may be automatically rewound on its drum as the cable on the first drum is unwound and thus be ready for unwinding as the displacement vessel moves in the other/opposite direction.

As the displacement vessel moves laterally in a second direction, the second anchor cable may be unwound from the second drum causing the second drum to rotate as the first anchor cable is reeled back into the first drum by a control mechanism. The rotation of the second drum is transferred to the electrical power generator which generates electricity as the displacement vessel moves in the second lateral direction. The second anchor cable may be reeled back into the second drum when the displacement vessel moves again in the first direction. Thus, electric power can be generated during both general directions of travel. In accordance with these concepts, further drums may be utilized to capture energy if the displacement vessel moves laterally in other directions.

The displacement vessel may further include a drag panel extending from an external surface of the displacement vessel. The drag panel may increase the surface area on which drag forces act due to the ebb and flow of water caused by tidal action (or drag forces caused by other ocean currents), allowing the displacement vessel to be more effectively moved laterally by the ebb and flow of water. The drag panel may extend in a generally downwards direction from the external surface of the displacement vessel. The drag panel may have a height that is between 1 ft and 100 ft. In some embodiments, the height of the drag panel may be 5 ft, although one of skill will recognize that the drag panel may have any suitable height to capture additional drag forces. The thickness of the drag panel may be between 0.1 inch and 24 inches; however, one skilled in the art will recognize that any suitable thickness may be used. The drag panel may have a substantially similar width to that of the displacement vessel, or the drag panel may be narrower than the width of the displacement vessel. The drag panel may be manufactured out of any suitable material, such as those discussed above with respect to the displacement vessel. The drag panel may have a flat shape, or include one or more non-flat sides configured to capture drag forces. In an example, the sides of the drag panel may include a parabolic shape, a concave shape, or a lofted cut.

In general, the drag panel may be fabricated of one or more materials suitable to withstand the drag forces from the ebb and flow of tidal action and/or other currents. In an example, the drag panel may be fabricated from an extruded metal sheet or panel.

The displacement vessel may include a control mechanism such that the control mechanism may deploy and retract the drag panel from the displacement vessel. For example, the drag panel may be stored within the displacement vessel in a first position. The control mechanism may controllably deploy the drag panel at a specified time to a second position, such as a time when strong current conditions exist. If the drag panel is not needed, the control mechanism may retract the drag panel back into the displacement vessel. The control mechanism may include hydraulics or an electric motor that may be powered by the energy generated by the displacement vessel.

The displacement vessel may further include a control mechanism to control the surface area of the drag panel. The drag panels may also include "windows" of any appropriate size within said drag panels that may be controllably opened or closed to adjust the desired drag force upon the displacement vessel. Such windows may be fabricated by cutting one or more openings in the drag panel, and fastening a second panel parallel to said window that can slidably close said window. For example, a hydraulic ram may open and close windows (or through-holes) in the drag panel to change the surface area on which the tidal currents interact. Upon activation, the hydraulic ram may translate a plate over a window or through-hole in the drag panel to increase the surface area of the drag panel and thus increase the drag experienced by the displacement vessel. Additionally, the hydraulic ram may retract the plate from the window or through hole in the drag panel to reduce the surface area of the drag panel and thus decrease the drag experienced by the displacement vessel.

The displacement vessel may further include a depth control mechanism to allow the displacement vessel to controllably change its operating depth in the water, such that it may operate at a "safe" depth to avoid objects in the water such as keels, propellers, and rudders of boats or other devices located in the water. In one example, the depth control mechanism may include one or more ballast tanks within the displacement vessel. The ballast tanks may be filled with water when the displacement vessel needs to increase its depth. To decrease its depth or surface, the ballast tanks may release or pump out water using a pump, for example. In another example, the depth control mechanism may include one or more horizontal or vertical planes to steer or pitch the displacement vessel towards the bay/ocean floor or towards the water surface. The one or more planes may be affixed to any suitable location on the displacement vessel, such as the side panels of the displacement vessel, for example. The horizontal planes may be rotated about an axis while connected to the displacement vessel, so as to change the pitch angle of the displacement vessel and increase or decrease its depth as the displacement vessel moves through the water. The depth control mechanism may allow the displacement vessel to controllably submerge at a specified time and resurface at a later time. The achieved depth for the displacement vessel may vary from the water surface to more than 100 feet below the surface.

The tidal energy generation assembly may include a displacement vessel that is rotatable. As described above, the displacement vessel is coupled by an anchor cable to a directional converter positioned at a stationary location. Because the speed and direction of water varies during a tidal cycle, the displacement vessel may be rotated to orient itself with respect to the flow of water in order to maximize the force of the water captured by the displacement vessel or otherwise control the amount of force captured by the drag panel depending on prevailing current conditions.

This rotation may be achieved using control cables attached to the sides of the displacement vessel—forming a "bridle"—such that the shortening or releasing of the length of the control cable(s) allow the displacement vessel to turn, rotate, or otherwise change the angle of the drag panel relative to water flow. The control cables may be attached at the ends or sides of the displacement vessel using any suitable number of connection points to connect the displacement vessel to the anchor cable. In an example described in more detail below, the displacement vessel includes four connection points corresponding to four separate control cables and the connection points may be generally located at corners of the displacement vessel. In another example described in more detail below, the displacement vessel may include redundant control cables (and, if desired, redundant control mechanisms) such that the displacement vessel may have eight control cables generally connected at the corners of the displacement vessel. The control cables may be attached to the displacement vessel by a control mechanism, such as a motor or winch, for example, configured to independently, or cooperatively control (i.e., adjust) the length of the control cables. The control mechanism may be mounted in or on the displacement vessel. Continuing the example from above, four control mechanisms may be mounted on the displacement vessel at each of the four connection points to independently control the four control cables. The control mechanism may lengthen or shorten the control cables, causing rotation of the vessel and thereby decrease or increase the distance between the end of the displacement vessel attached to the control cable and the anchor cable. In another embodiment, the displacement vessel may include redundant cables connected to redundant control mechanisms to ensure operability in the event that a cable breaks or a control mechanism malfunctions.

The bridle—or series of control cables—may include any suitable number of control cables and each control cable may be connected to the displacement vessel at a connection point. Exemplary connection points along the displacement vessel may include the ends, corners, or sides of the displacement vessel. As stated above, control mechanisms may be attached to the displacement vessel at the connection points and each control mechanism may connect the displacement vessel to an individual control cable. Because each control mechanism may independently shorten or lengthen (wind or unwind) its respective control cable, the bridle may control the orientation of the displacement vessel in the water. In particular, the bridle may be used to change the angle of attack of the displacement vessel with respect to the water/current flow, e.g., the yaw, pitch, and/or roll. For example, the pitch of the displacement vessel may be changed to point the displacement vessel in a downwards direction to cause the displacement vessel to submerge or dive deeper into the water if already submerged. As an example of a method of pointing the displacement vessel downwards, one or more control mechanisms generally located at the top of the displacement vessel may wind control cables in. Additionally, or optionally, one or more control mechanisms located generally at the bottom of the displacement vessel may unwind control cables to effect a change in the pitch of the displacement vessel. A similar process may be used to rotate the displacement vessel upwards to cause the displacement vessel to surface or decrease its depth in the water.

Optionally, the displacement vessel may further include at least one arm coupled to and extending away from the displacement vessel. The arm(s) may be used to house and protect the control cable extending from the displacement vessel to the anchor cable, as described above. As the control cable within the arm lengthens or shortens, thereby rotating the displacement vessel, the arm may pivot and change the angle at which it extends from the displacement vessel and thereby not interfere with rotation of the displacement vessel as the control cable(s) lengthen or shorten. The arms may thus be made of any suitable material for effectuating the function of the cable without interference. For example, the arms may comprise a polymer, such as a polyurethane foam.

The control cables allow the displacement vessel to rotate about a vertical axis and thus adjust (capturing or reducing) the amount of drag forces exerted on the drag panel from the flow of water in various directions, and thereby also control the amount of electricity generated. As the displacement vessel is rotated, any drag panel on the displacement vessel also rotates, thereby controllably adjusting the surface area of the drag panel exposed to the force of water. For example, if the displacement vessel is rotated from an orientation that is perpendicular to the flow of water to an orientation that is at an acute angle relative to the perpendicular, less force from the flow of water may be exerted on the drag panel. Thus, less force will be transmitted to the directional converter and less energy will ultimately be generated by the generator.

In operation, the displacement vessel is positioned in the water such that one side of the drag panel captures drag forces resulting from the pressure exerted on the drag panel as a result of the water flow against the drag panel. To effect rotation of the displacement vessel, a first control mechanism may wind or release a first control cable such that one side of the displacement vessel changes its distance relative to the anchor cable. Where the displacement vessel has multiple control cables, a first control mechanism may wind (or release) a first control cable while a second control mechanism releases (or winds) a second control cable, again allowing the displacement vessel to change its orientation relative to the anchor cable. Such control cables may be housed within arms, which swing about the displacement vessel as the displacement vessel rotates in the water due to the lengthening or shortening of the control cables. When the displacement vessel is perpendicular to the flow of water, it experiences a maximum amount of drag force. Upon rotation of the displacement vessel to an angle away from perpendicular, the drag panel may experience less drag force, thus allowing the amount of drag force exerted on the displacement vessel to be controllably adjusted.

In another aspect of the invention, the displacement vessels described herein may be replaced with other suitable mechanisms for capturing the ebb and flow of water due to tidal action and/or other current flows. Such mechanisms may include a turbine having one or more propellers, rotors, or impellors. Alternatively, an array of turbines having one of the previously described constructions may be used in place of the displacement vessel. In this approach, the system enjoys the benefit of turbine rotation caused by tidal flow and/or other currents as well as the land-based generator location as described above.

In any case, the turbine(s) may be anchored to or attached to the ocean/bay floor or may be floating at or near the water surface via a floatation device as described above. The turbine may be coupled to a drum that is under water (or alternatively above water in the case that the turbine is floating at the surface of the water) via a coupling mechanism that may be, for example, a chain or cable. As water flows past the turbine, the turbine rotates, causing the drum to rotate and wind or unwind the anchor cable. The anchor cable may extend along the ocean/bay floor and be coupled to a directional converter that is stationed on land. The directional converter may be substantially similar to the directional converters described herein and thus converts mechanical energy transferred from the anchor cable to the directional converter into electrical energy to be stored and/or consumed.

Energy Generation Using Rising/Falling of the Tide

In one basic aspect of the present invention, the tidal energy conversion assembly utilizes the vertical rising/falling of the tides to generate electricity. The tidal energy conversion assembly includes a displacement vessel that is anchored to a stationary location, such as stationary location, via at least one anchor cable. As the tide rises and falls, the distance between the stationary location and the displacement vessel changes, causing a force to be exerted on a directional converter supported on the displacement vessel (as further discussed below). The directional converter converts this force into mechanical energy (e.g., rotational energy), and that mechanical energy is transmitted to an electrical power generator for electricity generation.

FIG. 1A shows a cross-section of a tidal energy conversion assembly 100, according to an illustrative implementation. The tidal energy conversion assembly 100 includes a displacement vessel 102 that is attached to a plurality of anchor cables 103a-103c and anchor cables 105a and 105b connected to anchors 108a-108e on the stationary location 106. Each of the anchor cables 103a-103c has a first end (e.g., at latches 107a-107c), a second end (e.g., at connector 111), and a length in between the first end and the second end. Each of the anchor cables 105a and 105b has a first end at anchors 108e and 108d and a second end at connector 111. In this embodiment, the displacement vessel 102 houses a directional converter 109 that is coupled to anchor cables 103a-103c and 105a and 105b and electrical power generator 116. The directional converter 109 includes a drive cable 110 having connector 111 at one end coupled to anchor cables (via connector 111), and at a second end coupled to the drum 113. While FIG. 1A illustrates such components as being located within the displacement vessel, one of skill in the art understands that the same components may be located outside the displacement vessel, as will be further explained below.

Anchor cables 103a-103c extend from the displacement vessel 102 at respective latches 107a-107c and are threaded through anchors 108a-108c to reach connector 111. Each anchor 108a-108e has a pointed end embedded with the stationary location 106 and an eye loop at the other end through which the anchor cables may be threaded. The anchors 108a-108c are secured in stationary location 106, which may be the seabed or a platform elevated above the bay/ocean floor. One of skill in the art will recognize that any suitable number of cables can be attached to the displacement vessel 102 at any point along the surface of the displacement vessel 102 and any suitable number of anchors may be used to secure anchor cables 103a-103c. Connector 111 may be, for example, a metal ring, a latch, or any suitable device for coupling the anchor cables to the drive cable 110. Alternatively, not shown in FIG. 1A, the anchors may include a pulley through which the anchor cables are threaded to help minimize friction.

The tidal energy conversion assembly 100 further includes anchor cables 105a and 105b that are also attached to anchors 108d and 108e, respectively, at one end and the directional converter 109 at the other end. While FIG. 1A illustrates the mixed use of anchor cables 103 and 105, the invention contemplates the device having a plurality of anchor cables 103 only or a plurality of anchor cables 105 only.

The displacement vessel 102 may be partially or wholly hollow and substantially or completely water-tight so that it is buoyant in water. However, other non-hollow embodiments may be used. In this embodiment, by floating at or near the surface 118 of the water, the elevation or distance 119a of the displacement vessel 102 relative to the stationary location changes as the tide rises and falls. For example, as the tide rises, the vertical distance 119a between the displacement vessel 102 and the stationary location increases. Conversely, as the tide falls, the vertical distance 119a between the displacement vessel 102 and the stationary location decreases.

In FIG. 1A, the directional converter 109 is attached to at least one anchor cable and housed within or upon the displacement vessel 102. Due to the attachment to the anchor cable, the direction converter 109 captures the force in the vertical rising of the displacement vessel caused by the rising tide into mechanical energy that may be converted/transmitted to by an electrical power generator 116. The directional converter may thus utilize drive cable 110, along with drive gear 112, drum 113, and gearing mechanism 114 to translate the forces generated by the vertical rise into rotational motion/forces that can actuate the generator 116. The drum 113 may be fixed to an axle on the converter and connected to the drive cable 110 such that a tension force on the drive cable 110 will cause the drum 113 to rotate. The drive gear 112 may be fixed on the same axle as the drum 113 and operatively coupled to gearing mechanism 114 for ultimate transmission to the generator. The gearing mechanism 114 may include a gear multiplication arrangement, such as a gear multiplication box, that converts a slower rotational input into a faster rotational output. For example, the gearing mechanism 114 may take a slower rotation of a larger gear and convert that input rotation into a faster output rotation of a smaller gear. Additionally, the gearing mechanism 114 may convert input rotations in both clockwise and counter-clockwise directions into an output of a single rotational direction for the electrical power generator 116. Either the drive gear 112 or the gearing mechanism 114 may be coupled to electrical power generator 116.

As indicated above, drive cable 110 is attached at one end to connector 111, which is attached to anchor cables 103a-103c and 105a and 105b, and at its other end to drum 113. As the tide rises, causing the displacement vessel also to rise vertically, the movement of the drive cable 110 (as further discussed below) causes drum 113, and thus drive gear 112, to rotate in either a clockwise or counter-clockwise direction. The drive gear 112 may include one or more gears on an axle in any suitable arrangement of gear sizes and gear types. For example, the drive gear 112 may include a single sprocket fixed on an axle the sprocket may be configured to interface with a chain. In another example, the drive gear 112 may include two gears of different radii fixed on separate axles and mechanically coupled with one another. Optionally, the drive gear 112 may be mechanically coupled to a gearing mechanism 114. For example, the drive 112 gear may be coupled to the gearing mechanism via a chain or belt. Alternatively, as another example, the drive gear 112 may be directly coupled with one or more other gears that are part of the gearing mechanism 114.

Figure 1B:
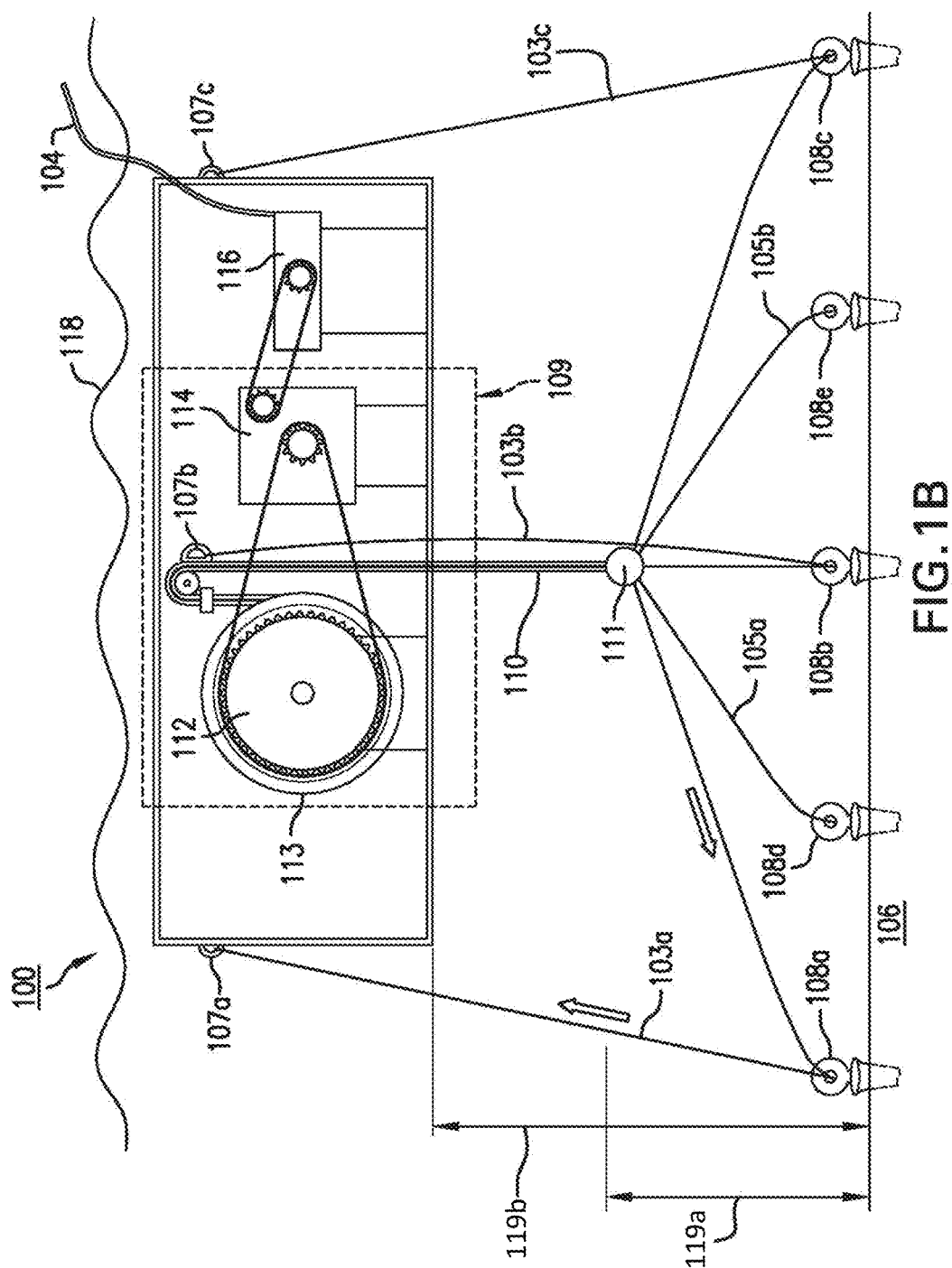
FIG. 1B shows a tidal energy conversion assembly after the tide has risen.
Figure 1C:
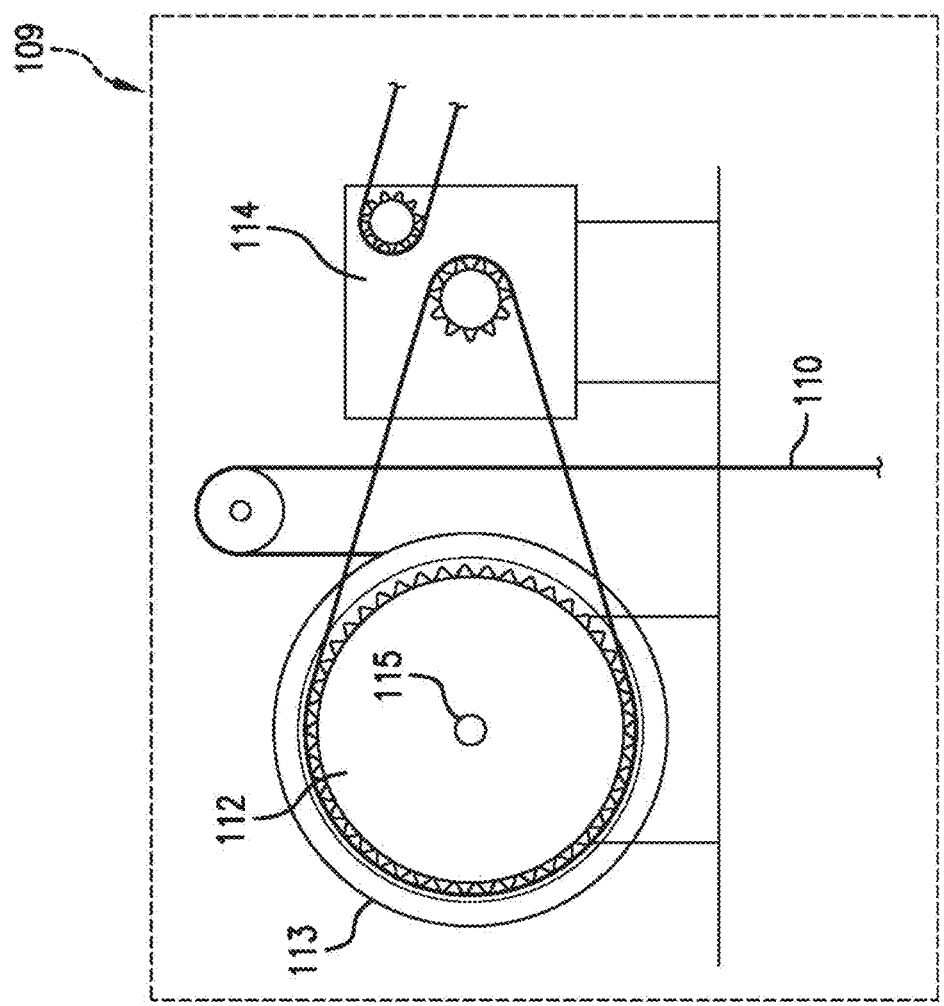
FIG. 1C shows an enlarged view of a directional converter of a tidal energy conversion assembly.
Figure 1D:
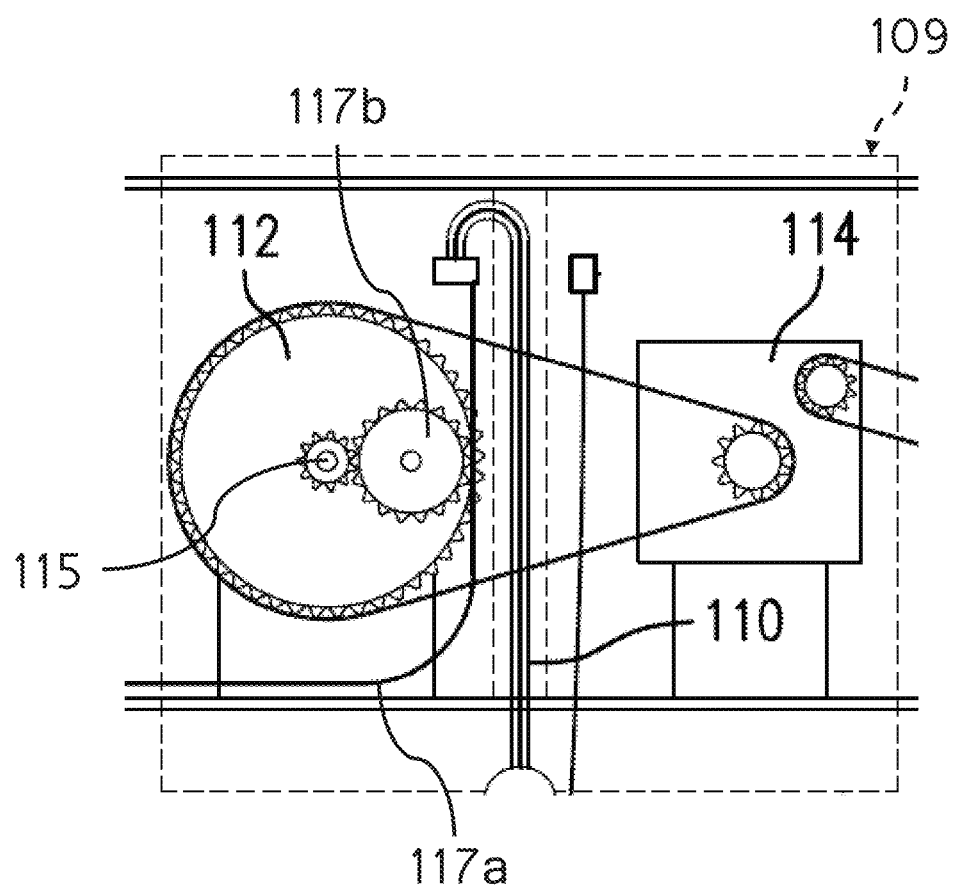
FIG. 1D shows an enlarged view of an alternative embodiment of a directional converter having a rack and pinion mechanism.
Figure 1E:
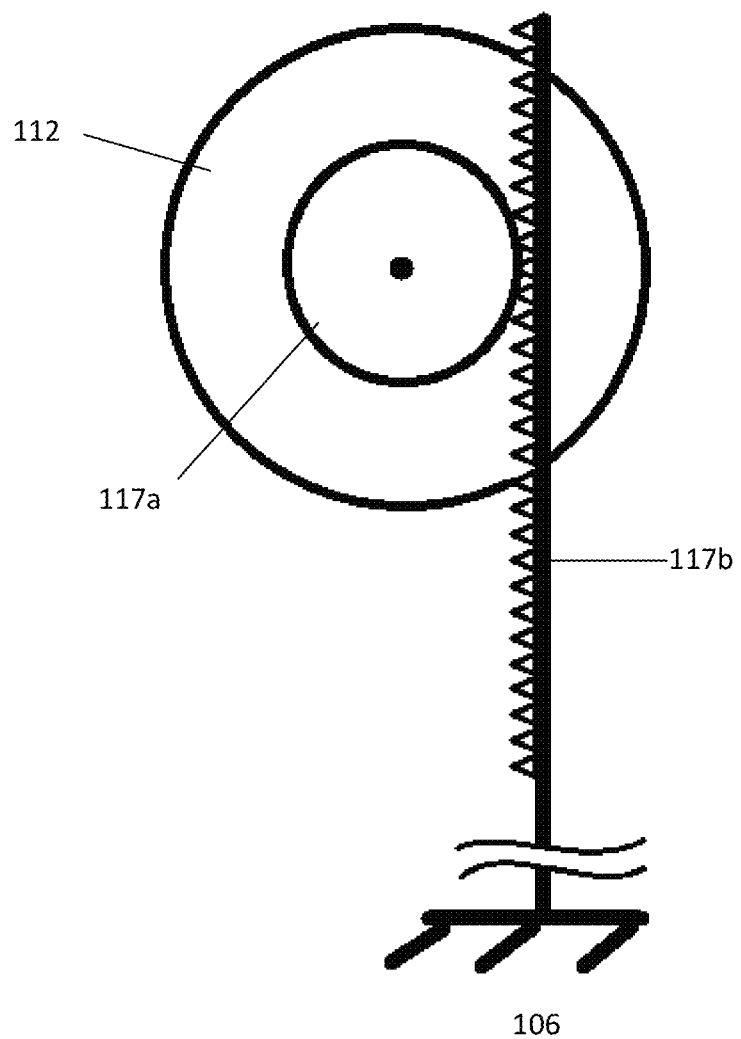
FIG. 1E shows general implementation of a rack and pinion mechanism for capturing energy from the rising and falling of the tide.

FIG. 1D shows an enlarged view of an alternative directional converter 109 having a rack 117a and pinion 117b mechanism. The rack 117a and pinion 117b mechanism is coupled to the drive cable 110 and the drive gear 112 or, alternatively, a gear of the gearing mechanism 114. As the tide rises, via the attachment to the anchor cable, the drive cable 110 pulls on the rack 117a and pinion 117b mechanism, causing the rack 117a to translate along the pinion 117b. The pinion is coupled to a gear that is fixed on axle 115 and thus, rotation of the pinion causes the gear on axle 115 to rotate. Drive gear 112 is also fixed to the axle 115 and thus rotates due to the rotation of the axle 115. The drive gear 112 may be coupled to a gearing mechanism 114 such that the rotation (and thus rotational energy) is transferred through the gearing mechanism 114 to the electrical power generator to generate electricity. This configuration may not use a drum 113 as described above, and may be beneficial for tidal energy conversion assemblies that are used in areas of the ocean with smaller changes in the water surface due to tidal action as a large drum and lengthy cable need not be included. FIG. 1E shows a general implementation of a rack 117a and pinion 117b mechanism for capturing energy from the rising and falling of the tide.

As shown by comparing FIG. 1A and in FIG. 1B, as the tide rises, the displacement vessel 102 rises from a distance 119a to a second higher distance 119b between the stationary location 106 and the displacement vessel 102. Such rise of the displacement vessel causes the portion of anchor cables 103a-103c between latches 107a-107c and their anchors 108a-108c to lengthen, while the portions between the anchors 108a-108c and connector 111 shorten; as a result, the anchor cables 103a-103c exert a downward force upon connector 111 and thus upon drive cable 110 which will cause drum 113 to turn as the cable 110 unwinds. Drive gear 112 is coupled to the same axle as the drum 113, and thus the rotation of the drum 113 causes the drive gear 112 to rotate. The rotation of the drive gear 112 is transmitted to the gearing mechanism 114 which may convert the RPM of the drive gear into a faster RPM output. The output of the gearing mechanism 114 is transmitted to the generator 116, which produces electricity.

As the displacement vessel rises vertically, the anchor cables 103a-103c are free to slide through the loop of anchors 108a-108c as the displacement vessel 102 rises and falls with the tide. However, the anchors 108a-108c may include a pulley mechanism through which the anchors cables are threaded to reduce friction between the anchor cables 103a-103c and the anchors 108a-108c. Also, as the displacement vessel rises to distance 119b, the drive cable may be fixed relative to the stationary location 106 by anchor cables 105a and 105b. The fixed position of the anchor cables 105a and 105b also activates the drive cable 110 as the displacement vessel 102 changes its position relative to the stationary location 106. The individual and collective function of anchor cables 103a-103c and 105a and 105b causes drive cable 110 to turn the drum 113 and drive gear 112 and thus provide mechanical power to the electrical power generator 116.

In another example, as the tide falls vertically, the displacement vessel 102 lowers, and the vertical distance 119a between the anchor points 108a-108e and the displacement vessel 102 decreases. In the reverse direction, as the displacement vessel 102 falls vertically with the falling tide, an optional frame may be positioned above the displacement vessel 102 and may include an attachment mechanism, e.g., a cable, coupled to the directional converter 109 to capture the change in potential energy in the opposite direction due to the falling of the displacement vessel 102. The stationary frame is immobile with respect to the water movements, and, as the displacement vessel 102 falls vertically with the tide, the displacement vessel increases its distance from the frame, generating a pulling force upon the cable attached to the frame. The direction converter 109 coverts this pulling force into mechanical energy and transmits the mechanical energy to the generator for generation of electricity, therefore capturing energy from the falling tide. At the same time, the action of the frame and cable on the falling tide may cause the drum to rewind the cable 110 such that the power generation can be repeated on the next rising tide cycle.

The stationary frame may be substantially similar to a spud barge used in marine operations. A spud barge, or jack-up barge, is a type of buoyant vessel which is capable of providing a solid, stable platform for offshore operations involving supporting heavy machinery or equipment on water. Each spud barge may include at least one support beam or pipe coupled to the barge (usually to the barge's perimeter) that is driven into the sea floor to increase the stability of the barge.

In an alternative approach for capturing potential energy during the falling of the tide, the directional converter 109 may include a compression spring coupled to an axle 115 on which the drum 113 is fixed. The spring may store potential energy as its coils are compressed by the rotation of the drum 113 due to the unwinding of the anchor cable or drive cable from the drum 113. As the displacement vessel 102 falls with the tide, the coils of the spring may expand (from the forces stored in the compressed coils) causing the axle 115 to rotate in an opposite direction and produce rotational energy that is then transmitted to the electrical power generator for generating electric power during the falling tide. This spring mechanism will also serve to re-wind (or reel-in) the anchor cable so the electrical power generation sequence can repeat on the next rising tide.

Alternatively, a small low-power motor can be used to re-wind the cable during the falling tide to ready the assembly for the next incoming tide cycle. In an alternative embodiment, the spring may be located within, for example, the gearing mechanism. In this case, the spring mechanism may be coupled to an axle of a gear in the gearing mechanism. A configuration such as this where the spring mechanism is separated from the drum 113 may be beneficial for maintenance/repairs or access of directional converter components.

In FIGS. 1A and 1B, the electrical power generator 116 receives mechanical power from the directional converter 109, generates electricity with the mechanical power, and outputs the generated electricity through a wire 104, which then may be stored in an electric storage facility or transmitted to an electric grid to be used immediately by a consumer. In one embodiment, the wire 104 may be connected to a power grid through an electrical connection cable that is run along the seabed and may be disposed at or near anchors 108a-108e. In one embodiment, the electrical power generator 116 may be configured to convert the rotation in the first and second directions from the gearing mechanism 114 or drive gear 112 into electrical energy. In another embodiment, the electrical power generator 116 may convert rotation in a first or second direction into electrical energy. The electrical generator may be configured to produce direct current (DC) or alternating current (AC) electricity. Thus, the electrical power may be supplied to the consumer in either DC or AC. The electrical generator may further include an inverter to convert DC into AC. Alternatively, the electrical generator may further include a rectifier to convert AC into DC. The electrical generator may store DC electricity in a storage facility, such as a battery, for use or transmission to consumers at a later time. The tidal energy conversion system may include any other suitable supporting electrical equipment, such as a voltage regulator or transformer, for example.

FIG. 1C shows an enlarged view of an embodiment of the directional converter 109. As shown in FIG. 1C, drive cable 110 is wound around the drum 113, which is fixed on an axle 115. Drive gear 112 is also fixed on the same axle 115 as the drum 113 and may additionally comprise a plurality of gears suitable to convert the movement of the drive cable 110 into rotational kinetic energy at a specific RPM. Drive gear 112 is connected to gearing mechanism 114 by a chain or belt. The drive cable 110 may be composed of materials such as braided steel cable, fiber rope, chain, extruded metal or polymer, or any suitable combination of materials. The drive cable 110 may be attached to one or a plurality of anchor cables in any suitable manner, such as a latch, ring, clamp, tapered lock, flange, or any other suitable coupling mechanism.

Figure 6A:
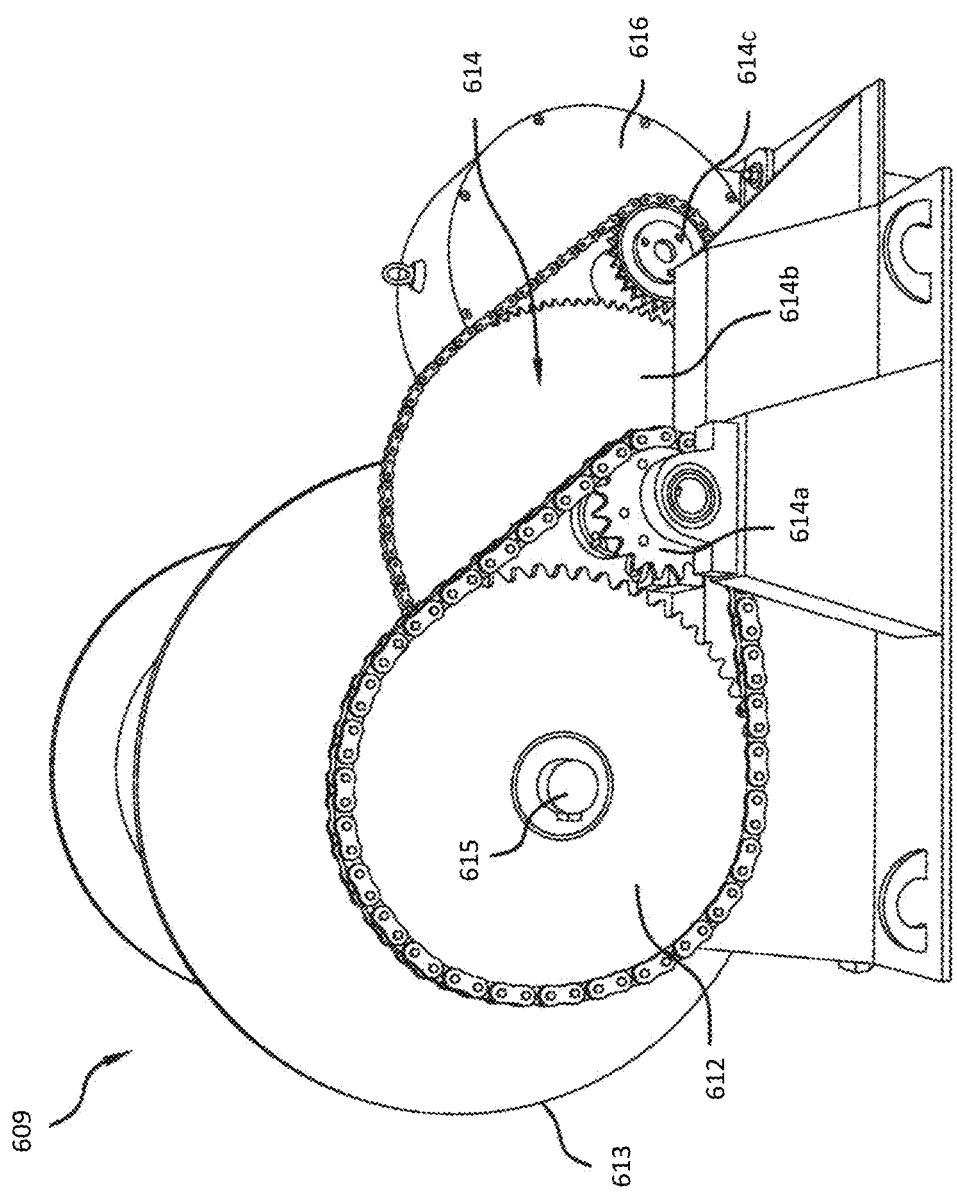
FIG. 6A shows a directional converter comprising a drag energy converter.

FIG. 6A illustrates another embodiment of a directional converter 609. In particular, directional converter 609 includes a rotatable drum 613 fixed on an axle 615. An anchor cable may be coupled to the rotatable drum such that it may be wound about or unwound from the drum 613. A drive gear 612 is also fixed on the same axle 615 as the rotatable drum 613. Drive gear 612 is connected to a gearing mechanism 614 by a chain, for example, and gearing mechanism 614 includes a plurality of gears 614a-614c. In the directional converter 609, the gearing mechanism 614 is configured as a gear multiplication arrangement. As the drive gear 612 turns at a first RPM, gear 614a will turn at a second RPM that is faster than the first RPM because gear 614a has a smaller diameter than the drive gear 612. Gear 614b is fixed on the same axle as gear 614a and thus will also rotate at the second RPM. Gear 614c is coupled to gear 614b by a chain and will spin at a third RPM that is faster than the second RPM, because the diameter of gear 614c is smaller than the diameter of gear 614b. The gearing mechanism 614 is also coupled to an electrical power generator 616 such that rotation of the drum 613 is transferred to the electrical power generator 616 through the gearing mechanism 614 to generates electricity.

Figure 2:
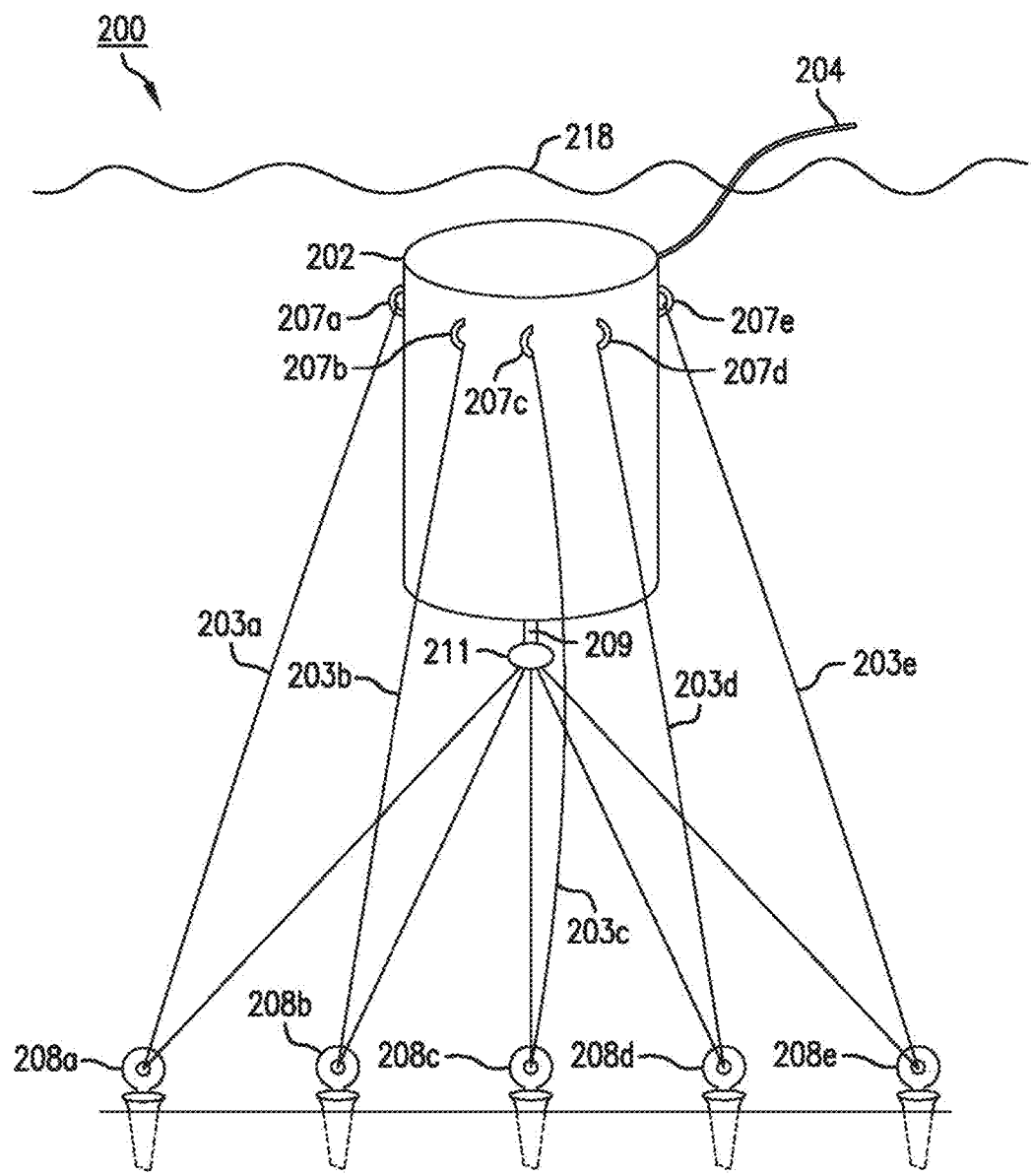
FIG. 2 shows a tidal energy conversion assembly having a cylindrical displacement vessel.

FIG. 2 illustrates a tidal energy conversion assembly 200 having a cylindrical displacement vessel. The tidal energy conversion assembly 200 is substantially similar to the tidal energy conversion assembly 100 of FIGS. 1A and 1B. In this embodiment, the displacement vessel 202 is in the shape of a cylinder that floats at or near the surface 218 of the water. The displacement vessel 202 is anchored to stationary location 206 by anchors 208a-208e connected through anchor cables 203a-203e. Anchor cables 203a-203e each have a length that extends from a first end (e.g., respective latches 207a-207e) to a second end (e.g., connector 211), and threaded through anchors 208a-208e.

While not shown in FIG. 2, directional converter 209 is coupled to an electrical power generator located at least partially inside the displacement vessel, similar to the electrical power generator 116 in FIG. 1. The electrical power generator converts mechanical energy, such as rotational energy, supplied by directional converter 209 as displacement vessel 202 rises or falls into electrical energy and outputs the electrical energy through wire 204.

Figure 3:
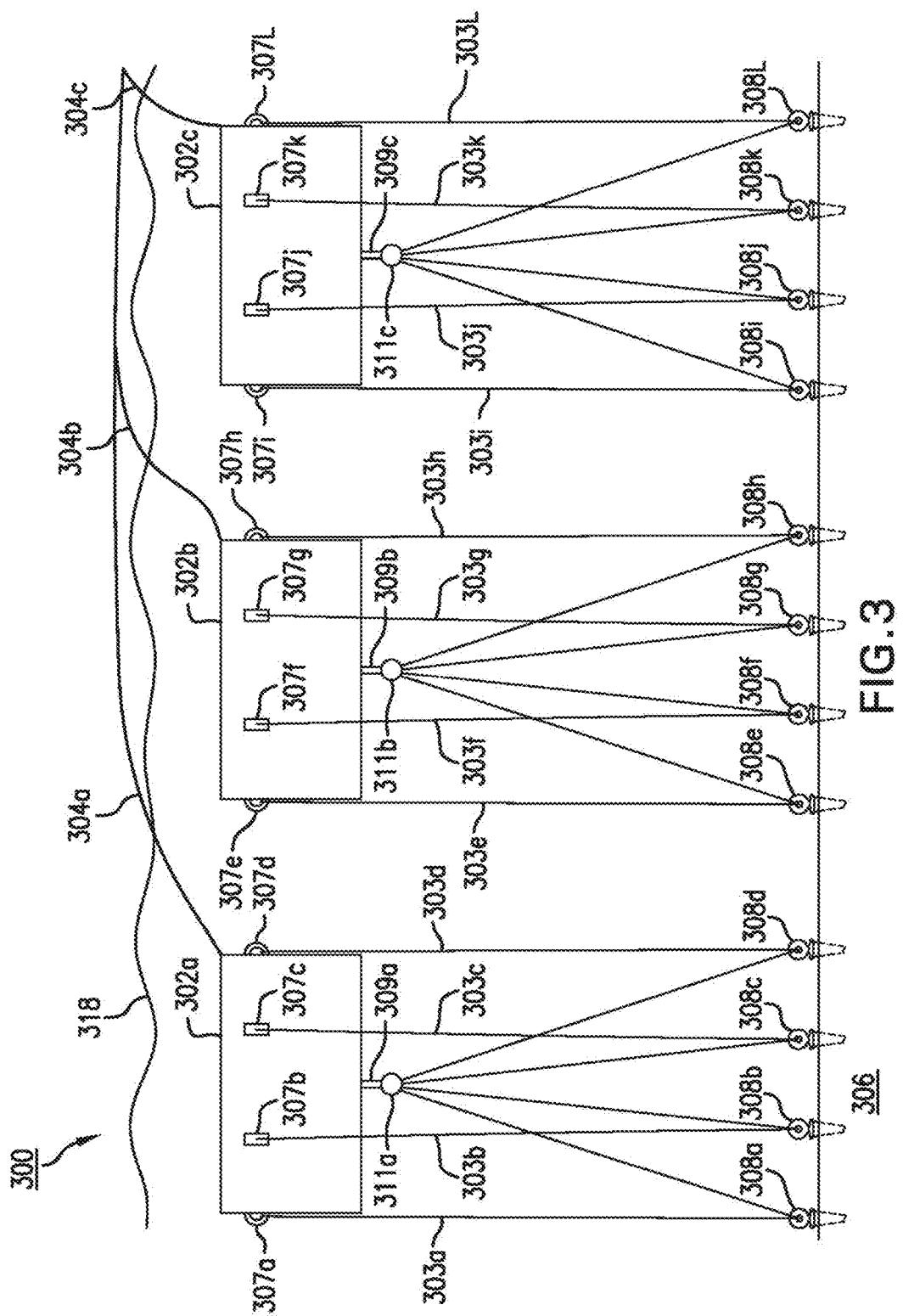
FIG. 3 shows a system of multiple tidal energy conversion assemblies.

FIG. 3 shows a system 300 of tidal energy conversion assemblies. Each individual tidal energy conversion assembly in the system 300 may be substantially similar to those devices described generally above, or with respect to FIG. 1A-1C, 2, 4, or 5A-C. The system 300 includes displacement vessels 302a-302c that are buoyant at the surface 318 of the water. Each displacement vessel 302a-302c is anchored to stationary location 306 by anchors 308a-308l through anchor cables 303a-303d, anchor cables 303e-303h, and anchor cables 303i-303l. Anchor cables have first ends connected to latches 307a-307l, and second ends connected to connectors 311a-311c, and are threaded through anchors 308a-308l.

Each displacement vessel 302a-302c houses or supports a directional energy converter 309a-309c, which may be substantially similar to the directional converters described with respect to FIGS. 1A-1C and 6A. The directional converters 309a-309c are mechanically coupled to electrical power generators that may be substantially similar to the electrical power generators described with respect to FIGS. 1A-1C and 6A. Each electrical power generator outputs generated electrical energy through a respective electrical wire 304a-304c. Wires 304a-304c may be joined together to transmit the generated electricity to an electric storage facility or directly to consumers to be consumed. While FIG. 3 illustrates only three displacement vessels in the system, this invention includes any number of such devices in a system that is capable of being networked to generate electricity. Each tidal energy conversion assembly may be controlled collectively or individually in the system, for example, by a locking mechanism on each tidal energy conversion assembly as discussed below. Such as system would be capable of producing large amounts of electricity, for example, several gigawatts, for consumption or storage.

Figure 4:
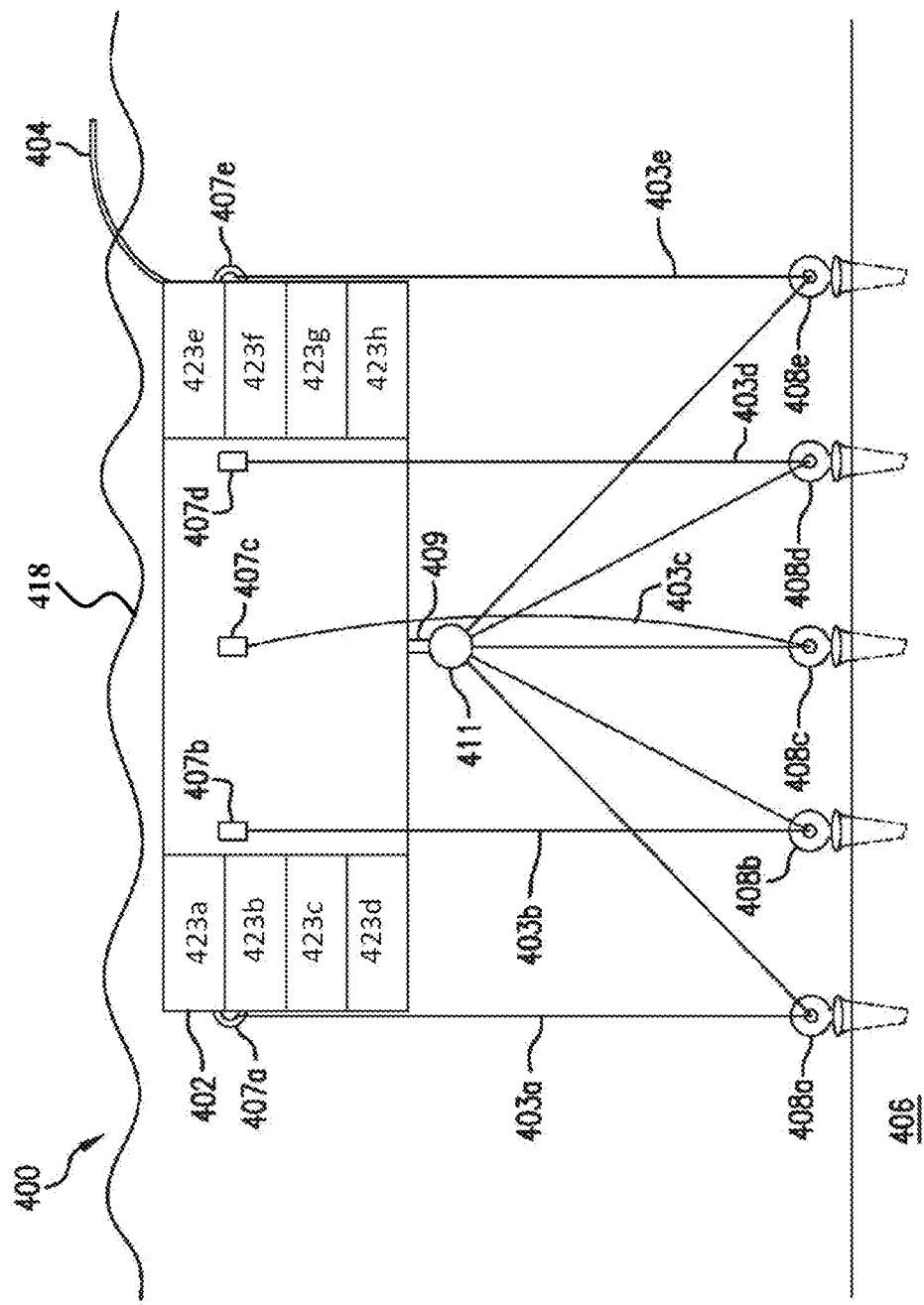
FIG. 4 shows a tidal energy conversion assembly with a displacement vessel having multiple chambers.

FIG. 4 shows an alternate embodiment of a tidal energy conversion assembly 400 with a displacement vessel 402 having multiple chambers or compartments. Similar to the above embodiments, tidal conversion assembly 400 includes anchor cables 403a-e, a wire 404, anchors 408a-e in a stationary location 406, latches 407a-e, directional converter 409, and connector 411. The displacement vessel 402 is buoyant at the surface 418 of the water and has multiple internal chambers 423a-423h arranged in a stacked orientation. While chambers 423a-423h are shown in a stacked orientation, one of skill in the art would recognize that the chambers 423a-423h can be arranged in any suitable orientation. The internal chambers 423a-423h may be manufactured from any suitable material so that each chamber may be inflated to a specified and different pressure, for example, to accommodate increasing static fluid pressure at increasing depths. The pressures within each chamber may be similar or different from one another, depending on the external static fluid pressure acting on the tidal energy conversion assembly 400. Furthermore, each of chambers 423a-423h may include a wall thickness that is substantially similar to one another or different, depending on the pressure desired for the individual chamber to accommodate for static fluid pressure at increasing depths. For example, chamber 423d may comprise a thicker wall so that it can be inflated to a higher pressure while chamber 423a may comprise a thinner wall and be inflated to a lower pressure. Displacement vessel 402 may comprise substantially the same stationary locations, anchors, anchor cables, directional converter, and drag converter discussed generally above and below.

The internal chambers 423a-423h may be manufactured from any suitable material, or be an integral part of the displacement vessel 402, so that each chamber may be inflated to a specified pressure. Pressure within each chamber may be similar or different from one another, depending on the buoyant force required of the tidal energy conversion assembly 400. Furthermore, each of the chambers 423a-423h may include a respective wall thickness. Each wall thickness may be substantially similar to one another or different, depending on the pressure required for the individual chamber. The internal compartments may be stacked one on top of the other. For example, a chamber 423d at the bottom of the displacement vessel may include a thicker compartment wall so that it can be inflated to a higher pressure while chamber 423a at the top of the displacement vessel may include a thinner compartment wall and be inflated to a lower pressure such that the chamber 423d at the bottom can withstand greater compression pressure from the external environment.

As another aspect of the present invention, a locking mechanism (not shown) or rotation limiter may be included in the directional converter 109 to lock the displacement vessel 102 at a desired distance above the stationary location. For example, the displacement vessel 102 may be locked at a low point in a tidal cycle, where the displacement vessel 102 is close to the stationary location 106. The displacement vessel 102 may be released at a desired time when the tide is higher, e.g., at or close to high tide, thereby allowing the displacement vessel 102 to vertically rise a maximized distance from the stationary location 106 in a short period of time. The locking mechanism thus allows the displacement vessel to generate a maximized amount of energy in a relatively short time interval, as compared to the gradual vertical rise of a displacement vessel without a locking mechanism. The time of release of the displacement vessel 102 may correspond to a peak electric usage time of consumers. The locking mechanism thus allows the tidal energy converting system 100 to compensate for times of peak energy usage without necessitating storage of the generated energy in an electric storage facility or battery. Locking the displacement vessel 102 at a point close to the stationary location can also generate large amounts of electricity in a short time-frame, rather than with the gradual rise and fall of the tide.

The locking mechanism may be coupled to the drive gear 112 or axle 115 to limit or inhibit the rotation of the drive gear 112 and/or axle. Alternatively, the locking mechanism may be coupled to the drive cable 110 to limit or inhibit the translation of the drive cable 110 and lock the displacement vessel 102 at a desired distance above the seabed. In another example, to lock the displacement vessel 102 in place at a specific elevation above the stationary location 106, the locking mechanism may limit or prevent rotation of the drum 113. As the drum 113 is limited or prevented from rotating, the length of the drive cable 110 between the stationary location 106 and the displacement vessel 102 will not change and thus the displacement vessel 102 will be locked at the specific elevation above the stationary location 106. The locking mechanism may include a braking mechanism that is positioned such that it may control the translation of the drive cable 110 (or an anchor cable). For example, the locking mechanism may include a clamp that is configured to apply a force on the drive cable 110 (or an anchor cable). The clamp may provide a clamping force on the drive cable 110 such that translation of the drive cable 110 is stopped or provide a force such that the translation is slowed.

In yet another aspect of the present invention, the displacement vessel that is attached below a frame can be held or locked in an elevated position by the frame. When the tide falls, the lifting mechanism maintains the displacement vessel at an elevated height over the lowered water level. When power is needed, the displacement vessels may be released, and the falling weight of the displacement vessel will exert a force on the spring or cable connected to the lifting mechanism. The directional converter may convert the force into mechanical energy and transmit the mechanical energy to an electrical power generator to generate electricity for storage and/or consumption. The time of release may correspond to a peak energy usage time of consumers so that the electrical energy does not need to be stored.

In another aspect of the invention, the invention comprises a method of generating electricity from the vertical tidal motion into rotational energy and transferring the resulting rotational energy to operate an electrical power generator for producing electricity. As the tide rises and/or falls, a vertical distance between the surface of the water and the bay/ocean floor will change. This vertical change in distance may be converted into rotational energy that is used to energize the electrical power generator to generate electricity. Specifically, the invention includes a method of generating electricity from tides comprising the steps of: providing a displacement vessel housing a directional converter coupled to a generator, said displacement vessel being a first distance from a stationary location below said displacement vessel; providing an anchor cable having a first end and a second end, whereby said second end is attached to said directional converter and said anchor cable extends to an anchor secured at said stationary location, the anchor cable having a first length between said directional converter and said anchor; causing said displacement vessel to change its distance from the stationary location to a second distance wherein said second distance is greater than said first distance and activating said directional converter; and energizing said generator.

To calculate an expected energy return from a single displacement vessel using the vertical rising of the tides for energy generation, a buoyant force must be calculated for an individual displacement vessel. Eqn. 1 shows an equation for calculating buoyant force from a displacement vessel, where $F_B$ is buoyant force, $\Delta V$ is the change in displaced volume of the displacement vessel, $p_f$ is density of the water, and $F_g$ is the force of gravity. The change in displaced volume $\Delta V$ of the displacement vessel is calculated by taking the water plane area $A_{wp}$ of the displacement vessel multiplied by the change in depth of the water h, shown in Eqn. 2.

$$F_B = p_f * F_g * \Delta V \quad \text{(Eqn. 1)}$$

$$\Delta V = A_{wp} * h \quad \text{(Eqn. 2)}$$

As the displacement vessel rises with the tide, the force exerted on the directional converter will be constant over the distance that the displacement vessel rises to the water surface. Eqn. 3 shows an equation for the energy $E_1$ produced in Joules during the rising of the tide, where D is the distance that the water level rises.

$$E_1 = F_B * (D-h) \quad \text{(Eqn. 3)}$$

After the displacement vessel has traveled a distance D−h, the displacement vessel will be submerged a distance h under the water surface. As the displacement vessel continues to rise, the volume of water displaced by the displacement vessel will decrease linearly to zero, providing an average buoyant force $F_{avg}$ shown in Eqn. 4.

$$F_{avg} = \frac{1}{2} * p_f * F_g * V \quad \text{(Eqn. 4)}$$

Eqn. 5 shows an equation for calculating the expected energy produced in Joules as the displacement vessel rises above the surface of the water. Eqn. 6 shows the total energy $E_{total}$ produced from the rising of the displacement vessel is the sum of $E_1$ and $E_2$, $$E_2 = \frac{1}{2} * p_f * F_g * V * h \quad \text{(Eqn. 5)}$$

$$E_{total} = E_1 + E_2 \quad \text{(Eqn. 6)}$$

The maximum energy produced will occur when the derivative of $E_{total}$ with respect to h is equal to zero, giving a solution of h equal to D. Eqn. 7a shows an equation for the maximum energy $E_{max}$ produced by a displacement vessel if it is released when the tide is at its highest point. Because in many areas of the Earth, the ocean experiences 2 high tides and 2 low tides in a day, the displacement vessel may travel up to a peak height of high tide twice a day, as shown by Eqn. 7b.

$$E_{max} = \frac{1}{2} * p_f * F_g * A_{wp} * D^2 \quad \text{(Eqn. 7a)}$$

$$E_{max} = p_f * F_g * A_{wp} * D^2 \quad \text{(Eqn. 7b)}$$

Lastly, Eqn. 8 shows an equation to calculate expected power (P) in Watts for an individual displacement vessel, where $E_{max}$ is maximum energy and t is time.

$$P_{expected} = E_{max}/t \quad \text{(Eqn. 8)}$$

As an example of calculating the force generated by using the rising of the tide, using a density of 1026 kg/m³ for ocean water, and that a tide will raise or lower the displacement vessel by 20 m, a 100 m×100 m×10 m displacement vessel will produce expected energy of 4.03×10¹⁰ Joules according to Eqn. 7b. Using Eqn. 8, the expected power of one displacement vessel over the course of a 24 hour period is approximately 454 kW. A system of 100 similar displacement vessels would thus generate approximately 45.4 MW.

Energy Generation Using Drift/Drag

In another aspect of the present invention, the tidal energy conversion assembly utilizes drag forces caused by the ebb and flow of water during tidal action to generate energy. Additionally, the tidal energy conversion assembly may utilize drag forces caused by other currents or water flows to generate energy. The ebb and flow of water due to tidal action causes the tidal energy conversion assembly to drift laterally relative to a stationary location. The tidal energy conversion assembly may be substantially similar to the tidal energy conversion assemblies as described above and illustrated in FIG. 1A-1C, 2, or 4, which include at least one anchor cable attached to displacement vessel that has a directional converter and electrical power generator. Preferably, the directional converter and generator may be located away from the displacement vessel. Currents from the tide may cause the displacement vessel to drift in a horizontal or lateral direction relative to the stationary location and a length between the stationary location and the displacement vessel changes. As the directional converter is attached to the anchor cable, a force is exerted on the directional converter by the displacement vessel.

Figure 5A:
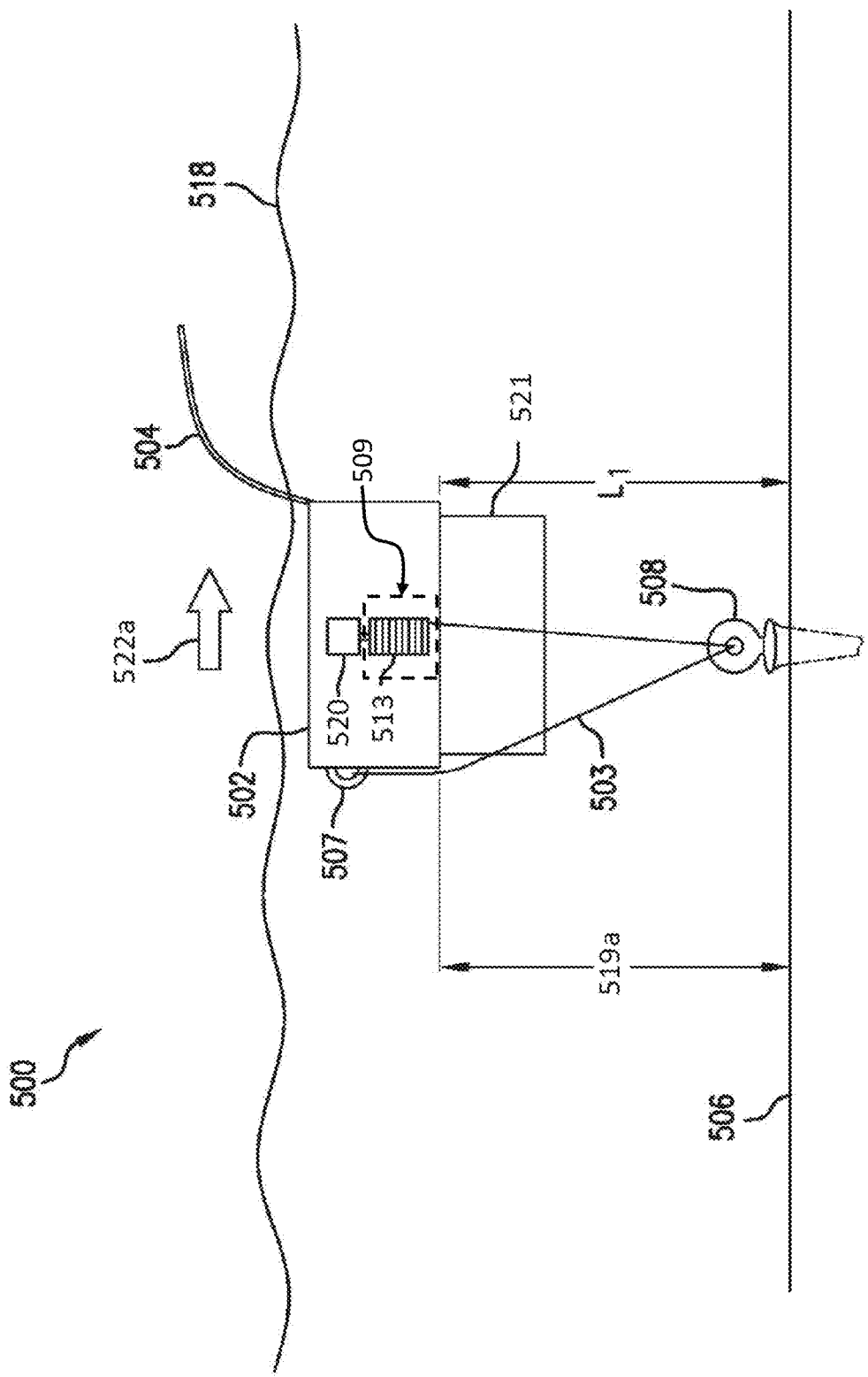
Figure 5B:
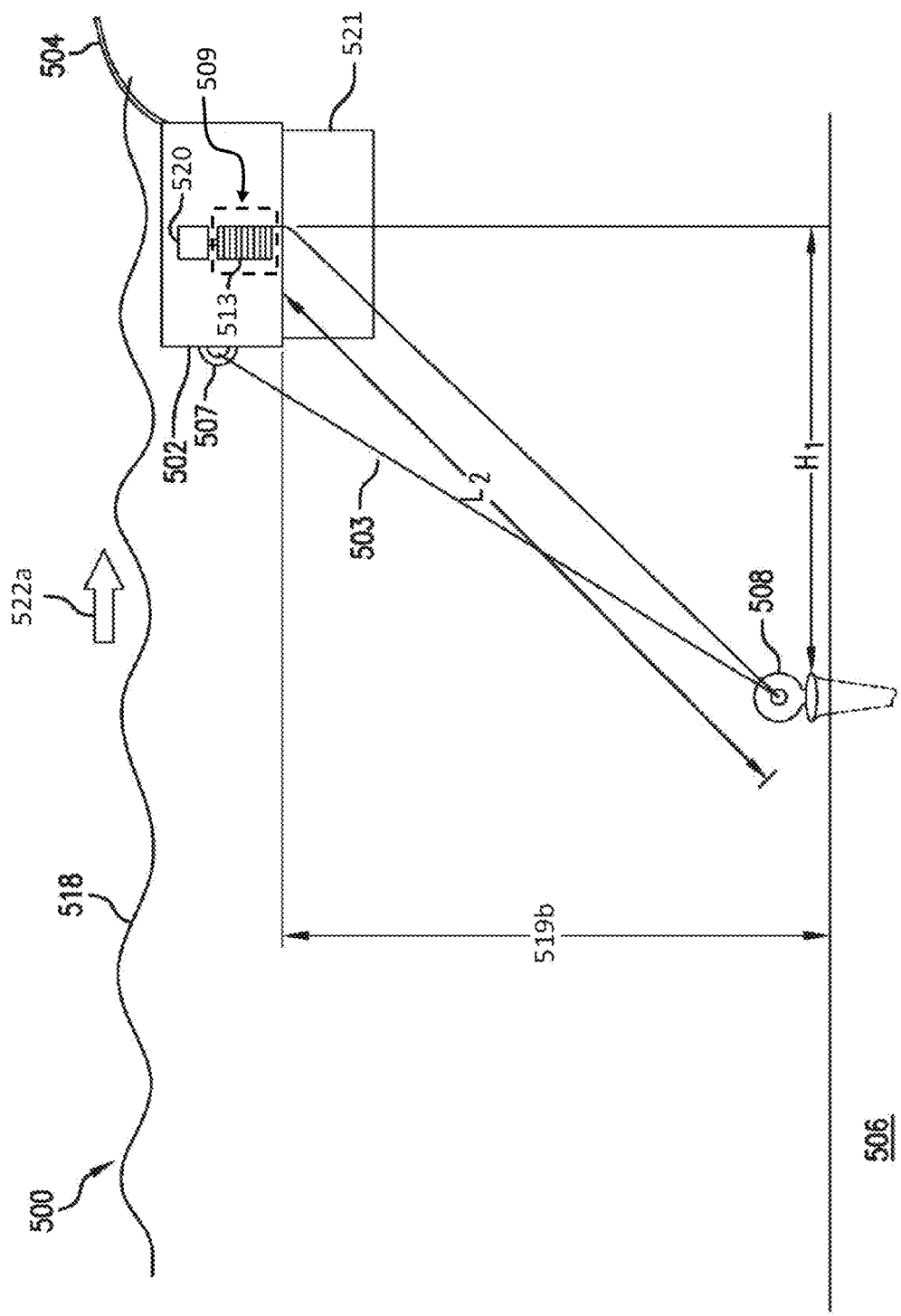

FIGS. 5A-5C show a tidal energy conversion assembly 500 having a displacement vessel 502 that is buoyant at the surface 518 of the water and houses or supports a directional converter 509. In this embodiment, the directional converter 509 is capable of capturing the drag—or "drift"—of the tidal energy conversion assembly caused by the ebb and flow of water due to tidal action. Generally, the tidal energy conversion assembly 500 may be substantially similar to the tidal energy conversion assemblies of any one of FIG. 1, 2, or 4. The displacement vessel 502 is anchored to the stationary location 506 at anchor 508 by anchor cable 503. The directional converter 509 and anchor cable 503 may comprise any of the embodiments described and shown above, for example, FIGS. 1A-1D and 6A. The displacement vessel 502 further includes an electric power generator for generating electricity from the drag and a wire 504 for outputting the electricity. In this embodiment, anchor cable 503 has a first end at latch 507 and a second end connected to directional converter 509, defining a length therebetween. Anchor cable 503 is threaded through the anchor 508 (which can be either a loop or a pulley).

Figure 5D:
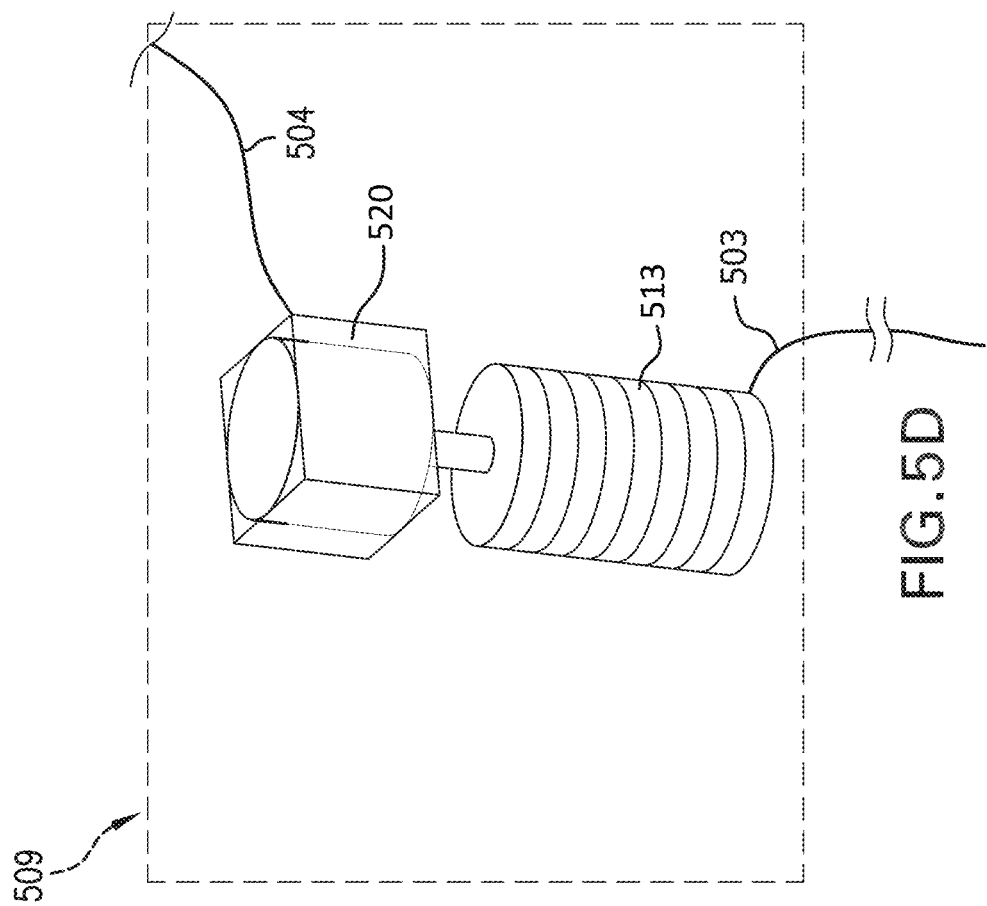
FIG. 5D shows an enlarged view of a directional converter comprising a drag energy converter.

In this embodiment, the directional converter 509 includes a drum 513 and control mechanism 520. FIG. 5D shows an enlarged view of the directional converter 509 configured for drag energy conversion.

In FIG. 5A, displacement vessel 502 is resting at a point directly above anchor 508 at a distance 519a above the anchor 508. Anchor cable 503 has a length $L_1$ from displacement vessel 502 to anchor 508. Tidal drag forces may shift displacement vessel 502 in a lateral direction 522a with respect to its original position. When the tide rises vertically as shown in FIG. 5B, displacement vessel 502 rises to a distance 519b, which is greater than distance 519a, and the tide pushes the displacement vessel 502 a lateral distance of $H_1$. The anchor cable 503 increases to a length of $L_2$ between the displacement vessel 502 and anchor 508. $L_2$ is greater than $L_1$ and 519b is greater than 519a. The increase in distance of $L_1$ to $L_2$ causes the drum 513 of the directional converter 509 to rotate. This rotation of the spindle can be transmitted to an electrical power generator to generate electricity. As the tide returns, the displacement vessel 502 returns to the position over anchor 508, for example, by the use of a positioning system on the displacement vessel 502. Slack in the anchor cable 503 may be brought into and stored within the displacement vessel 502 by a control mechanism 520, e.g., a motor or a spring coupled to the drum 513.

In FIG. 5C, the displacement vessel 502 is resting at a low point in the tidal cycle at a distance 519c between the displacement vessel 502 and the anchor 508. and anchor cable 503 has a length $L_3$ from the displacement vessel 502 to the anchor 508. When the tide falls vertically as shown in FIG. 5C, the tides drags the displacement vessel 502 a lateral distance of $H_2$ in direction 522b and the displacement vessel 502 falls vertically to a distance 519c. The length $L_3$ may increase in length due to the falling tide Where $L_3$ is greater than $L_1$, the increase in length from $L_1$ to $L_3$ causes the drum 513 of the directional converter 509 to rotate. The rotation can be captured by an electrical power generator to generate electricity. As the tide returns, the displacement vessel 502 returns to the position over anchor 508, for example, by the use of a positioning system on the displacement vessel 502. Any slack in the anchor cable may be returned to the drum 513 by a control mechanism 520.

In an aspect of the present invention, the displacement vessel 502 is capable of connecting, disconnecting, and/or reconnecting to different locations (e.g., different anchors) along the seabed as the displacement vessel drifts in a lateral direction relative to a first stationary location on the seabed. Initially, the displacement vessel 502 may be anchored to the first stationary location along the seabed by a first anchor cable attached to a first anchor. As the displacement vessel 502 moves in a lateral direction due to the ebb and flow of water during tidal action, the anchor cable 503 may disconnect from the first anchor and reconnect to a second location, such as a second anchor, along the seabed closer to the drifted-to location of the displacement vessel. To do so, the anchor cable may include a connection mechanism at an end of the anchor cable that connects the anchor cable to the first anchor attached to the seabed. The connection mechanism on the end of the anchor cable may disconnect from the first anchor, translate relative to the seabed via a linking mechanism, such as a guide cable or chain, and then reconnect to the second anchor. For example, the connection mechanism may include a latch, clip, pin, rolling mechanism, and/or lock. The connection mechanism may further include a control mechanism, such as a motor, to assist in the connecting, disconnecting, and/or reconnecting of the anchor cable to various locations on the seabed. The linking mechanism may reconnect the anchor cable to a second anchor (not shown) at the second location.

In another aspect of the invention, the displacement vessel 502 may include a drag panel 521 extending from one of the exterior surfaces of the displacement vessel 502. The drag panel 521 may enhance capture of tidal currents and/or allow for the additional capture of currents that occur deeper in the water, such as undertow. The additional drag that is captured by the drag panel 521 may provide additional forces that can be converted into mechanical energy by the directional converter and ultimately, electricity by the electrical power generator. For example, a drag panel 521 may be secured to a bottom side of the displacement vessel 502 and extend in a generally downwards direction. The drag panel 521 may be substantially parallel to a side of the displacement vessel or at an angle relative to a side of the displacement vessel. The drag panel 521 may extend along an entire width of the bottom surface of the displacement vessel or only a portion of the width. Furthermore, the drag panel 521 may include support structures, such as reinforcement bars, that may extend from the displacement vessel to any point on the drag panel 521.

The drag panel 521 may include a control mechanism such that the control mechanism may deploy and retract the drag panel 521 from the displacement vessel. For example, the drag panel 521 may be stored within the displacement vessel in a first stored position. The control mechanism may controllably deploy the drag panel 521 at a specified time, such as a time when strong current conditions exist, to a second deployed position. If the drag panel 521 is not needed, the control mechanism may retract the drag panel 521 back into the first position inside the displacement vessel. The first position may alternatively be a configuration where the drag panel 521 is substantially adjacent to a surface of the displacement vessel 502. The drag panel 521 may be deployed to the second position by rotation about a hinge, where the rotation is controlled by the control mechanism. The control mechanism may include hydraulics or an electric motor that may be powered by the energy generated by the displacement vessel 502.

In another embodiment of the invention, the directional converter may include a plurality of drums and a plurality of anchor cables to utilize the lateral motion in multiple directions to generate electricity. The plurality of drums and the plurality of anchor cables may be employed in various orientations in the displacement vessel or outside the displacement vessel such that as one cable unwinds from one drum and operates the electrical power generator, another cable is rewound on a different drum prepping for the next tidal cycle. In this way, a first drum may be engaged with the electrical power generator to produce electricity when the displacement vessel drifts in one direction, and a second drum may be engaged to produce electricity when the displacement vessel drifts in a different direction. This particular configuration of multiple drums housed within or outside the displacement vessel and multiple anchor cables fixed at various locations along the seabed or on land may allow the displacement vessel to take advantage of the lateral motion of the displacement vessel in multiple lateral directions due to the ebb and flow of the water during tidal action. Alternatively, the two drums may be operatively coupled such that the second cable may be automatically rewound on its drum as the cable on the first drum is unwound and thus be ready for unwinding as the displacement vessel moves in the other/opposite direction.

For example, two drums—each attached to at least one anchor cable—may be disposed in the displacement vessel such that as the displacement vessel moves laterally in a first direction, a first anchor cable unwinds from the first drum causing the first drum to rotate while a second anchor cable (fixed to a second stationary location) may be reeled into a second drum by, for example, a control mechanism (for example, a spring or motor). The rotation of the first drum due to the first anchor cable unwinding is transferred to an electrical power generator to generate electricity as the displacement vessel moves in the first lateral direction. As the ebb and flow of the water during tidal action cause the displacement vessel to drift in a second lateral direction, the second anchor cable is unwound from the second drum causing the second drum to rotate as the first anchor cable is reeled back into the first drum by a control mechanism as described above. The rotation of the second drum is transferred to the electrical power generator which generates electricity as the displacement vessel moves in the second lateral direction. The second anchor may be reeled back into the second drum when the displacement vessel moves again in the first direction. Thus, electric power can be generated during both general directions of travel.

Figure 22:
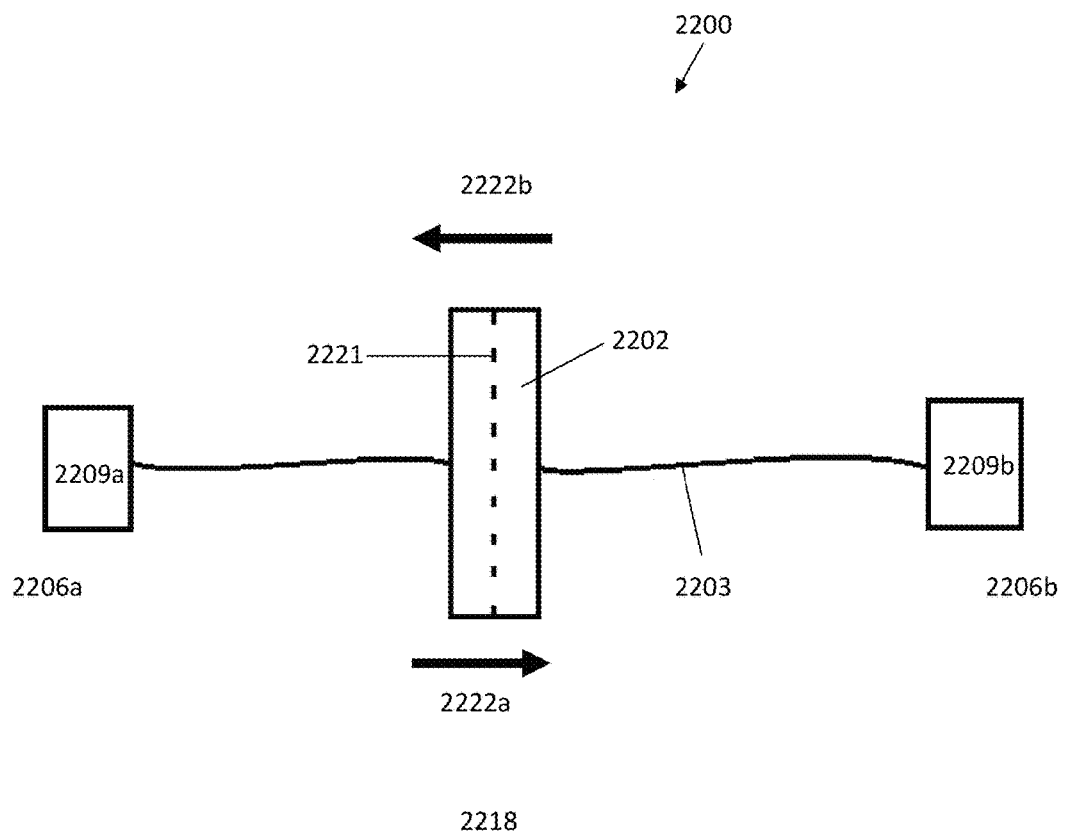
FIG. 22 shows a tidal energy generation system configured to capture drag in two directions of water flow.

FIG. 22 illustrates the general approach to dual-direction power generation according to the invention wherein a displacement vessel is located between two generally fixed positions in an area of tidal action, with at least one generator and at least one directional converter mounted on one of the vessel or either fixed positions. This dual-direction power generation approach may allow for twice the electrical generation capacity compared to other single direction power generation embodiments. In one embodiment, a generator is mounted to the displacement vessel 2202 and coupled to first 2206a and second 2206b stationary locations via two directional converters such that the generator turns in one direction as the tidal action causes the vessel to move towards the first stationary location 2206a and the generator spins in the opposite direction as the tidal action causes the vessel to move towards the second stationary location 2206b and thus generate electrical power during both the ebb and the flow segments of every tidal cycle. In this embodiment, the generator may be coupled to two drums that can spin the generator in either rotational direction. The coupling between the generator and the drums may include a pair of cables, where each cable is secured at one of its ends to one of the stationary locations and wrapped at the opposite ends to one of the generator drums but in opposite clockwise manner. As the displacement vessel 2202 moves in the first direction, the generator spins in a first rotational direction, and as the displacement vessel 2202 moves in the opposite direction, the generator spins in the opposite rotational direction with the result that (except for slack tides) the generator is essentially constantly producing electrical power.

In yet another embodiment, a generator and directional converter may be mounted to a first stationary location and coupled to both the vessel and the second stationary location such that as tidal action causes the displacement vessel 2202 to move in the first direction, the generator and directional converter spins in one rotational direction, and as the tidal action causes the displacement vessel 2202 to move in the opposite direction, the generator and directional converter spins in the opposite rotational direction, and thus generate electrical power during the entire tidal cycle (i.e., the ebb and the flow). Here, again, the generator has two drums and a cable runs from one drum to a fixed point secured to the vessel and thence to a drum (or like rotational mechanism) on the second stationary location and thence to the other generator drum. The cable ends are wound in opposite directions around their respective generator drums to cause the generator to spin in opposite directions as the displacement vessel 2202 moves in one direction and the other direction.

In yet another embodiment, a generator and directional converter may be mounted to each of the stationary locations and coupled to the displacement vessel 2202 such that as the tidal action causes the displacement vessel 2202 to move in a first direction, it causes both generators to spin and generate electrical power, and as the tidal action causes the displacement vessel 2202 to move in the opposite direction, it causes both generators to spin (in opposite rotational directions relative to their rotations during displacement vessel 2202 movement in the first direction, but not necessarily relative to each other) to generate electrical power during the entire tidal cycle. In this version, a single cable is fixed at both ends to the vessel and wrapped around the drums of both directional converters to spin both of them during any movement of the displacement vessel 2202. In this embodiment, the result could be twice the electrical power generation during each tidal cycle.

Thus, tidal energy generation assembly 2200 has two directional converters 2209a and 2209b disposed on opposite stationary locations 2206a and 2206b and an anchor cable 2203 connecting the two directional converters 2209a and 2209b to a displacement vessel 2202. In FIG. 22, the displacement vessel 2202 includes a drag panel 2221 and generates electricity when traveling in a first direction 2222a due to the flow of water 2218 by unwinding a drum that is coupled to an electric generator in the first directional converter 2209a. When the tide changes the direction of water 2218 flow, the displacement vessel 2202 may travel in a second direction 2222b that is opposite to the first direction. The displacement vessel 2202 also generates electricity when traveling in the second direction 2222*b* by unwinding a drum that is coupled to an electric generator in the second directional converter 2209*b*.

Figure 6B:
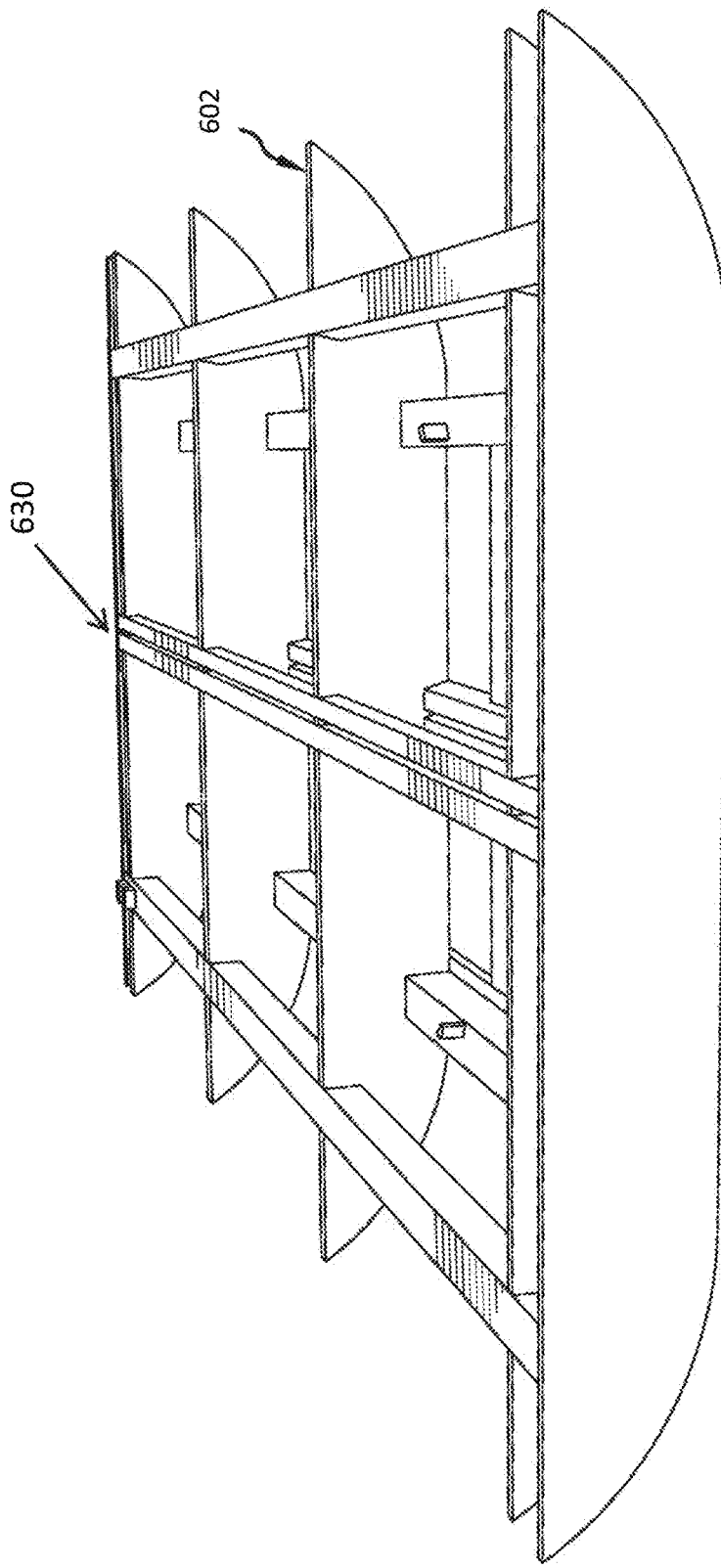
FIG. 6B shows a displacement vessel frame.

FIG. 6B illustrates a displacement vessel frame 602 suitable for energy generation using drift or drag as described above and in related to 5A-5C. Displacement vessel frame 602 may be used in conjunction with the directional converter, such as the directional converter 609 shown in FIG. 6A. Displacement vessel frame 602 may include a buoyancy mechanism such that it may be configured, as is known in the art, to float at the surface of the water and hold the directional converter 609 shown in FIG. 6A. The displacement vessel frame 602 may include a waterproof skin using materials conventional in the art to protect the frame from the ocean environment. Displacement vessel frame 602 includes a streamlined hull and may include a drag panel extending through slot 630 from the bottom of the displacement vessel frame 602. The drag panel will function similarly to the drag panel described above in relation to FIGS. 5A-5C.

Figure 6C:
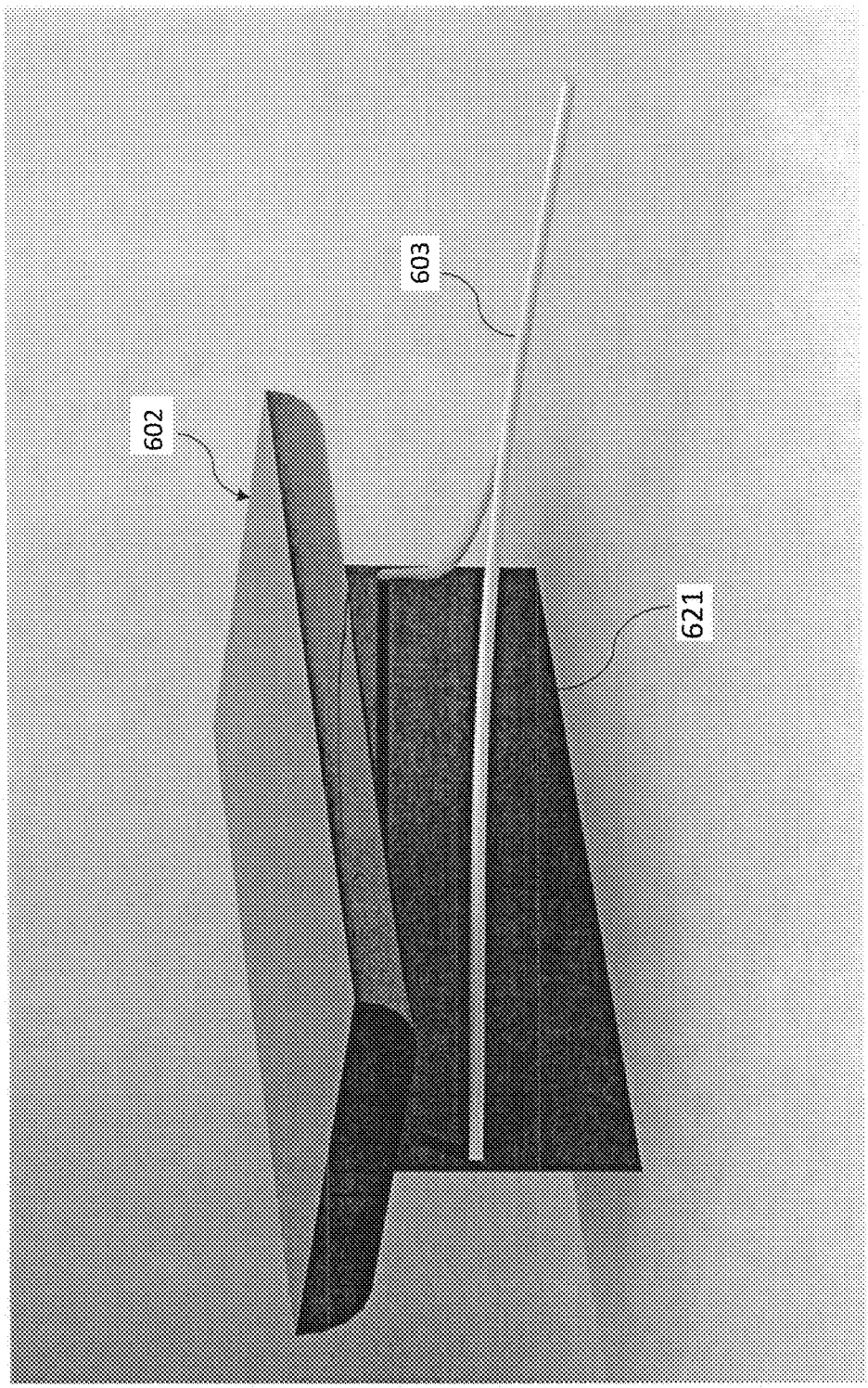
FIG. 6C shows a displacement vessel having a skin.

FIG. 6C shows a displacement vessel 602 having a skin. Displacement vessel 602 may include a structure or frame as described above with respect to FIG. 6B that is covered with a waterproof skin. The skin may be made of a metal, composite, polymer, or any other suitable material that can withstand the ocean environment and drag forces from the ebb and flow of water due to tidal action. Displacement vessel 602 further includes a drag panel 621 as described above with respect to FIGS. 5A-5C. In this embodiment, an anchor cable 603 is connected to the drag panel 621 at both sides of the drag panel 621. The location along the drag panel 621 where the anchor cable 603 is connected may correspond to a center of mass of the displacement vessel 602, such that when a current causes the displacement vessel 602 to drift, the displacement vessel 602 will remain relatively stable in the water while maintaining a force on the anchor cable 603. The other end of the anchor cable 603 may be coupled to at least one directional converter and at least one generator as described above. The directional converter and the generator may be located on land or on a platform in the ocean, as will be described in more detail with respect to FIGS. 8 and 9.

Figure 7:
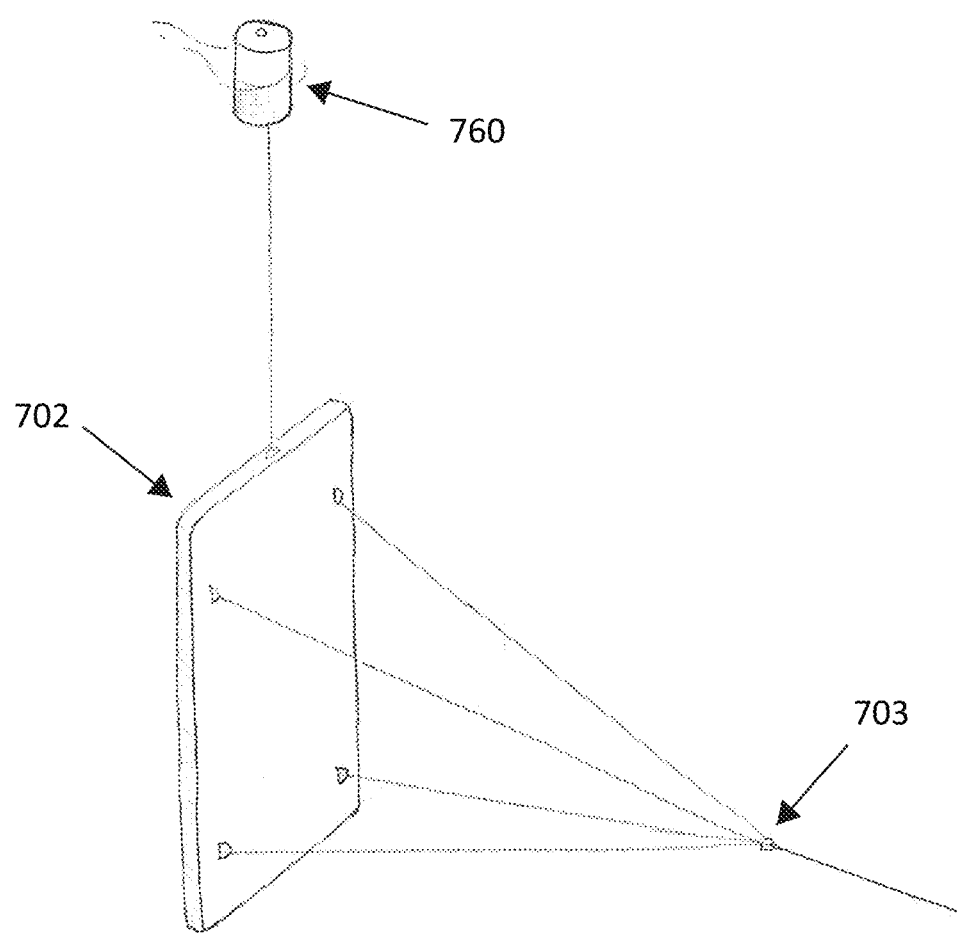
FIG. 7 shows a displacement vessel that is itself a drag panel.

In another embodiment, as shown in FIG. 7, the displacement vessel 702 may itself be a drag panel (for example, without the displacement vessel frame shown in FIG. 6B). For example, the displacement vessel 702 may be a hollow plate, having a ballast with a density that is less than that of water such that the hollow-plate displacement vessel remains buoyant in the water. The ballast may be a subsea ballast fixed to the displacement vessel 702 to generate additional buoyant forces to keep the displacement vessel afloat. In an embodiment, the buoyant force generated by the displacement vessel 702 may be approximately equal to the weight of the displacement vessel 702 such that the displacement vessel 702 remains buoyant at an elevation above the bay/ocean floor. The displacement vessel 702 may be attached to an anchor cable 703 in any configuration (for example, as at the corners of the displacement vessel) such that displacement vessel 702 remains captures the forces caused by the ebb and flow of water. Two or more such displacement vessels may be connected together by, for example, welding to create a larger displacement vessel, to any size as desired. If two or more such displacement vessels are connected together, the two or more displacement vessels may be spaced apart by, for example, struts to define a gap or window in the displacement vessel.

The displacement vessel 702 may include a floatation device 760 configured to indicate the location of the displacement vessel 702, provide GPS information, and/or provide additional buoyant forces. The displacement vessel 702 or floatation device 760 may include a processing or logic module configured to transmit information about the tidal energy conversion assembly to an operator. For example, the processing or logic module may record data corresponding to current speed, displacement vessel speed, displacement vessel location, efficiency of the system, and buoyancy forces. The processing module may be coupled to a transmitter located, for example, on the displacement vessel or floatation device 760, such that the processing module may transmit the recorded data to an operator using the transmitter. The transmitter may be a wireless transmitter/receiver as is known in the art.

Figure 8:
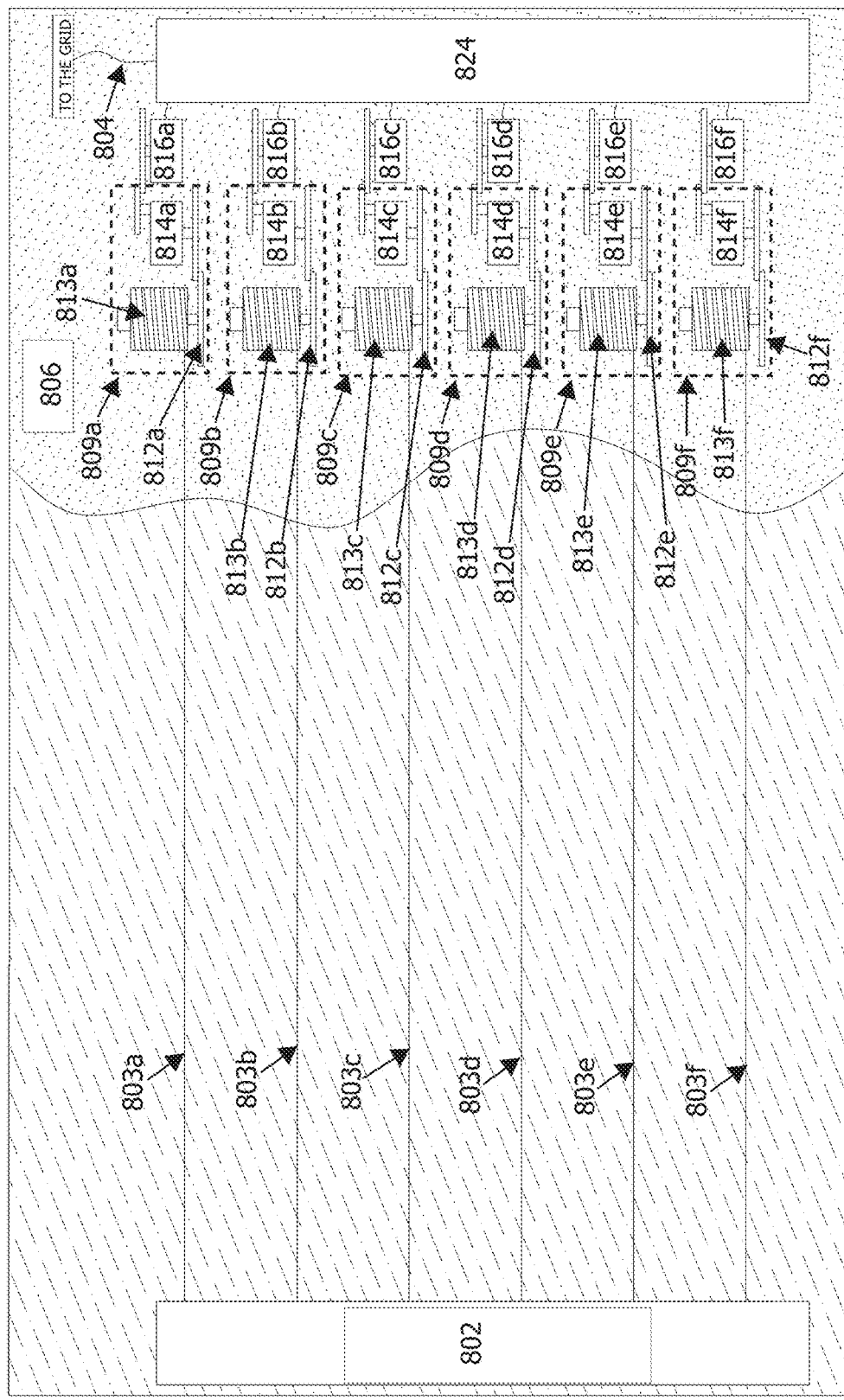
FIG. 8 shows a displacement vessel having an array of directional converters and generators on land.

FIG. 8 shows a displacement vessel 802 having an array of directional converters 809*a*-809*f* and generators 816*a*-816*f* at a stationary location 806. In this embodiment, one displacement vessel 802 is coupled to a plurality of anchor cables 803*a*-803*f* and each anchor cable is coupled to a respective directional converter 809*a*-809*f* that is fixed at a stationary location 806. As an example, the stationary location 806 may be land, a pier, a platform in the ocean anchored to the ocean floor, or the ocean floor. In FIG. 8, the stationary location is the shore (land) adjacent the body of water in which the displacement vessel is located. Moreover, after consideration of the present disclosure, one of skill in the art will recognize that the stationary location may any suitable plot of land or on a mobile location, such as an area further inland or on a crane to provide, among other advantages, protection against flooding and waves caused by storms. The directional converters described herein can thus be positioned at any suitable stationary location such that one or more anchor cables can couple the directional converter(s) to one or more displacement vessels in the water.

Each of directional converters 809*a*-809*f* may be substantially similar to the directional converters described above. For example, each directional converter 809*a*-809*f* may include a drum 813*a*-813*f* around which the respective anchor cable 803*a*-803*f* is wrapped. Further, each directional converters 809*a*-809*f* may be independently engaged (or disengaged) with respect to the movement of the displacement vessel 802 to generate electricity. As the ebb and flow of tidal action causes the displacement vessel 802 to drift away from the stationary location 806, each anchor cable will exert a force on the respective drums 813*a*-813*f*, causing the drums 813*a*-813*f* to rotate. The drums 813*a*-813*f* are fixed on axles including drive gears 812*a*-812*f*, and the drive gears 812*a*-812*f* are coupled to gear boxes 814*a*-814*f*, which may be substantially similar to the gear box as described above. As the drums 813*a*-813*f* rotate and are engaged, the drive gears 812*a*-812*f* may rotate and transfer mechanical power to the gear boxes 814*a*-814*f* The engaged gear boxes 814*a*-814*f* may convert input RPM from the drive gears 812*a*-812*f* to a different RPM output to be transmitted to generators 816*a*-816*f* The engaged gear boxes 814*a*-814*f* are coupled to the generators 816*a*-816*f*, which may be, for example, fixed magnet generators as described above. The engaged gear boxes 814*a*-814*f* transmit the mechanical power to the generators 816*a*-816*f* to produce electrical power that may be stored in a storage facility 824, which may include one or more batteries. The electrical power may be transmitted via a wire 804 to an electrical grid such that it may be distributed to a consumer to be consumed. When one directional converter is disengaged the respective drum may still rotate upon the movement of the displacement vessel and anchor cable, but the drive gears, gear boxes or generators may be positioned and disengaged such that no electricity is produced by that respective generator.

As the ebb and flow of tidal action causes the displacement vessel 802 to drift back towards the stationary location 806, a control mechanism may reel in the excess slack on the anchor cables 803a-803f. The control mechanism may be substantially similar to the control mechanism described above. For example, the control mechanism may be a spring or motor that is coupled to the drums 813a-813f.

In one embodiment, each of the generators 816a-816f may have similar or different electrical output ratings. For example, each of generators 816a-816f may have an electrical output rating of 15 kW at 125 RPM. Alternatively, each of generators may have different electrical output ratings. For example, the generators 816a-816f may have different electrical output ratings at 1 kW, 5 kW, 10 kW, 15 kW, 20 kW, and 25 kW. In another example, the generators 816a-816f may have similar electrical output ratings of 15 kW.

As a generator array, one or more generator(s) (or directional converters) may be engaged while other generators (or directional converters) may be disengaged. In lower current speeds, a smaller number of generators 816a-816f may be engaged to generate electrical power while in faster current speeds, more generators 816a-816f may be engaged to produce electrical power. Such an array permits one displacement vessel to generate an amount of electricity that is directly proportional to the tidal forces acting upon the displacement vessel, and not limited to the generating potential of a single generator. While FIG. 8 shows six generators coupled to displacement vessel 802, this invention is not limited to this number of generators, and any suitable number of generators may be coupled to the displacement vessel, depending on the size of the displacement vessel, the expected strength of the tides and the available area of the stationary location.

In another embodiment, the displacement vessel may be locked at a particular distance away from the stationary location through a locking mechanism as described above, while at least one or more generators are engaged throughout the tidal cycle. The locking mechanism may be released by, for example, a control mechanism, to allow the displacement vessel to drift horizontally relative to the stationary location when the control mechanism determines that a fast enough current is present to move the displacement vessel at a desired speed to generate electricity. It is understood that as the current speed caused by the ebb and flow of water due to tidal action varies, the amount of electricity generated by the tidal energy conversion assembly may also vary. The currents caused by the ebb and flow of tidal action generally vary in a sinusoidal pattern and thus the amount of electricity generated may also vary in a similar manner. One of skill will recognize that the number of generators engaged or the rate at which the engaged generators will rotate may vary as the speed of the currents and/or the rise and fall of the tide vary throughout the tidal cycle.

Figure 9:
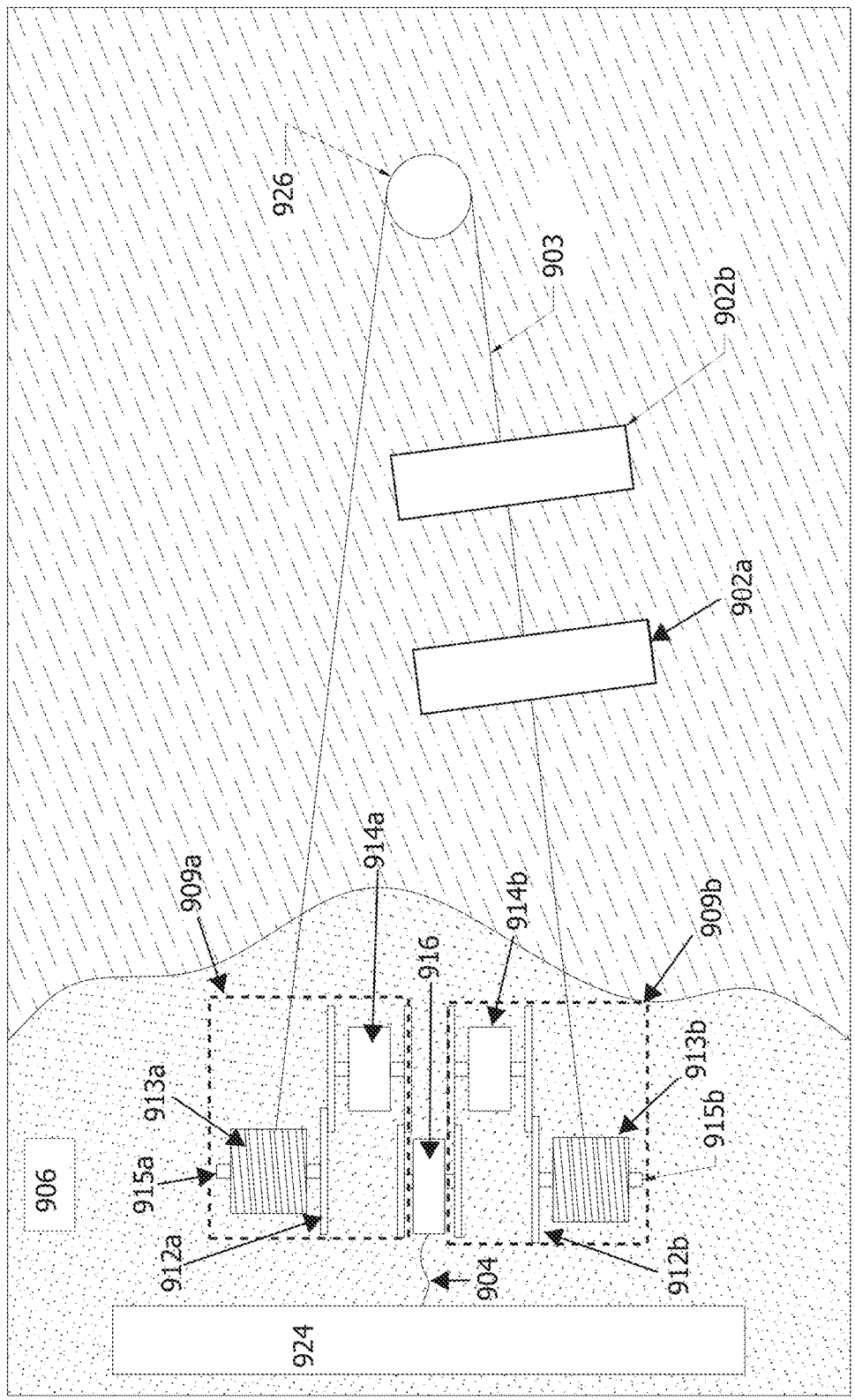
FIG. 9 shows a displacement vessel having an array of directional converters on land and a pulley arrangement.

FIG. 9 shows displacement vessels 902a and 902b having two directional converters 909a and 909b on land and a pulley arrangement 926, the two directional converters attached to a single generator 916. The displacement vessels 902a and 902b may be substantially similar to the displacement vessel described above with respect to FIGS. 5A-5C, 6C, and 8. Each of displacement vessels 902a and 902b is coupled to an anchor cable 903 that is looped around a pulley arrangement 926 located in the ocean away from the stationary location 906. The pulley arrangement 926 may include a pulley fixed on an axle, such that the anchor cable 903 may be threaded through the pulley and may translate with little resistance. The axle and pulley of the pulley mechanism may be fixed to a platform or other structure in the ocean. The anchor cable 903 is connected at a first end to a directional converter 909a and at a second end to directional converter 909b. The directional converters are substantially similar to those described above and include drums 913a and 913b fixed to axles 915a and 915b which include drive gears 912a and 912b. The drive gears 912a and 912b are operatively coupled to gear boxes 914a and 914b and the gear boxes 914a and 914b are operatively coupled to a generator 916. The generator 916 may be connected to a storage facility 924 or directly connected to an electrical power grid via a wire 904.

As the ebb and flow of tidal action causes the displacement vessels 902a and 902b to drift laterally toward the stationary location 906 in a first direction, the anchor cable 903 exerts a force on the first directional converter 909a, causing the first directional converter 909a to transmit mechanical power to a generator 916 to generate electrical power. The second directional converter 909b may reel in any excess slack in the anchor cable 903 by using, for example, a control mechanism similar to that described above. As the ebb and flow of water due to tidal action causes the displacement vessels 902a and 902b to drift in a second, different lateral direction away from the stationary location 906, the anchor cable 903 exerts a force on the second directional converter 909b, causing the second directional converter 909b to transmit mechanical power to the generator 916 to generate electrical power. In this way, the pulley arrangement 926 allows for electrical power to be generated using both the ebb and flow of water due to tidal action or other currents. In an alternative embodiment, the second directional converter 909b may be operatively couple to a second generator (not shown). The second generator may have a similar or different electrical out rating as the first generator 916.

In an alternative embodiment of FIG. 9, the anchor cable may be continuous loop (rather than an anchor cable having two ends). In this embodiment, the directional converters are axles (rather than drums) around which the anchor cable is wound. As the displacement vessel drifts toward or away from the stationary location, pulling upon one direction of the anchor cable, the anchor cable is configured to turn the axle, and such movement of the axle is configured to energize one or more generators.

In another embodiment, at least part of the anchor cable 903 may be submerged under the water, such as at a desired operating depth of the displacement vessel, for example. In this embodiment, the anchor cable may be attached at the proximal end to a stationary location on land and operatively coupled to a directional converter and generator. From this proximal end, the distal portions of the anchor cable 903 (including the distal end of the anchor cable 903) may be submerged by being threaded through one or more connections, such as an anchor or pulley that is located under the water at, for example, the bay/ocean floor or a submerged platform. After the anchor cable 903 is threaded through the connection, the displacement vessel may be coupled at any point along the distal portion of the anchor cable 903 or at the distal end of the anchor cable 903. As the displacement vessel moves in a first lateral direction relative to the stationary location, anchor cable 903 may be activated to generate electricity as described above. The displacement vessel may be attached to a plurality of submerged anchor cables that are as described above. The proximal ends of such other submerged anchor cables may be attached to other stationary locations and operatively coupled to other directional converters and/or generators at such stationary locations. As the displacement vessel moves in another lateral direction relative to the stationary location, such other anchor cables may be activated to generate electricity. Each directional converter may include a control mechanism for rewinding the cable, as discussed above.

In yet another embodiment, the displacement vessel may be attached to the distal end of the submerged first anchor cable 903 and the distal end of a submerged second anchor cable, where the submerged first anchor cable 903 extends in one direction away from the displacement vessel and the submerged second anchor cable extends in the opposite direction away from the displacement vessel. As the submerged second anchor cable extends away from the displacement vessel, the distal portion of the second anchor cable may be threaded through a pulley that returns such submerged second anchor cable toward the displacement vessel and the submerged first anchor cable 903, and the proximal end of the submerged second anchor cable is attached to the same stationary location as anchor cable 903. The proximal end of the second anchor cable may be operatively coupled to the same or different directional converter and generator as the anchor cable 903 at the stationary location. In this arrangement, energy may be produced by the drag forces produced on the displacement vessel while the tide is both ebbing and flooding, because the first submerged anchor cable will be engaged as the tide ebbs, and the second submerged anchor cable will be engaged as the tide floods.

Figure 10:
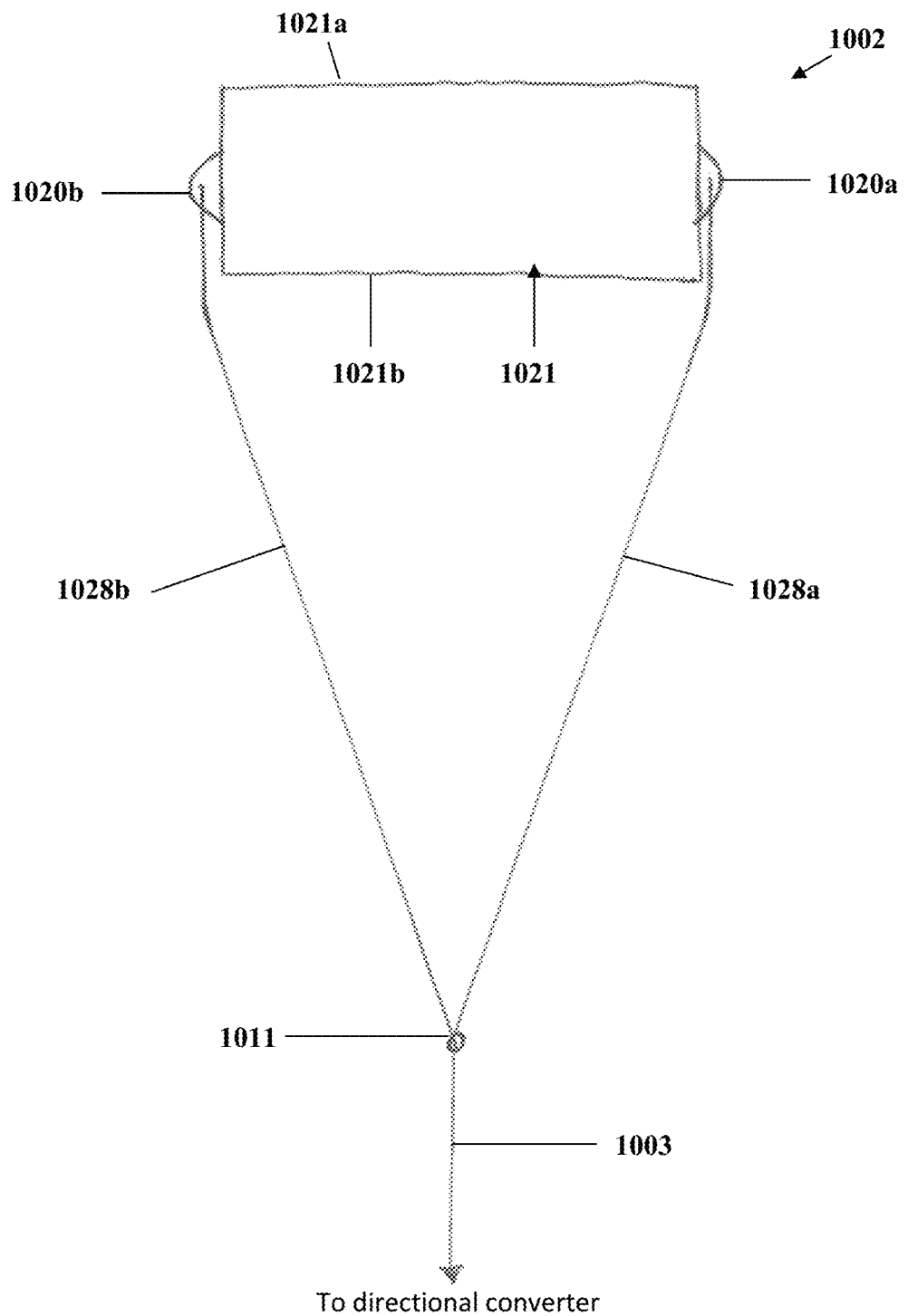
FIG. 10 shows a bottom view of a displacement vessel, according to another aspect of the invention.

FIG. 10 shows a bottom view of displacement vessel 1002 that is adapted to be rotatable, as indicated above and as further explained below. The displacement vessel 1002 may be adapted to float in the water by way of a floatation device as described above and below. The displacement vessel 1002 includes a drag panel 1021 having a first side 1021*a* and a second side 1021*b* that are adapted to capture drag forces from the flow of water due to tidal action and/or other water flows. The first side 1021*a* and second side 1021*b* are shown as substantially flat, but may be adapted to have any suitable shape to enhance (or reduce) the capture of drag forces as will be described in more detail below.

To illustrate the general case of controlling the angle according to one aspect of the invention, the displacement vessel 1002 further includes control cables 1028*a* and 1028*b* extending from the drag panel 1021 adapted to controllably adjust the orientation of the drag panel 1021 in the water. The control cables 1028*a* and 1028*b* may be coupled to an anchor cable 1003 at one end via a coupling mechanism 1011 and the anchor cable 1003 may be further connected to a directional converter and a generator at a stationary location, as described above. Each control cable 1028*a* and 1028*b* may also be coupled at another end to a/an adjustment/control mechanism (indicated generally as 1020*a* and 1020*b*) mounted on or within the displacement vessel 1002, such as a motor and drum assembly or a winch, for example. Each control mechanism 1020*a* and 1020*b* may independently wind up and/or release its respective control cable to effect rotation of the displacement vessel in the water. For example, a first control mechanism 1020*a* may wind up (or shorten) control cable 1028*a* while a second control mechanism 1020*b* releases (or lengthens) control cable 1028*b*, thus rotating the displacement vessel 1002 in a clockwise direction and controllably adjusting the amount of drag force exerted on the drag panel 1021. The first control mechanism 1020*a* and second control mechanism 1020*b* may also rotate the displacement vessel 1002 in the opposite (counterclockwise) direction by the reverse operation, i.e., the first control mechanism 1020*a* may release control cable 1028*a* and the second control mechanism 1020*b* may wind up control cable 1028*b*. Those skilled in the art will hereby also recognize that a single motor/drum or winch can be used with the cables mounted in opposite directions and that as the drum/winch turns, one cable is unwound and the other cable is wound. By providing a displacement vessel 1002 that is capable of rotating in the water to controllably adjust the drag force exerted on the drag panel 1021, the amount of electricity generated by the generator may also be controllably adjusted.

In another embodiment, the drag panel may be coupled to the displacement vessel such that the drag panel may swivel about an axis of the displacement vessel. In this embodiment, the control cables may be coupled to the drag panel to rotate the drag panel without rotating the entire displacement vessel. Alternatively, a control mechanism such as a motor may be coupled to the axle on which the drag panel is fixed to control the rotation of the drag panel. In yet another embodiment, the displacement vessel may include multiple drag panels extending into the water from the bottom surface of the displacement vessel. In this embodiment, each drag panel may be fixed to an axle such that the drag panel may rotate. A control mechanism may be coupled to each axle to control the rotation of each individual drag panel.

Figure 11A:
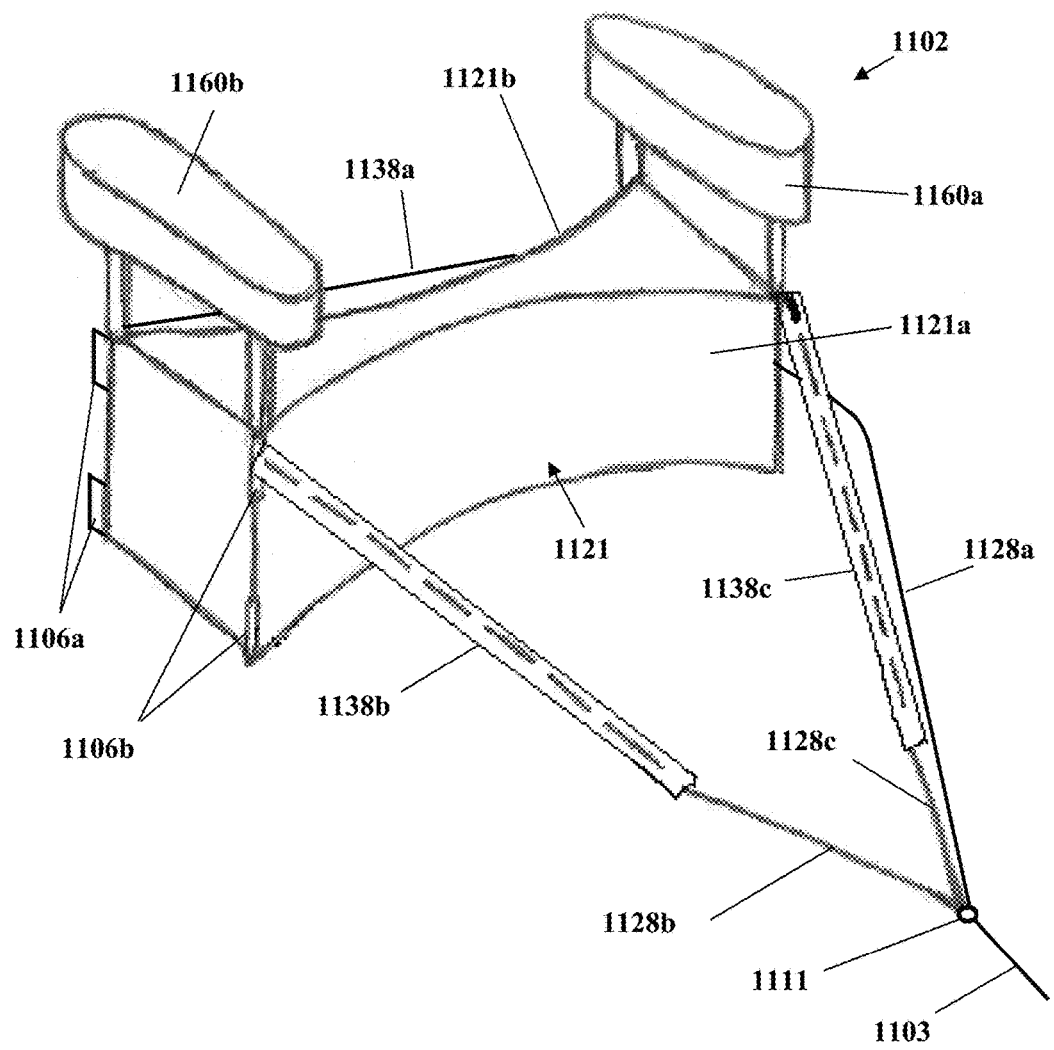
FIG. 11A shows an isometric front view of a displacement vessel, according to the aspect described with respect to FIG. 10.

FIG. 11A shows an isometric front view of a displacement vessel 1102 that is adapted to be rotatable and has an alternate surface shape, as indicated above and as further explained below. The displacement vessel 1102 includes a drag panel 1121 supported by floatation devices 1160*a* and 1160*b*. The floatation devices 1160*a* and 1160*b* may be similar to the floatation devices as described above with respect to FIG. 7 and may be configured to float at or near the surface of the water such that the drag panel 1121 is disposed at a specified distance below the surface of the water such that it may capture drag forces from water flow. In this embodiment, the drag panel 1121 includes a first side 1121*a* and a second side 1121*b* that each have a non-flat shape. In an example, as shown in FIG. 11A, the drag panel 1121 includes a parabolic or concave shape on sides 1121*a* and 1121*b* to enhance the capture of drag forces from tidal action and/or tidal currents more effectively than might be achieved by a flat panel. One of skill in the art will understand from the foregoing that sides 1121*a* and 1121*b* of the drag panel 1121 may include other suitable shapes to enhance (or reduce) capture of drag forces exerted on the drag panel 1121.

The drag panel 1121 may be made of a fabric, metal, composite, amorphous metal alloy, or polymer. In an embodiment of a displacement vessel configured to operate where tidal currents are relatively slow, a fabric drag panel may be sufficient. In other embodiments where tidal currents are stronger, a metal or polymer drag panel may be preferred.

The displacement vessel 1102 of FIG. 11A-11D is shown with arms 1138*a*-1138*c*. Any suitable number of arms may be used on the displacement vessel, or the displacement vessel may have no arms at all. In the embodiment shown in FIGS. 11A-11D, arm 1138*a* may be coupled to the drag panel 1121 via hinges 1106*a* that allow the arm 1138*a* to swing about the drag panel 1121. Arm 1138*b* may similarly be coupled to the drag panel 1121 via hinges 1106*b* and may be disposed on an opposite side of the drag panel 1121 from arm 1138*a*. A third arm 1138*c* may be coupled to another side of the drag panel 1121 via hinges similar to those described above for arms 1138*a* and 1138*b*. The arms 1138*a*-1138*c* (shown conceptually in FIGS. 11A-11D) may have substantially the same length $D_1$ as the drag panel 1121, or may be longer or shorter than length $D_1$. Preferably, arms 1138*a* and 1138*b* have lengths such that they are each longer than length $D_1$ and arm 1138*c* has a length such that it is longer than length $D_2$. The hinges 1106*a*-1106*c* allow for the arms 1138*a*-1138*c* to swing about the displacement vessel 1102 as the displacement vessel 1102 changes its orientation in the water relative to the anchor cable 1103. The use of multiple arms with cables encapsulated within will serve to minimize wear on the cables, avoid tangles of the cables, and/or prevent a cable from dropping below the barge or displacement vessel.

The arms 1138*a*-1138*c* house control cables 1128*a*-1128*c*, respectively, which are coupled at one end to an anchor cable 1103 via a coupling mechanism 1111 at a first end of the anchor cable 1103 and are coupled at the other end to a control mechanism that may reside on or within the displacement vessel, as described in more detail below. The coupling mechanism 1111 may include, for example, a metal ring, latch, clip, cable loop, or any other suitable coupling device for connecting the control cables 1128*a*-1128*c* to the anchor cable 1103. The anchor cable 1103 is further coupled to a directional converter, as described above with respect to FIGS. 8 and 9, at a second end of the anchor cable 1103. As also described above, the directional converter may be operably coupled to a generator and both the directional converter and the generator may be located at a stationary location, such as land or a barge. Any of the anchor cables, directional converters, and/or generators described above and below may be used with the displacement vessel 1102.

In an embodiment of the displacement vessel 1102 having arms, each control cable 1128*a*-1128*c* may reside (partially or totally) within its respective arm 1138*a*-1138*c* through a conduit (described in further detail below with respect to FIGS. 12A-12C). As can be seen in FIGS. 11A-11D, the control cables 1128*a*-1128*c* (shown in part as dotted lines) pass through the arms 1138*a*-1138*c* to couple at one end to control mechanisms 1120*a*-1120*c* respectively. The control mechanisms 1120*a*-1120*c* may reside on or within the displacement vessel and may be adapted to wind up and/or release the control cables 1128*a*-1128*c* to rotate the displacement vessel 1102 in the water. Each control mechanisms 1120*a*-1120*c* may independently wind up and/or release its respective control cable to change a distance between an end of the displacement vessel and the anchor cable 1103, causing rotation of the displacement vessel 1102 in the water. For example, a first control mechanism 1120*a* housed within the displacement vessel 1102 may wind up control cable 1128*a* while a second control mechanism 1120*b* housed within the displacement vessel 1102 may release control cable 1128*b* to change the displacement vessel 1102 orientation in the water and rotate the displacement vessel 1102 clockwise. Alternatively, the first control mechanism 1120*a* may unwind/release control cable 1128*a* while the second control mechanism 1120*b* may wind up control cable 1128*b* to change the displacement vessel 1102 orientation in the water and rotate the displacement vessel 1102 counter-clockwise. An operator may change the displacement vessel 1102 orientation in the water to adjust the amount of drag force exerted on the drag panel 1121, controllably adjusting the amount of electricity ultimately generated.

In an embodiment, the arms 1138*a* and 1138*b* may be longer than length $D_1$ such that the control cables 1128*a* and 1128*b* may extend away from either side of the drag panel 1121 and connect to the anchor cable 1103 without contacting the surfaces of drag panel 1121. Similarly, arm 1138*c* may extend past length $D_2$ such that anchor cable 1128*c* may extend away from either side of the drag panel 1121 and connect to the anchor cable 1103 without contacting the surfaces of the drag panel 1121. This configuration may be particularly useful to prevent the control cables 1128*a*-1128*c* from contacting the drag panel 1121 during operation and/or causing frictional wear on the control cables 1128*a*-1128*c*.

While FIGS. 11A-11D illustrate arms 1138*a*-1138*c* having control cables 1128*a*-1128*c* passing through a conduit in the arms 1138*a*-1138*c*, in another embodiment as described above with respect to FIG. 10, the control cables 1128*a*-1128*c* may be directly attached to the displacement vessel 1102 without running through any arms. The control cables 1128*a*-1128*c* may be coupled directly to control mechanisms 1120*a*-1120*c* residing on or within the displacement vessel 1102, such as within one or both of the floatation devices 1160*a* and 1160*b* or within the drag panel 1121, for example. As described above, the control mechanisms 1120*a*-1120*c* may be configured to wind up and/or release the control cables 1128*a*-1128*c* to adjust the distance and orientation of the displacement vessel 1102 from the anchor cable 1103 and orient the drag panel 1121 with respect to the flow of water in a method similar to that described above with respect to the embodiment of the displacement vessel 1002 with arms 1138*a*-1138*c*.

In operation, the displacement vessel 1102 is positioned in the water such that a first side 1121*a* of the drag panel 1121 captures drag forces resulting from the pressure exerted on the drag panel as a result of the water flow. To effect rotation of the displacement vessel 1102, a first control mechanism 1120*a* may wind or release the control cable 1128*a* either alone or while a second control mechanism 1120*b* releases (or winds) the control cable 1128*b*. As the first control mechanism 1120*a* winds (or releases) the first control cable 1128*a*, the first side 1121*a* of the displacement vessel may change its distance relative to the anchor cable 1103 allowing the displacement vessel to change its orientation with respect to the anchor cable and water flow. Where the displacement vessel 1102 has hingeable arms, the hinges 1106*a*-1106*c* allow for the arms 1138*a*-1138*c* to swing freely relative to the displacement vessel 1102 as the displacement vessel 1102 changes its orientation in the water relative to the anchor cable 1103. When the first side 1121*a* of the displacement vessel 1102 is perpendicular to the flow of water, the displacement vessel 1103 may experience a larger amount of drag force than if the displacement vessel 1102 were oriented at another angle to the flow of water. Upon rotation of the displacement vessel 1102 to a non-perpendicular angle, the drag panel 1121 may experience less drag force, thus allowing the amount of drag force exerted on the displacement vessel 1102 to be controllably adjusted during operation. Such a displacement vessel 1102 that can be rotated in the water to change the amount of drag force exerted thereon may be configured to capture a larger amount of drag forces during peak electric usage times and capture a smaller amount of drag forces during non-peak electric usage times. Among other potential advantages, such controlled adjustability may help reduce unnecessary stress on the apparatus and prolong its useful life.

Figure 11B:
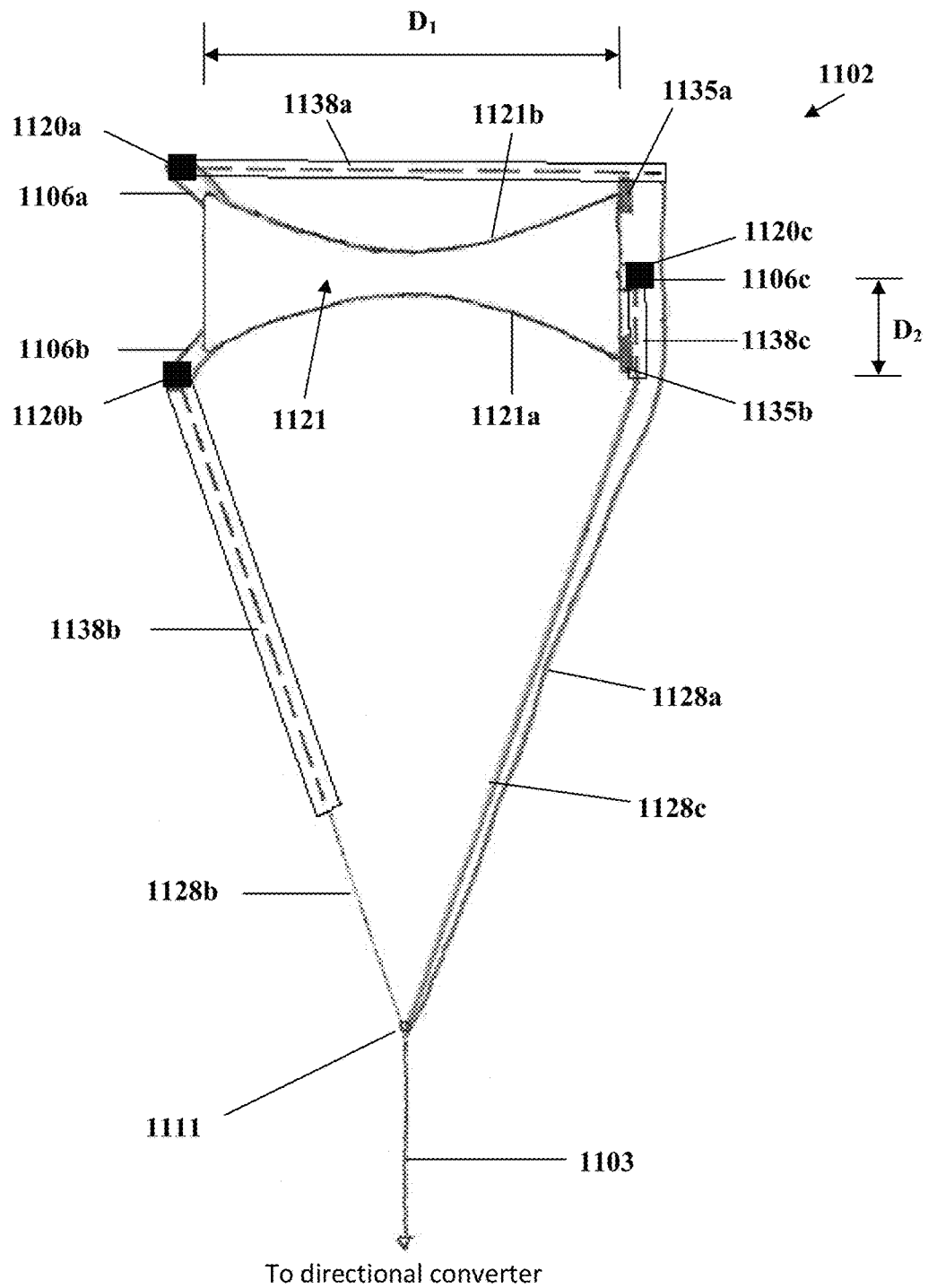
FIG. 11B shows a bottom view of a displacement vessel prior to a rotation, according to the aspect described with respect to FIG. 10.

FIG. 11B shows a bottom view of a displacement vessel 1102 of FIG. 11A. As stated above, the displacement vessel 1102 includes a drag panel 1121 having a first side 1121*a* and a second side 1121*b*. The first side 1121*a* and/or the second side 1121*b* may include a parabolic or concave shape that is configured to increase the capture of drag forces from the flow of water. The displacement vessel 1102 further includes arms 1138a-1138c extending therefrom and coupled to the drag panel 1121 via hinges 1106a-1106c. The arms 1138a-1138c each partially house a respective control cable 1128a-1128c (shown as a dotted line) and the control cables 1128a-1128c are coupled to an anchor cable 1103 via a coupling mechanism 1111.

As shown in FIG. 11B, the displacement vessel 1102 further includes stopping mechanisms 1135a and 1135b located at an opposite end of the displacement vessel 1102 from the hinges 1106a and 1106b. Stopping mechanisms 1135a and 1135b are configured to limit the range of motion of arms 1138a and 1138b so that the arms 1138a and 1138b do not strike, and potentially damage, the drag panel 1102. The stopping mechanisms 1135a and 1135b may be manufactured from any suitable material including rubber, metal, or a polymer, for example. One of skill in the art will recognize that stopping mechanisms 1135a and 1135b may be placed at any point along the drag panel to limit the motion of the arms 1138a and 1138b. Optionally, additional stopping mechanisms may be used to limit the range of motion of the third arm 1138c on either side of the drag panel 1121.

Figure 11C:
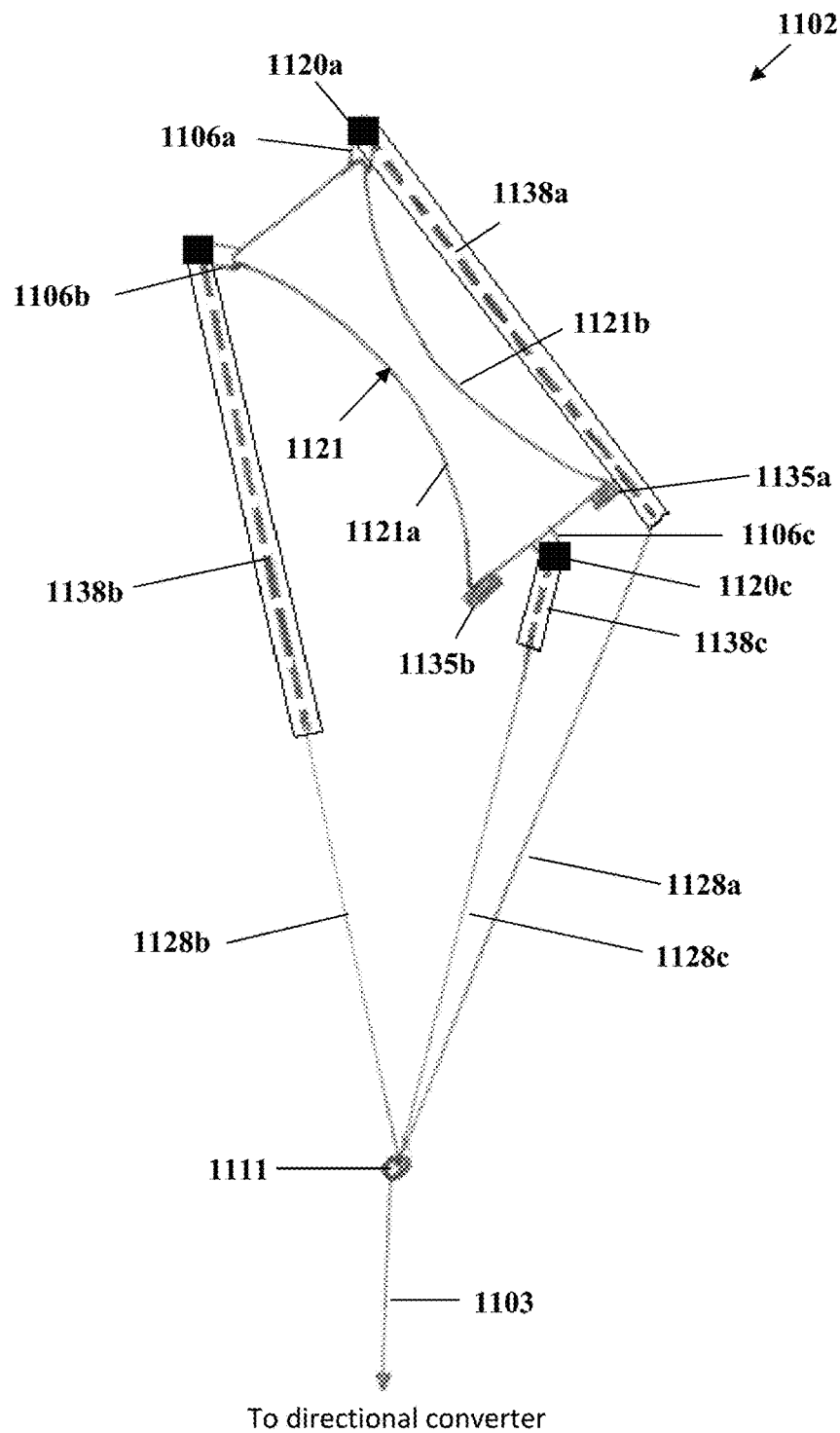
FIG. 11C shows a bottom view of a displacement vessel during a rotation, according to the aspect described with respect to FIG. 10.
Figure 11D:
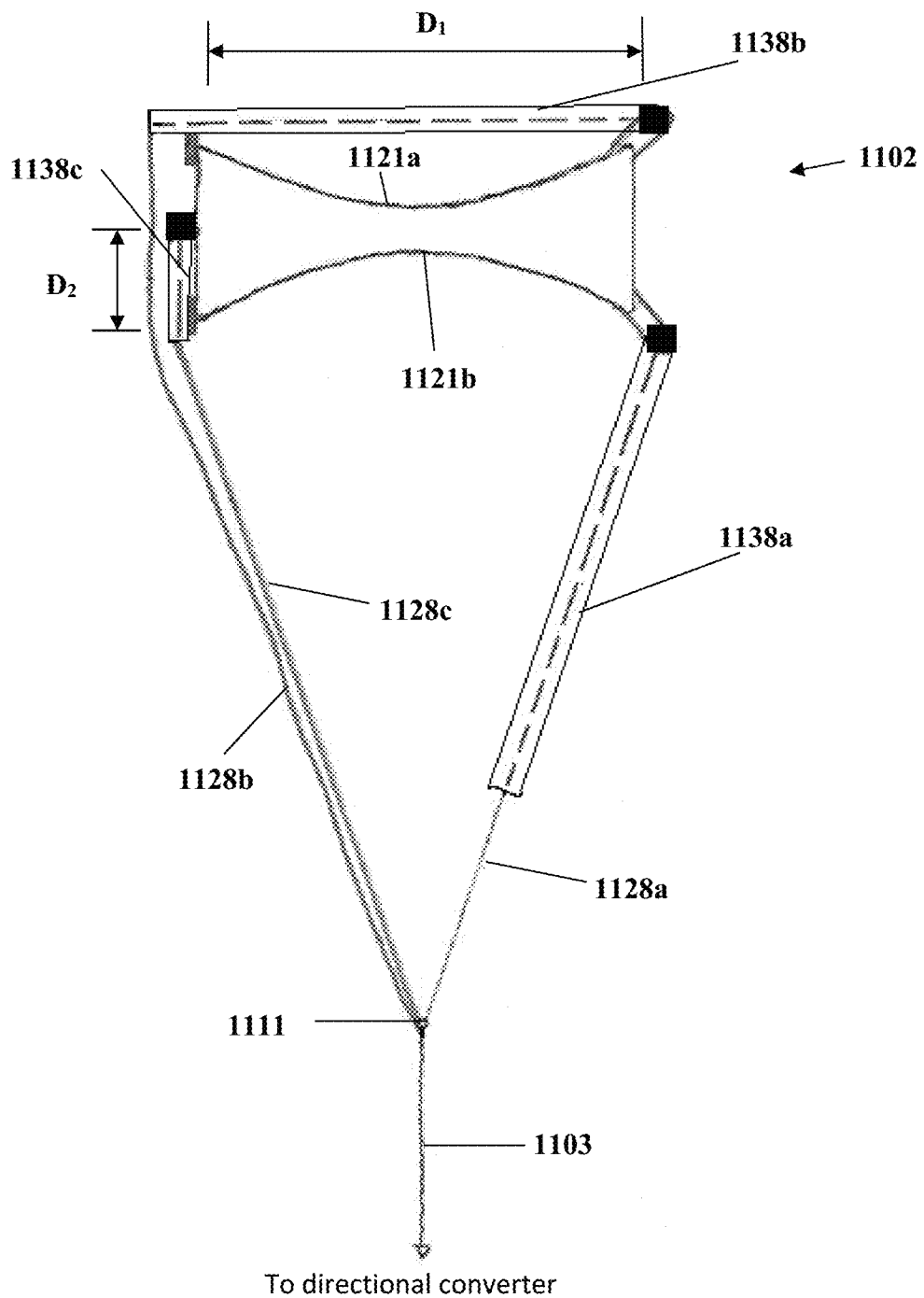
FIG. 11D shows a bottom view of a displacement vessel after a rotation, according to the aspect described with respect to FIG. 10.

Together, FIGS. 11B-11D illustrate the rotation of the displacement vessel. In FIG. 11B, the first side 1121a of the drag panel 1121 faces the coupling mechanism 1111 and side 1121b is away from the coupling mechanism 1111. As control cable 1128b is lengthened by the second control mechanism 1120b and control cable 1128a is shortened by first control mechanism 1120a, the displacement vessel 1102 may rotate clockwise, allowing the first side 1121a to rotate away from coupling mechanism 1111 and the second side 1121b to rotate towards coupling mechanism 1111. The rotation of the displacement vessel 1121 adjusts the surface area of the drag panel that is available to capture the flow of water.

In FIG. 11C, the displacement vessel 1102 is in mid-rotation between the configuration of FIGS. 11B and 11D. In particular, the first side 1121a of the drag panel 1121 is rotating clockwise as the control cable 1128a is shortened (or wound up) by the first control mechanism 1120a residing on or within the displacement vessel 1102 and as the control cable 1128b is simultaneously lengthened (or released) by the second control mechanism 1120b residing on or within the displacement vessel 1102, as described in more detail with respect to FIGS. 12A-12C.

FIG. 11D illustrates the completion of the displacement vessel 1102 rotation, where the second side 1121b now faces the coupling mechanism 1111, and first side 1121a faces away from the coupling mechanism. In FIG. 11D, control cable 1128a is shortened as compared to its state in FIGS. 11B and 11C. Conversely, control cable 1128b is lengthened in FIG. 11D as compared to its state in FIGS. 11B and 11C. The displacement vessel illustrated in FIG. 11D may be rotated back to the state in FIG. 11B in a substantially similar method as described above.

Figure 11E:
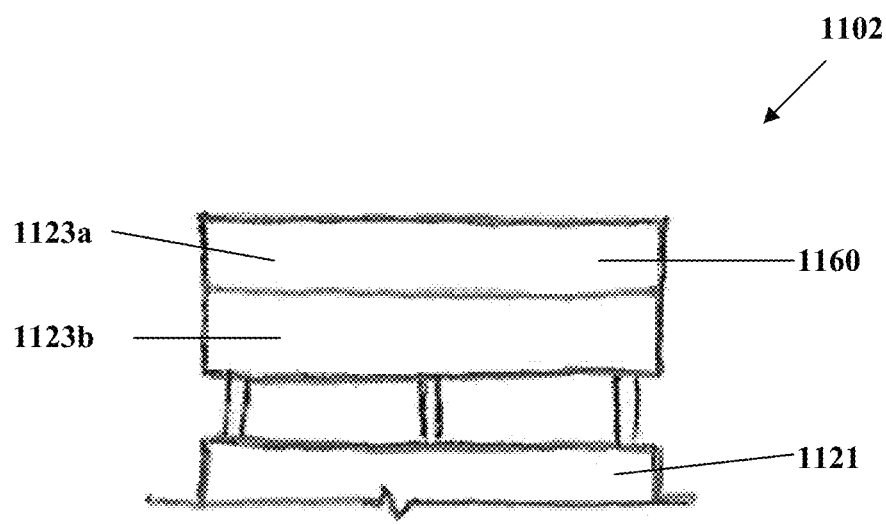
FIG. 11E shows a side view of a displacement vessel, according to the aspect described with respect to FIG. 10.

FIG. 11E shows a side view of a displacement vessel 1102. Further to the description of the floatation device in FIG. 7, the floatation device 1160 may be separated into two or more compartments 1123a and 1123b. The first compartment 1123a may be configured to be waterproof and/or store equipment, such as the control mechanism described above. The second compartment 1123b may include a material to maintain the buoyancy of the displacement vessel 1102, such as a gas, for example, to increase the buoyancy of the floatation device 1160. One of skill in the art will recognize that both compartments 1123a and 1123b may be configured to store a material to maintain buoyancy and/or house equipment.

Figure 12A:
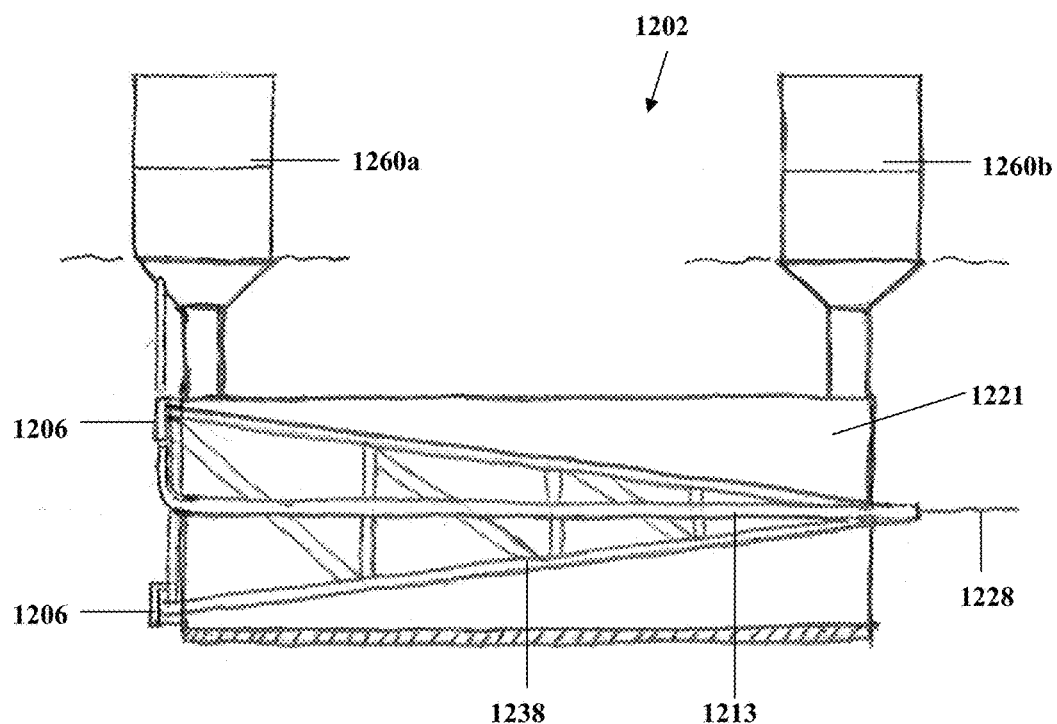
FIG. 12A shows a back view of a displacement vessel.

FIG. 12A shows a back view of a displacement vessel 1202. The displacement vessel 1202 includes a drag panel 1221 supported by floatation devices 1260a and 1260b. The floatation devices 1260a and 1260b are configured to float at or near the surface of the water such that the drag panel 1221 is disposed at a specified distance below the surface of the water. As shown in FIG. 12A, the floatation devices 1260a and 1260b include a first cross section having a first diameter above the water. The floatation devices 1260a and 1260b then taper to a second cross section having a second, smaller diameter under the water.

Figure 12B:
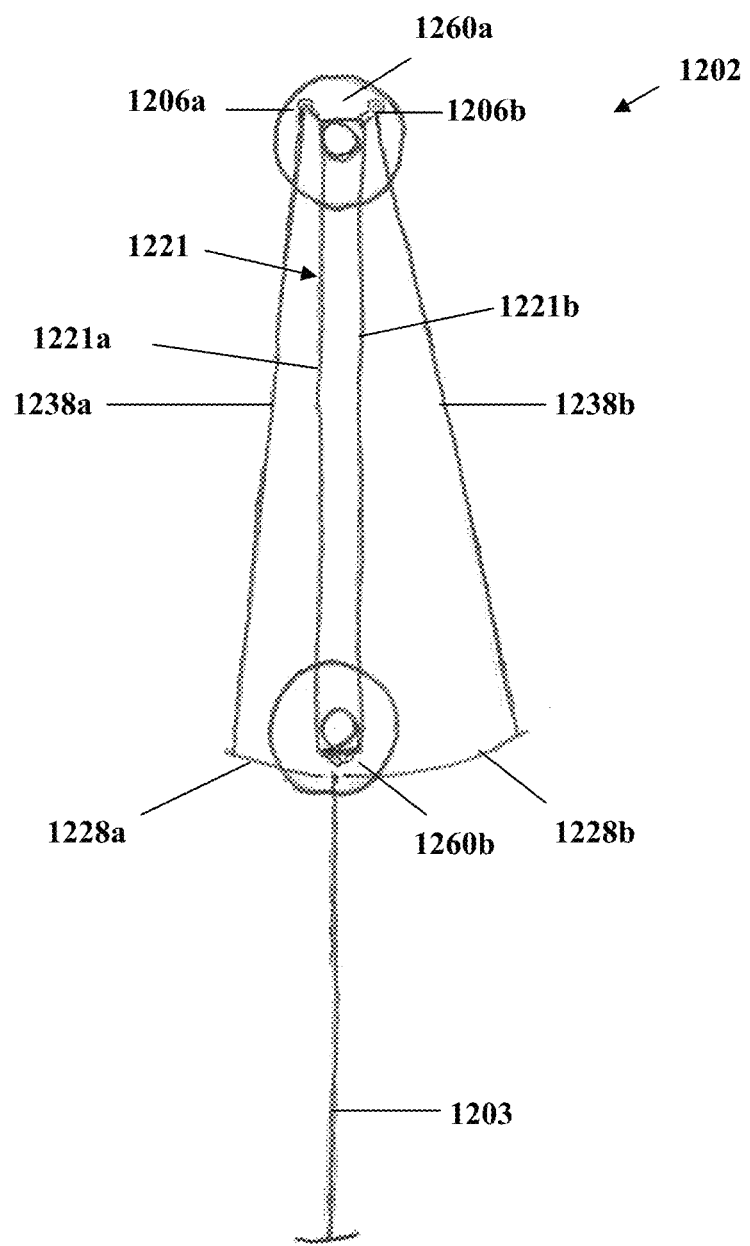
FIG. 12B shows a top view of a displacement vessel.
Figure 12C:
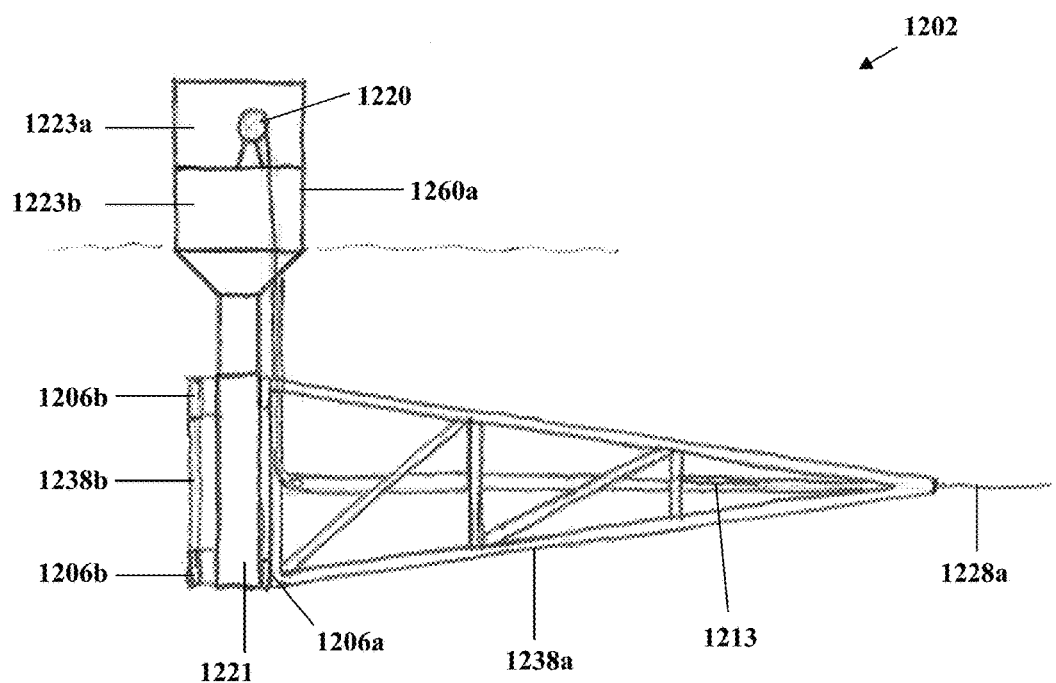
FIG. 12C shows a side view of a displacement vessel.

The displacement vessel 1202 of FIGS. 12A-12C further includes an arm 1238 comprising a truss-like structure. The arm 1238 may be coupled to the drag panel 1221 via hinges 1206 that allow the arm 1238 to swing about the drag panel 1221. As one example, the arm 1238 houses the control cable 1228 through a central conduit 1213 that extends along the arm 1238 and into the floatation device 1260a. Through central conduit 1213, the control cable 1228 may extend through arm 1238, be coupled to and stored in, a control mechanism housed within the displacement vessel 1202, such as in the floatation device 1260a, for example, as described with reference to FIG. 7.

FIG. 12B shows a top view of a displacement vessel 1202. As stated above, the displacement vessel 1202 includes a drag panel 1221 having a first side 1221a and a second side 1221b. The displacement vessel 1202 further includes arms 1238a and 1238b extending therefrom and coupled to the drag panel 1221 via hinges 1206a and 1206b. The arms 1238a and 1238b are each coupled to a respective control cable 1228a and 1228b and the control cables 1228a and 1228b are coupled to an anchor cable 1203.

FIG. 12C shows a side view of a displacement vessel 1202. The displacement vessel 1202 includes a drag panel 1221 that is supported by a floatation devices 1260a-b. The displacement vessel 1202 further includes arms 1238a and 1238b that are coupled to the drag panel 1221 via hinges 1206a and 1206b such that each arm 1238a and 1238b may swing about the displacement vessel 1202. Arms 1238a and 1238b may be disposed on opposite sides of the drag panel 1221 from one another. Arm 1238a houses a first control cable 1228a that passes through central conduit 1213 and is stored within the floatation device 1260a. Arm 1238b similarly houses a second control cable that may be stored within the displacement vessel 1202, such within the floatation device 1260b, for example. The control cables are coupled to an anchor cable that is also coupled to a directional converter and generator located at a stationary location, such as land or a barge, as described above.

As also indicated above (e.g., FIG. 7), the floatation devices 1260a-b may be separated into two or more compartments 1223a and 1223b. The first compartment 1223a may be configured to be waterproof and/or store equipment, such as a control mechanism 1220 configured to wind and/or release the control cable 1228a. The control mechanism 1220 may comprise, for example, a motor, winch, or a drum and a spring affixed to an axle. The second compartment 1223b may include a material to maintain buoyancy of the displacement vessel 1202, such as a gas, for example, to increase the buoyancy of the floatation devices 1260a-b. One of skill in the art will hereby recognize that either compartment 1223a and 1223b may be configured to store a material to maintain buoyancy of the displacement vessel 1202 and/or house control mechanism 1220.

Figure 13A:
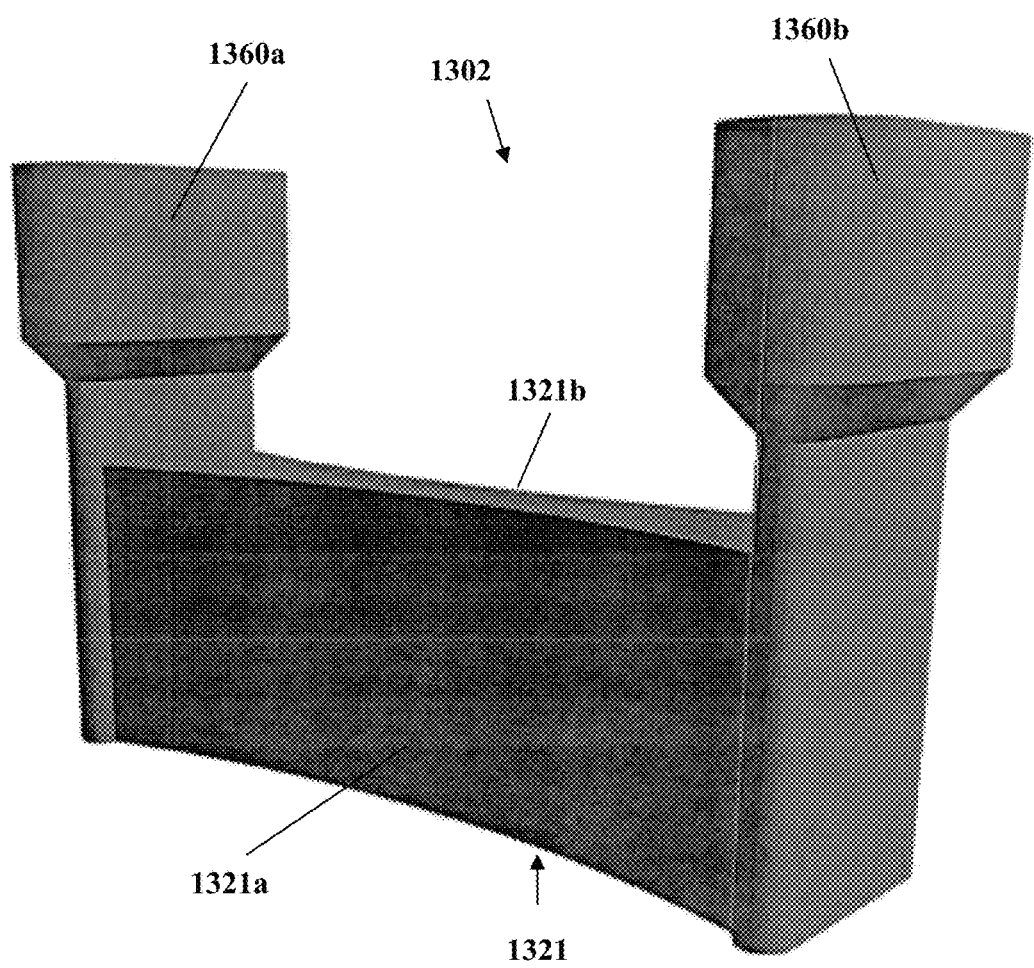
FIGS. 13A and 13B show a rendering of a displacement having a drag panel with a parabolic shape.
Figure 13B:
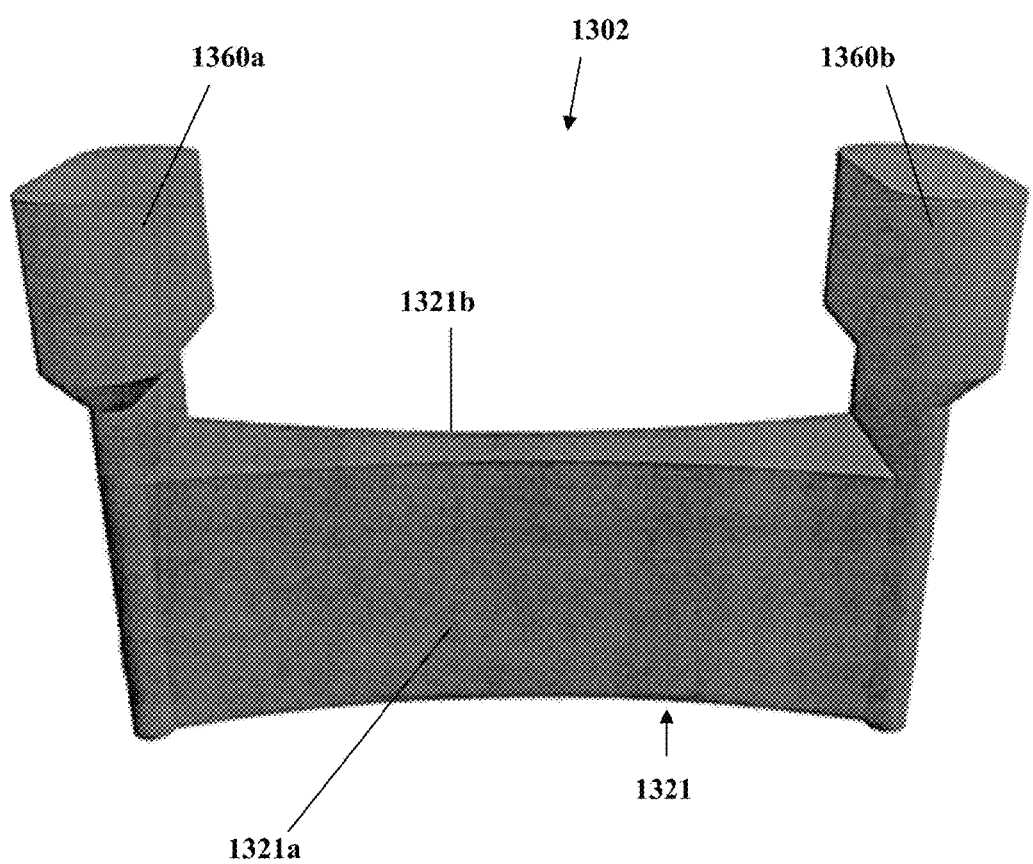

FIGS. 13A and 13B show a rendering of a displacement vessel 1302 having a drag panel 1321 with a parabolic shape. The displacement vessel 1302 is substantially similar to the displacement vessels described above and includes a drag panel 1321 supported by floatation devices 1360a and 1360b that are configured to float at or near the surface of the water. The drag panel 1321 includes a first side 1321a and a second side 1321b that are configured to capture drag forces more effectively than a flat drag panel. In particular, the first side 1321a and the second side 1321b include a parabolic shape configured to capture drag forces from the flow of water. One of skill in the art will recognize that both sides 1321a and 1321b need not include the same shape. In one example, the first side 1321a may include a parabolic shape while the second side 1321b includes a flat surface, such as the flat surface shown on displacement vessel 1202 sides 1221a and 1221b in FIGS. 12A-12C. Because the drag panel can be rotated, operators can select which side to face the direction of water flow and therefore provide further adjustability and controllability of the displacement vessel and thus also adjust or control electricity generation.

Figure 14A:
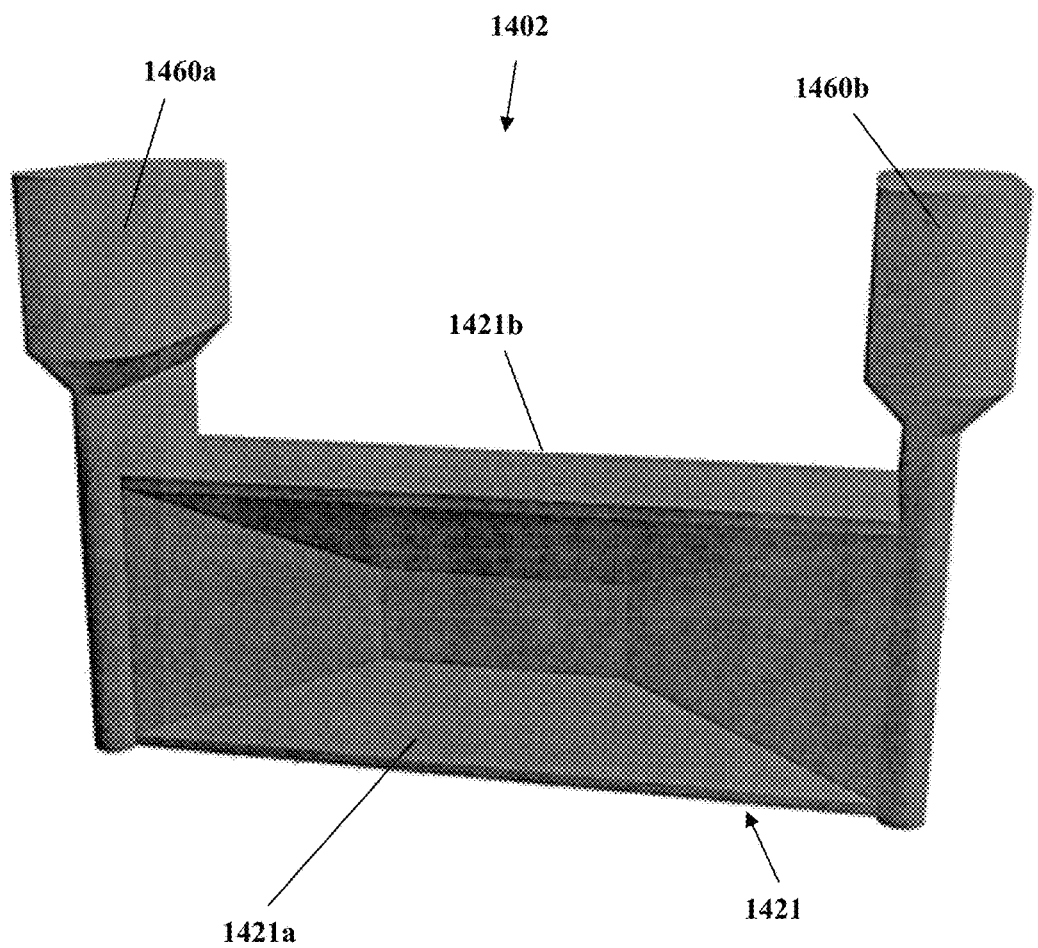
FIGS. 14A and 14B show a rendering of a displacement vessel having a drag panel with an alternate surface shape.
Figure 14B:
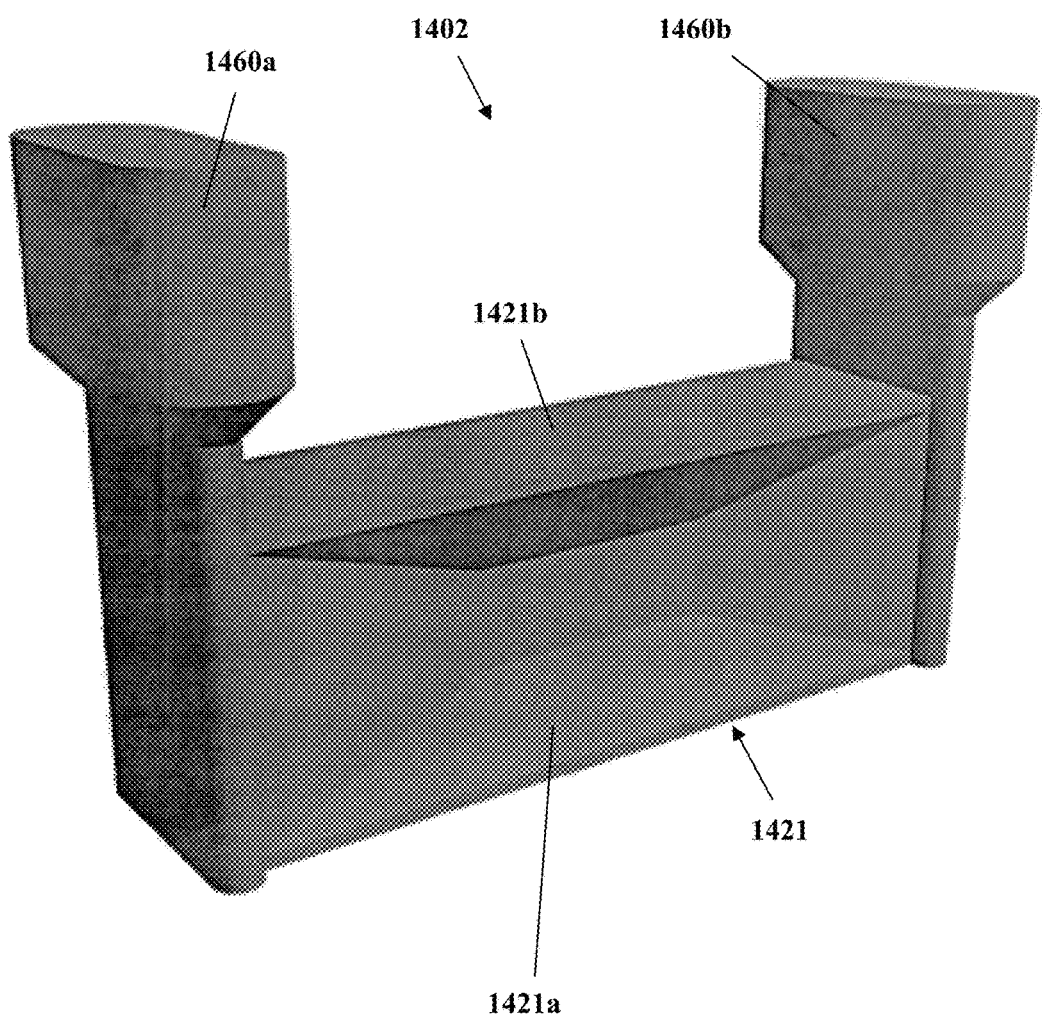

FIGS. 14A and 14B show a rendering of a displacement vessel 1402 having a drag panel 1421 with an alternate surface shape. The displacement vessel 1402 is substantially similar to the displacement vessels described above and includes a drag panel 1421 supported by floatation devices 1460a and 1460b. The drag panel 1421 includes a first side 1421a and a second side 1421b configured to capture drag forces more effectively than a flat drag panel. In particular, the first side 1421a and the second side 1421b include a lofted cut between two rectangular profiles. One of skill in the art will recognize that both sides 1421a and 1421b need not be the same. In an example, the first side 1421a may include a lofted cut while the second side 1421b includes a flat surface, such as the flat surface shown on displacement vessel 1202 sides 1221a and 1221b in FIGS. 12A-12C. In another embodiment, the first side 1421a and/or the second side 1421b may include a concave surface.

Figure 15A:
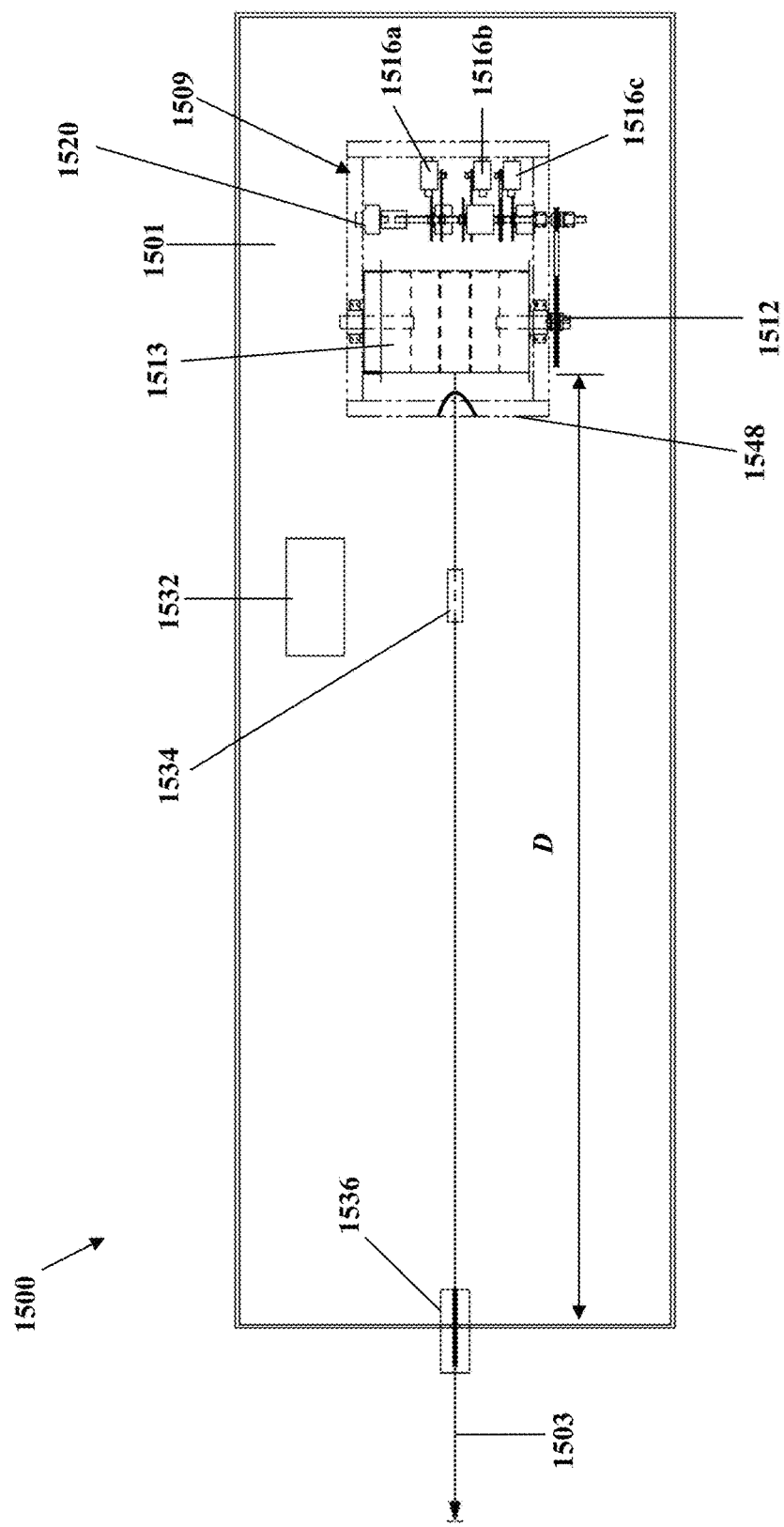
FIG. 15A shows a top view of a layout for a tidal energy generation system comprising a directional converter positioned on a barge.
Figure 15C:
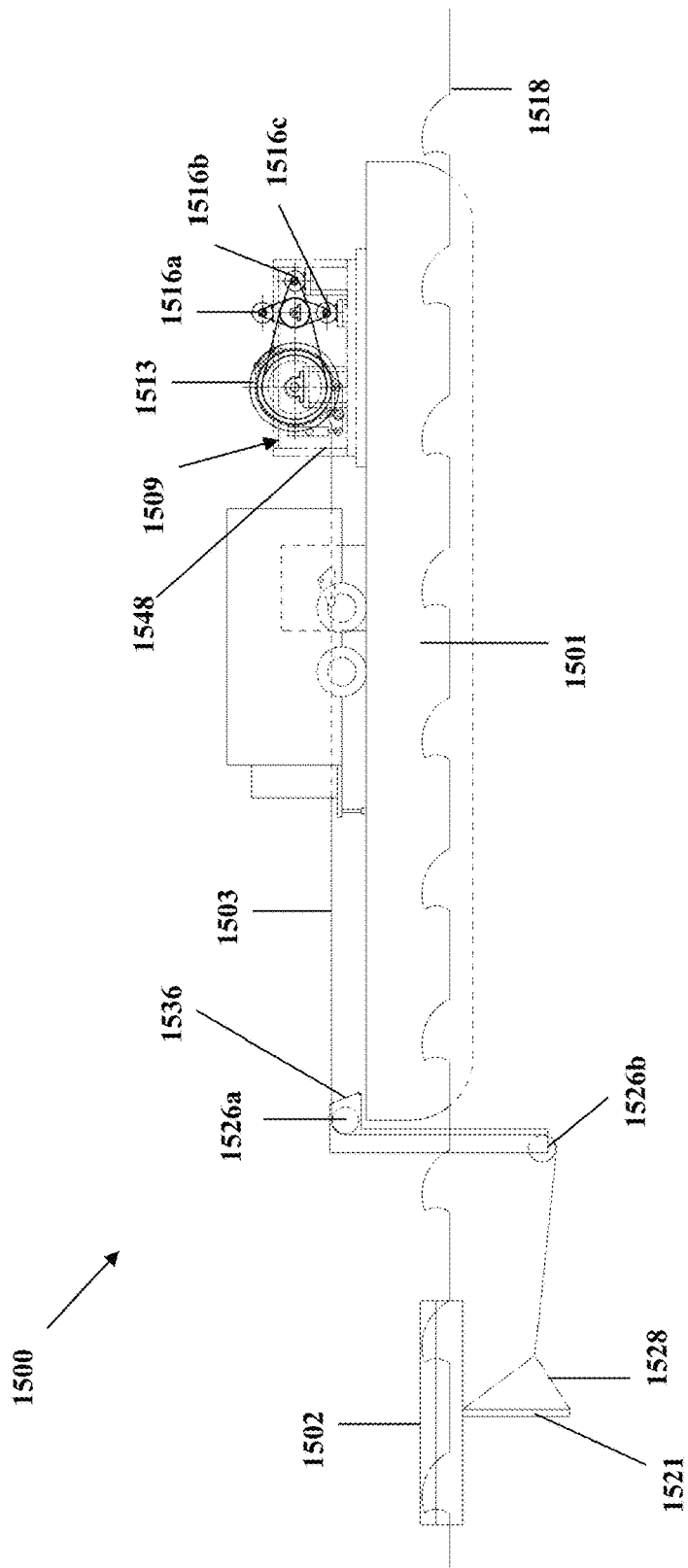
FIG. 15C shows a side view of a layout for a tidal energy generation system comprising a directional converter positioned on a barge.

FIG. 15A shows a top view and FIGS. 15B and 15C show a side view of a layout for a tidal energy generation system 1500 comprising a displacement vessel 1502 having a drag panel 1521 and a directional converter 1509 positioned on a barge 1501 such as a work barge or spud barge, for example. Similar to the above embodiments, the drag panel is coupled to an anchor cable 1503 via a control cable 1528. The directional converter 1509 is positioned at or on a stationary location i.e., the barge 1501 floating (or alternatively, fixed) at or near the surface of the water 1518 as is known in the art. If fixed at the surface of the water 1518, the barge 1501 may comprise pylons that are driven into the bottom of the body of water (e.g., ocean, bay, or sea) and coupled to the barge 1501 itself to prevent motion, such as motion due to waves at the surface of the water. In another embodiment, the barge may include an anchoring system to prevent the barge from drifting.

As described above, the directional converter 1509 is coupled to an anchor cable that extends from the directional converter 1509 to a displacement vessel in the water. The displacement vessel may include any of the displacement vessels described herein that are configured to capture energy from the rise/fall of the water due to tidal action or drag forces from the flow of water due to tidal action or other currents. The directional converter 1509 may be similar to the directional converters described herein and may include a drum 1513 and drive gear 1512 positioned on an axle. The anchor cable 1503 is coupled to the drum 1513 such that it may be wound/unwound upon the rotation of the drum 1513.

In an embodiment, a tensiometer 1534 may be coupled to the anchor cable 1503 to provide data on the forces exerted on the anchor cable 1503 to an operator. As described above, the drive gear 1512 may be coupled directly (or indirectly through a gear box) to one or more electrical power generators 1516a-1516c. The electrical power generators 1516a-1516c may comprise one or more of any of the generators described herein, such as for example, a 15 kW fixed magnet generator and/or a 100 kW fixed magnet generator.

The directional converter 1509 may further include a reverse control mechanism 1520 to rotate the drum and wind/unwind the anchor cable, such as, for example, a motor or winch. Such a control mechanism 1520 may be beneficial for winding the anchor cable 1503 (and thus the displacement vessel) back to the barge 1501 for maintenance/repairs, among other benefits. The tidal energy generation system 1500 may further include a hydraulic power mechanism 1532 which may provide hydraulic power to any of the components on the barge 1501 that may require hydraulic power, such as, for example, the reverse control mechanism 1520. The tidal energy generation system 1500 may further include a pivot frame 1536 to direct the anchor cable underneath the surface of the water 1518. The pivot frame 1536 may include one or more pulleys 1526a and 1526b configured to redirect the anchor cable under the surface of the water 1518.

In an embodiment, any of the tidal energy generation systems described herein may include a level winder assembly 1548 configured to maintain a uniform wrapping of the anchor cable 1503 as it is wound around its respective drum 1513 by directing each wrap of the anchor cable 1503 around the drum 1513 to sit tightly next to the previous wrap. The level winder assembly 1548 may include a guide mechanism that guides the anchor cable 1503 as it is wound around the drum 1513 so that it is wound evenly across the drum 1513. In an embodiment, the guide mechanism may include a plate with a slot in which the anchor cable passes through. The guide mechanism may further include two or more oppositely-positioned vertical rollers to prevent lateral movement of the anchor cable. The guide mechanism may be coupled to one or more axles that are in turn coupled to the drive gear 1512 (and, optionally, a gearing mechanism) such that one full rotation of the drum 1513 causes the guide mechanism to travel a specified length of the drum 1513 in a first direction along the rotational axis of the drum. The specified length that the guide mechanism travels may be a function of the diameter of the anchor cable 1513. After the guide mechanism has traveled one full length of the drum 1513, the guide mechanism may switch its direction of travel and move in a second direction that is opposite the first direction. After the guide mechanism travels the length of the drum in the second direction, this process may be repeated. The one or more axles may include grooves or threads arranged in a corkscrew around the axle. The level winder assembly 1548 may travel in the first direction along a first groove and, after travelling one full length of the drum, the level winder assembly may travel along a second groove that crosses the first groove.

Additionally, the anchor cable 1513 may be configured to approach the drum 1513 at an angle to improve cable life and spooling operation (e.g., by preventing snags). In particular, a distance D may be selected between the pivot frame 1536 and the drum 1513 such that the approach angle of the anchor cable, also known in the art as fleet angle, is optimal for the particular assembly setup. In an embodiment, the fleet angle may be between 0 degrees and 15 degrees. In another embodiment, the fleet angle may be between 0.25 degrees and 5 degrees. In yet another embodiment, the fleet angle may be between 0.25 degrees and 1.25 degrees.

Figure 16A:
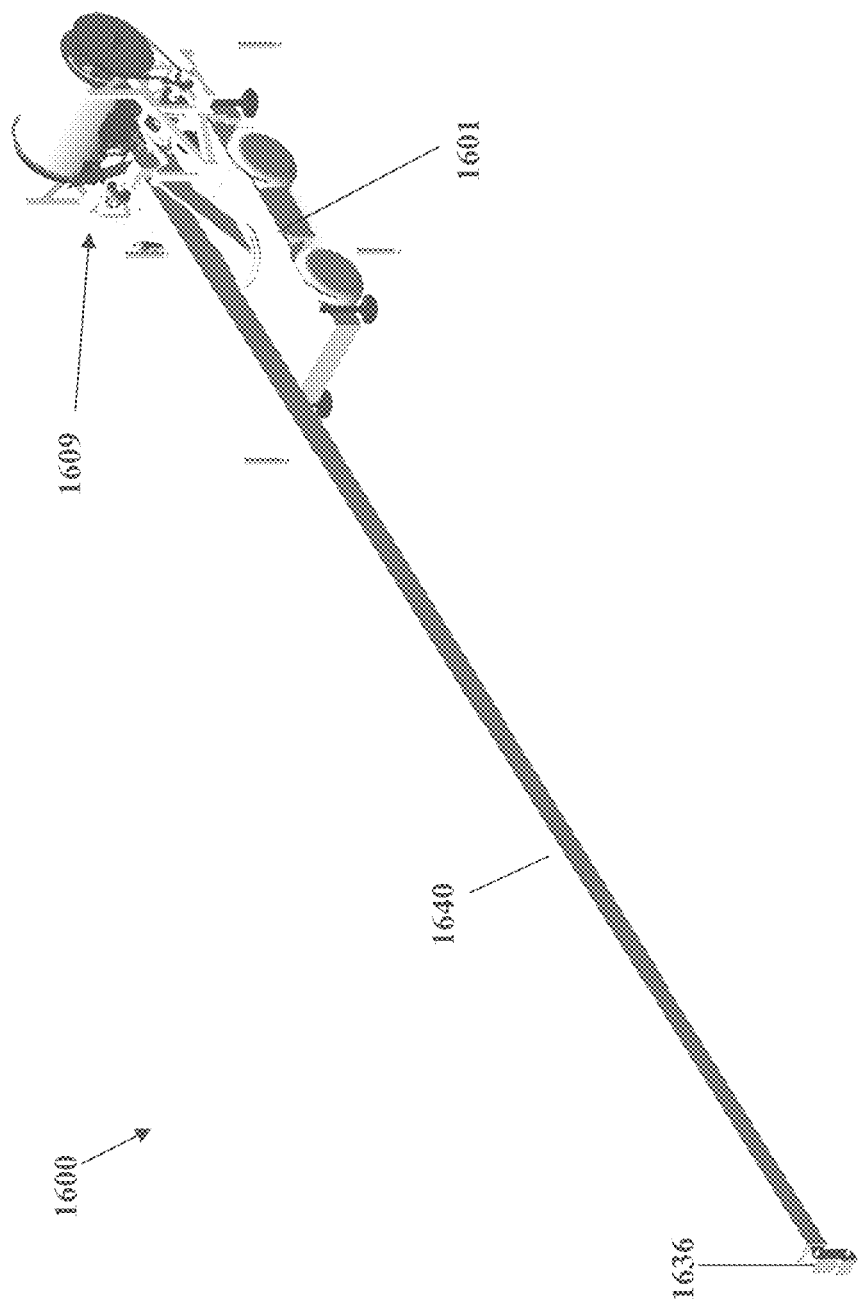
FIGS. 16A and 16B show a rendering of a crane system comprising a directional converter positioned at the base of a crane.
Figure 16B:
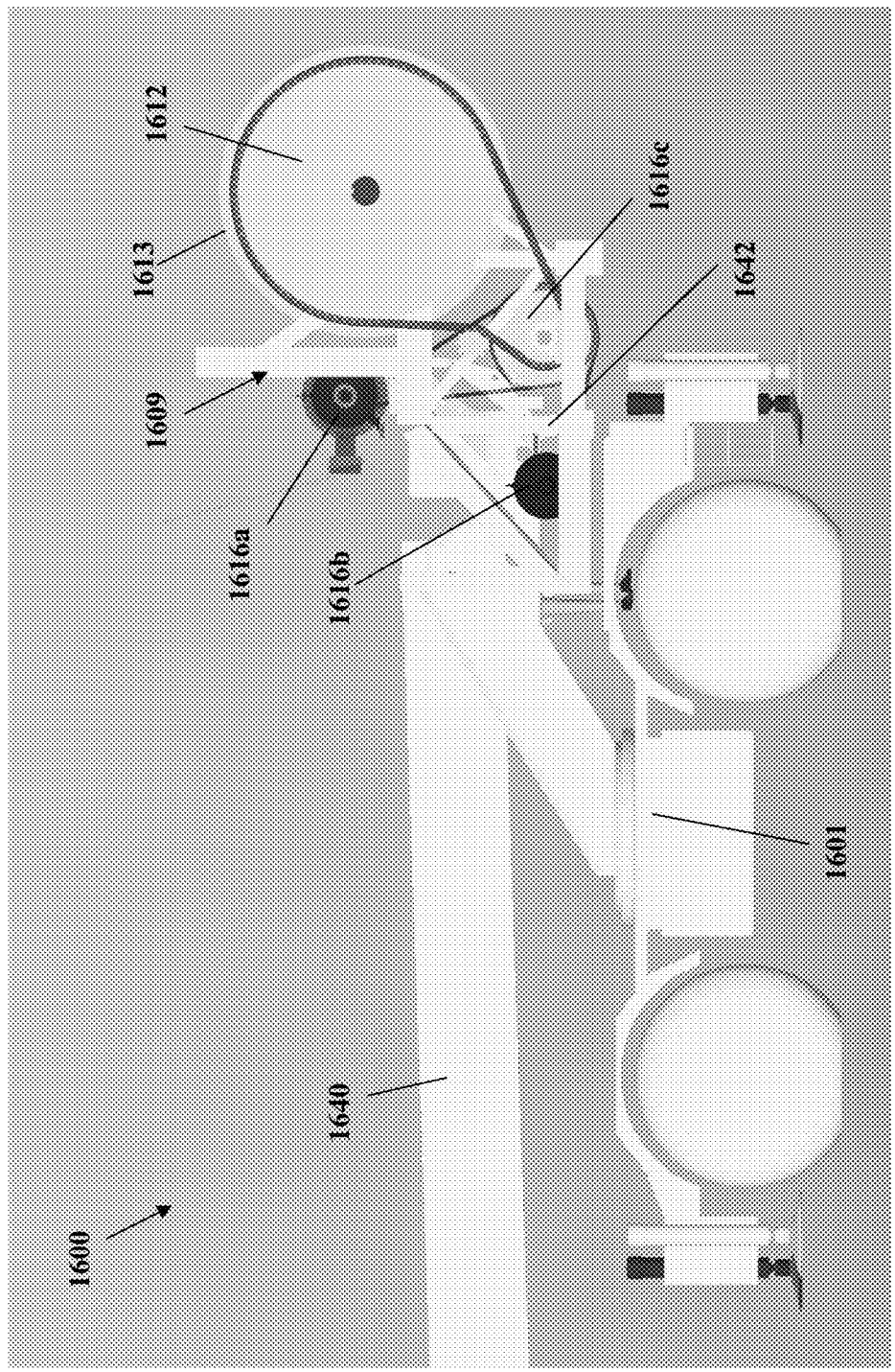

FIGS. 16A and 16B show a rendering of a tidal energy generation assembly 1600 comprising a directional converter 1609 positioned at the base of a crane 1601. The crane may be positioned at or on a stationary location, such as on shore or on a barge as described with respect to FIGS. 15A and 15B. This embodiment may be particularly useful for testing any of the displacement vessels and/or directional converters described herein. The directional converter 1609 may be substantially similar to any of the directional converters described herein and may be mounted to the base of the crane 1601 via a mounting frame 1642. A mounting frame 1642 may provide benefits such as easier swapping out of directional converter prototypes for testing, among other benefits. The directional converter 1609 may be coupled to an anchor cable that extends along a boom 1640 of the crane, through a pivot frame 1636 affixed to an end of the boom 1640 (similar to the pivot frame 1536 described above), and out to a displacement vessel in the water.

As stated above, the directional converter 1609 may be substantially similar to the directional converters described herein. In particular, the directional converter 1609 may include a drum 1613 and a drive gear 1612 positioned on an axle such that rotation of the drum 1613 winds/unwinds the anchor cable and rotates the drive gear 1612. The drive gear 1612 may be coupled directly (or indirectly through a gear box, for example) to one or more electrical power generators 1616a-1616c via a connecting mechanism, such as a chain, for example. Upon rotation of the drum 1613 and drive gear 1612, rotational energy is transferred to one or more of the electrical power generators 1616a-1616c to thereby produce electrical power. The generators 1616a-1616c may be engaged/disengaged in a manner similar to that described above with respect to FIG. 8. Each of the generators 1616a-1616c may comprise any of the generators described herein, such as, for example, one or more 15 kW fixed magnet generators and/or one or more 100 kW fixed magnet generators.

In an alternative embodiment of the present invention, the displacement vessels described above may be replaced with other suitable mechanisms for capturing the ebb and flow of water due to tidal action or other current flows while the generator is located at the stationary location, such as land. Such mechanisms may include a turbine having one or more propellers, rotors, or impellors. Additionally, an array of turbines having one of the previously described constructions may be used in place of the displacement vessel. In any case, the turbines may be anchored to or attached to the ocean/bay floor or may be floating at or near the water surface via a floatation device as described in more detail above. In another embodiment, the turbine may be mounted to a barge, such as the spud barge as described above. The turbine may be coupled to a drum that is under water (or alternatively above water in the case that the turbine is floating at the surface of the water) via a coupling mechanism such as, for example, a chain or belt. The drum may be coupled via an anchor cable to a directional converter such as the directional converters described above. The directional converter may be positioned at or on a stationary location, such as land or a barge, for example.

Figure 17:
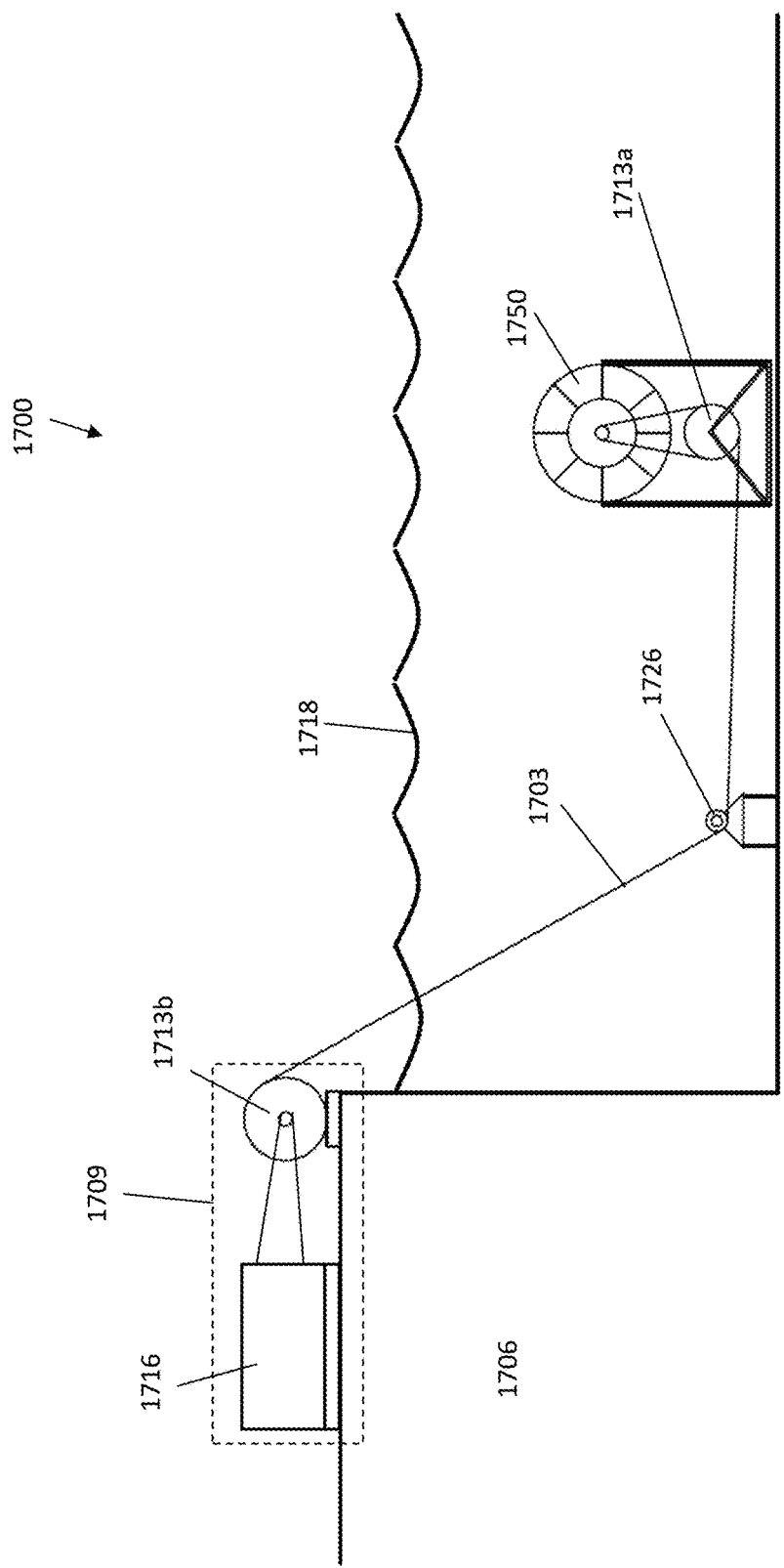
FIG. 17 illustrates a tidal energy generation assembly including a turbine coupled to a directional converter.

FIG. 17 illustrates a tidal energy generation assembly 1700 including a turbine 1750 coupled to a directional converter 1709 via an anchor cable 1703, similar to the embodiments described above. The turbine 1750 may comprise one or more propellers, rotors, or impellors that are adapted to capture forces exerted thereon by the ebb and flow of water due to tidal action and/or other currents. The turbine 1750 may be coupled to a drum 1713a via a coupling mechanism, such as a belt or chain, for example. As the flow of water causes the turbine 1750 to rotate, the coupling mechanism causes the drum 1713a to rotate, thus winding or unwinding the anchor cable 1703. The anchor cable 1703 may extend along the bay/ocean floor, through a pulley 1726, and be coupled to a drum 1713b that is associated with the directional converter 1709, thus causing the drum 1713b to rotate and unwind the anchor cable 1703 from the drum 1713b. The directional converter 1709 works substantially similarly to the directional converters in the above-described embodiments, and may be disposed on land 1706 at any suitable distance away from the water. As the drum 1713b rotates due to unwinding of the anchor cable 1703, rotational energy is transferred to an electric power generator 1716 to be converted into electrical power. The electrical power generated by the generator 1716 may be stored in an electrical power storage or transferred immediately to an electrical power grid.

Functionally, the turbine 1750 may operate similarly to an "underwater windmill" and may be adapted to be anchored or attached to the ocean/bay floor or, alternatively, float at or near the surface 1718 of the water as described above. As water flows past the turbine 1750, the propeller blades rotate cause a shaft to rotate. The shaft may be coupled to drum 1713a around which an anchor cable 1703 is wound. As the propeller blades of the turbine rotate, the drum 1713a also rotates causing the anchor cable 1703 to be wound or unwound and thus transferring mechanical energy to the directional converter 1709. As stated above, the directional converter 1709 may be substantially similar to the directional converters described above and may include a drum 1713b coupled to the anchor cable 1703 and an electric power generator 1716. As the anchor cable 1703 is wound by the turbine 1750, the drum 1713b rotates and transfers mechanical energy to the electric power generator 1716, which converts the mechanical energy into electrical energy.

Figure 18:
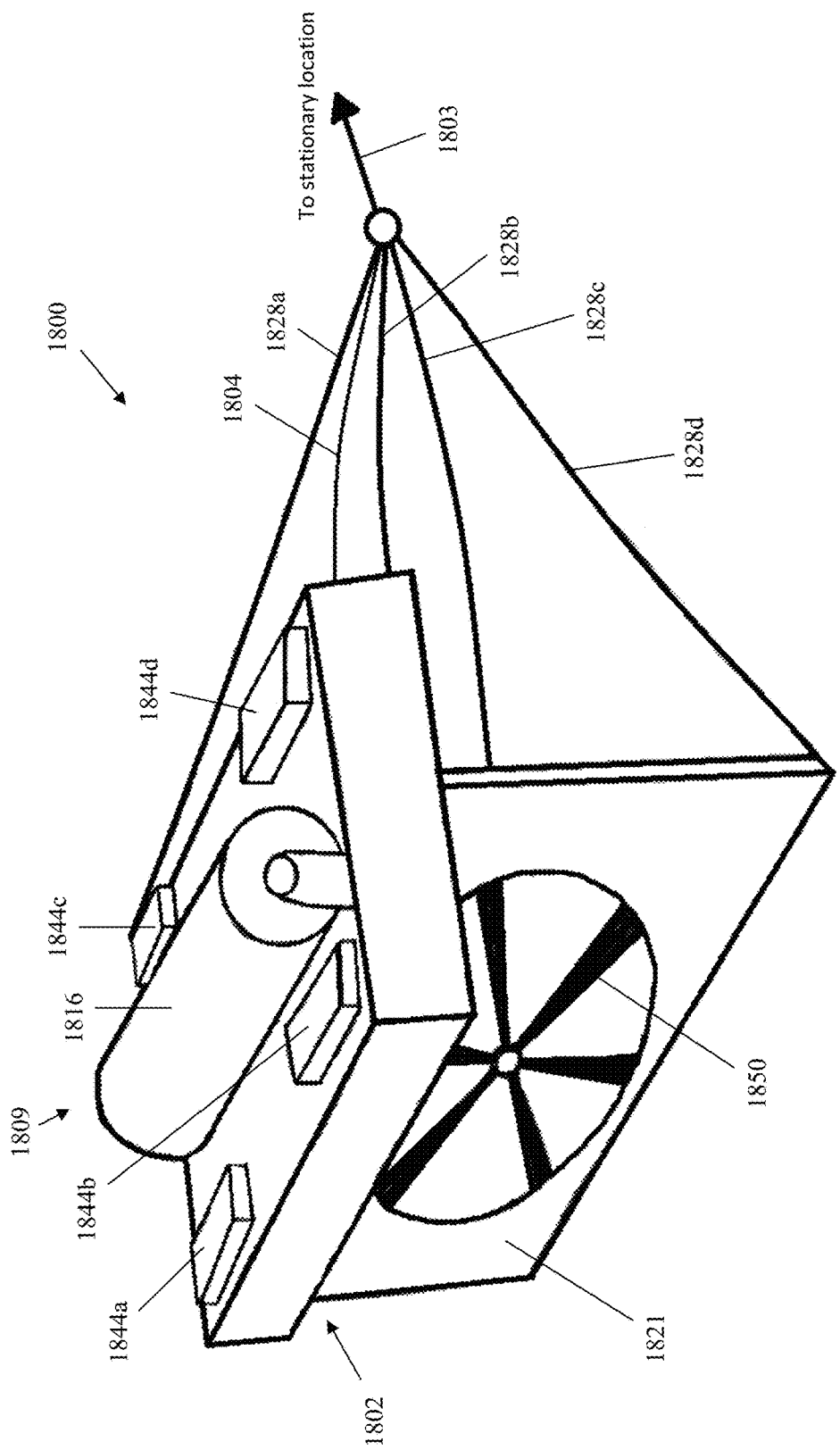
FIG. 18 illustrates a tidal energy generation assembly including a turbine mounted within a drag panel and a directional converter.

FIG. 18 illustrates a tidal energy generation assembly 1800 including a turbine 1850 mounted within a drag panel 1821 of a displacement vessel 1802 and a directional converter 1809 mounted on the displacement vessel 1802. The displacement vessel 1802 may be substantially similar to any of the displacement vessels described above, for example, in FIG. 5A-5D, 6C, 10, 11A-11E, 12A-12C, 13A-13B, or 14A-14B. As described above, the displacement vessel 1802 may be connected to a stationary location, such as land or a spud barge, for example, by control cables 1828a-1828d that are coupled to an anchor cable 1803. One or more rewind assemblies (not shown) may be housed at the stationary location to control the winding of an anchor cable 1803 and alter (i.e., increase or decrease) the distance of the displacement vessel 1802 from the stationary location. The displacement vessel 1802 may also include a power cable 1804 extending from the displacement vessel 1802 to the stationary location to transmit electrical power to/from the displacement vessel 1802.

Each control cable 1828a-1828d may be coupled to a respective control mechanism that may be housed within or mounted on the displacement vessel 1802 in compartments 1844a-1844d. The control mechanisms may independently control the winding/unwinding of the respective control cables 1828a-1828d to effectuate steering of the displacement vessel 1802 in the water. The control mechanisms may wind/unwind their respective control cables 1828a-1828d to adjust the orientation of the displacement vessel with respect to the water/current flow, e.g., by adjusting the yaw, pitch, and/or roll of the displacement vessel. For example, the yaw of the displacement vessel 1802 may be adjusted using the control cables to rotate the displacement vessel in a clockwise direction in the water. In this example, control mechanisms in compartments 1844a and 1844c may wind up their respective control cables 1828a and 1828c while control mechanisms in compartments 1844b and 1844d may unwind their respective control cables 1828b and 1828d.

As described above, the control mechanisms may also be used to control the amount of electricity generated. For example, by rotating the displacement vessel 1802 to an angle away from the direction of water flow, less drag force may be exerted on the drag panel 1821 (and the turbine 1850) thus reducing the amount of electricity generated by the electrical power generator 1816.

Similar to other embodiments described above, the displacement vessel 1802 includes a drag panel 1821 extending therefrom in a generally downwards direction. The drag panel 1821 includes a turbine 1850 mounted within the displacement vessel 1802. The turbine 1850 may be disposed on an axle and the axle may be operably coupled (via a gearing mechanism or one or more belts/chains, for example) to the directional converter 1809 mounted on the displacement vessel 1802. The directional converter 1809 may include an electric power generator 1816 that is operably coupled to the turbine 1850 as described in more detail above. In an embodiment, the displacement vessel 1802 may include two or more turbines housed within the drag panel 1821.

In operation, the displacement vessel is positioned in the water such that one side of the drag panel captures drag forces cause by the flow of water due to tidal action (or other underwater currents). As the water flows past the displacement vessel 1802, the turbine 1850 captures drag forces from the flow of water and converts the captured drag forces into rotational motion using a series of angled blades (as are known in the art). The turbine 1850 transmits the rotational motion through a gearing mechanism, for example, to the electrical power generator 1816 which then converts the rotational motion into electrical power, as described in more detail above. The electrical power may be transmitted through the power cable 1804 to the stationary location, where it may be stored and/or distributed to a power grid.

Figure 19:
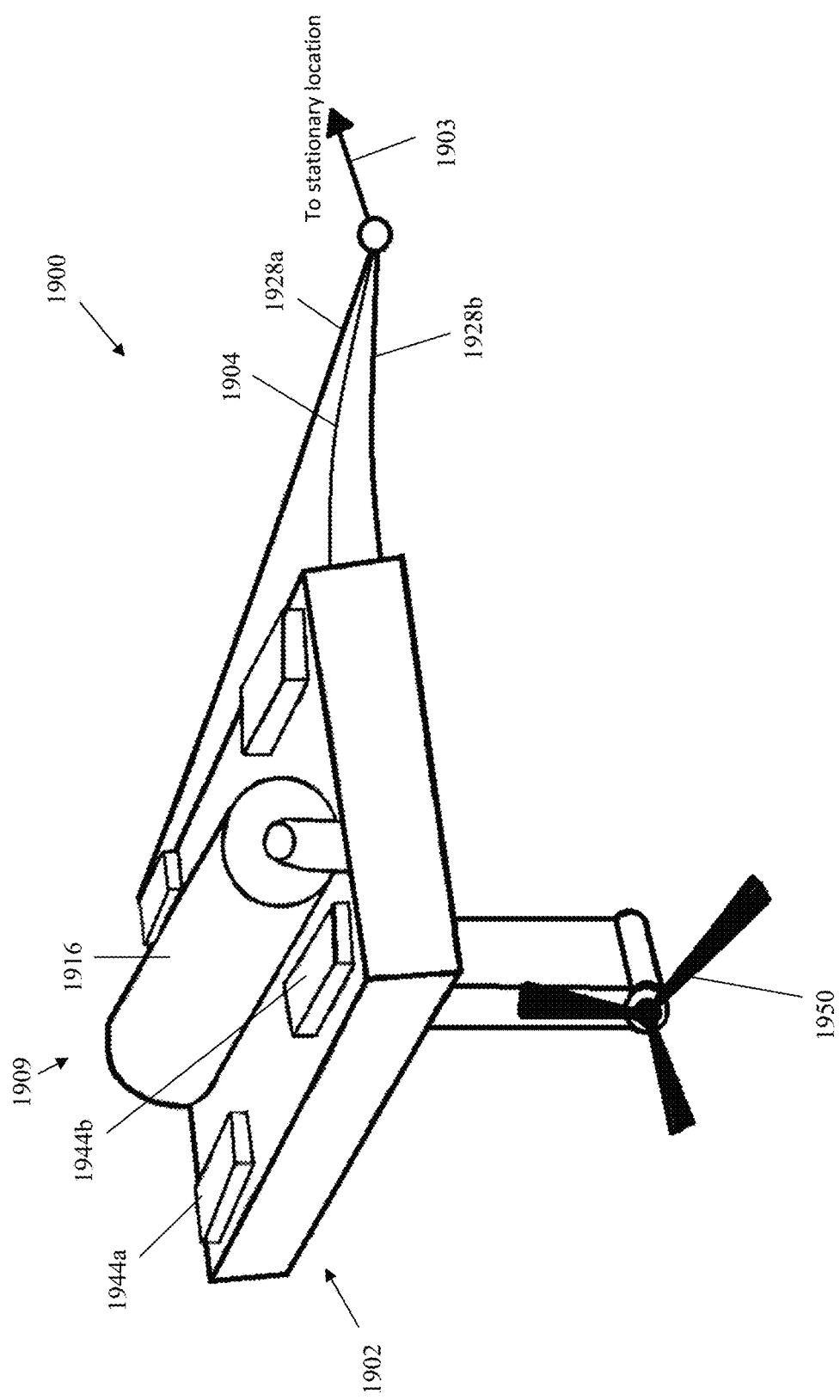
FIG. 19 illustrates a tidal energy generation assembly including a turbine directly mounted to the bottom of a displacement vessel.

FIG. 19 illustrates a tidal energy generation assembly 1900 including a turbine 1950 directly mounted to the bottom of a displacement vessel 1902. Similar to the embodiment shown in FIG. 18, the displacement vessel 1902 is connected to a stationary location by control cables 1928a and 1928b that are coupled to an anchor cable 1903. The anchor cable may be connected to a rewind assembly (not shown) that is housed at the stationary location. Each control cable 1928a and 1928b may be coupled to a respective control mechanism located in compartments 1944a and 1944b that independently wind/unwind each control cable to effectuate steering of the displacement vessel. The displacement vessel 1902 may also include a power cable 1904 connecting the displacement vessel 1902 to the stationary location to transmit power to/from the displacement vessel 1902.

Similar to the tidal energy generation assembly of FIG. 18, each control cable 1928a and 1928b may be coupled to a respective control mechanism located in compartments 1944a and 1944b that may be housed within or mounted on the displacement vessel 1902. The control mechanisms may independently control the winding/unwinding of the respective control cables 1928a and 1928b to effectuate steering of the displacement vessel 1902 in the water. The control mechanisms may wind/unwind their respective control cable 1928a and 1928b to adjust the orientation of the displacement vessel with respect to the water/current flow, e.g., by adjusting the yaw, pitch, and/or roll of the displacement vessel. For example, the yaw of the displacement vessel 1902 may be adjusted using the control cables to rotate the displacement vessel in a clockwise direction in the water. In this example, control mechanism located in compartment 1944a may wind up its respective control cable 1928a while control mechanism located in compartment 1944b may unwind its respective control cable 1928b.

In an optional arrangement, the displacement vessel 1902 may include a turbine 1950 extending into the water from the bottom surface of the displacement vessel 1902. The turbine 1950 may be a standard underwater turbine as is known in the art. In another embodiment, the turbine 1950 may be mounted to any suitable side of the displacement vessel 1902. The turbine 1950 may be disposed on an axle and the axle may be operably coupled (via a gearing mechanism or one or more belts/chains, for example) to the directional converter 1909 mounted on the displacement vessel 1902. The directional converter 1909 may include an electric power generator 1916 that is operably coupled to the turbine 1950 as described in more detail above. In an embodiment, the displacement vessel 1902 may include two or more turbines extending from the displacement vessel 1902 into the water.

Figure 20A:
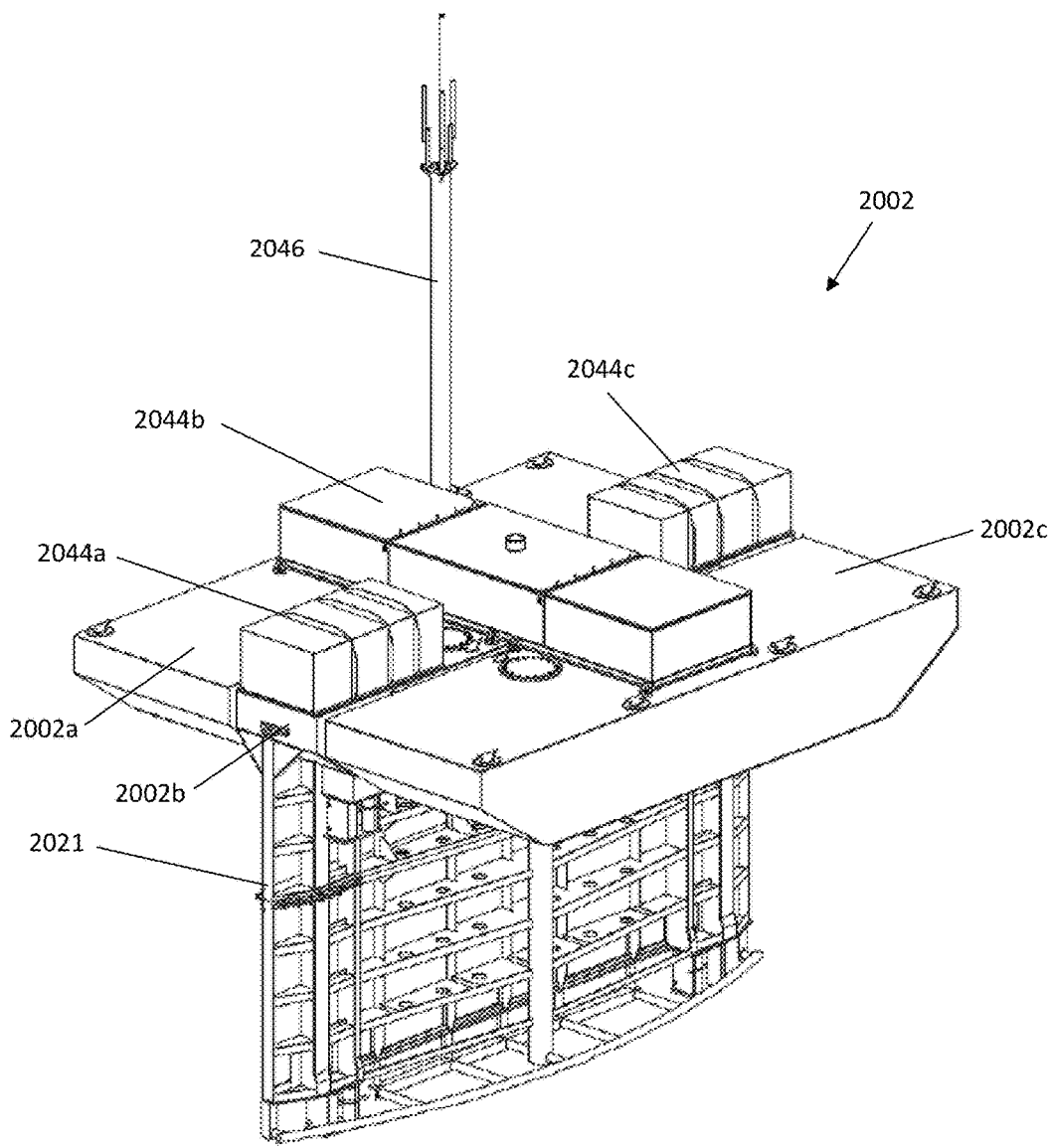
FIG. 20A shows an isometric view of an exemplary displacement vessel.

FIG. 20A shows an isometric view of an exemplary displacement vessel 2002 with a drag panel 2021 and may be similar to the displacement vessels of FIGS. 5A-5C, 6C, and 8-10, for example. In particular, FIG. 20A shows a displacement vessel 2002 manufactured in modular components to facilitate transportation of the displacement vessel 2002. The displacement vessel 2002 includes first portion 2002a, second portion 2002b, and third portion 2002c that may be manufactured separately and assembled together with the drag panel 2021 to form the complete displacement vessel 2002. One of skill in the art will recognize that a displacement vessel may be manufactured out of any number of modular components to form a complete displacement vessel. FIG. 20A also shows an underlying structural frame of the drag panel 2021 (without a "skin" or covering). The skin or covering may be, for example, sheet metal.

The displacement vessel 2002 may further include one or more compartments 2044a, 2044b, and 2044c. For example, compartments 2044a and 2044c may house control mechanisms, such as winches, that are configured to wind/unwind control cables (not shown). Compartment 2044b may house electronics to operate and/or batteries to power the control mechanisms. The displacement vessel 2002 may further include an antenna 2046 to facilitate communications with an operator at the stationary location. The antenna 2046 may transmit and/or receive data such as, for example, control signals for the control mechanisms and video data from a camera.

Figure 20B:
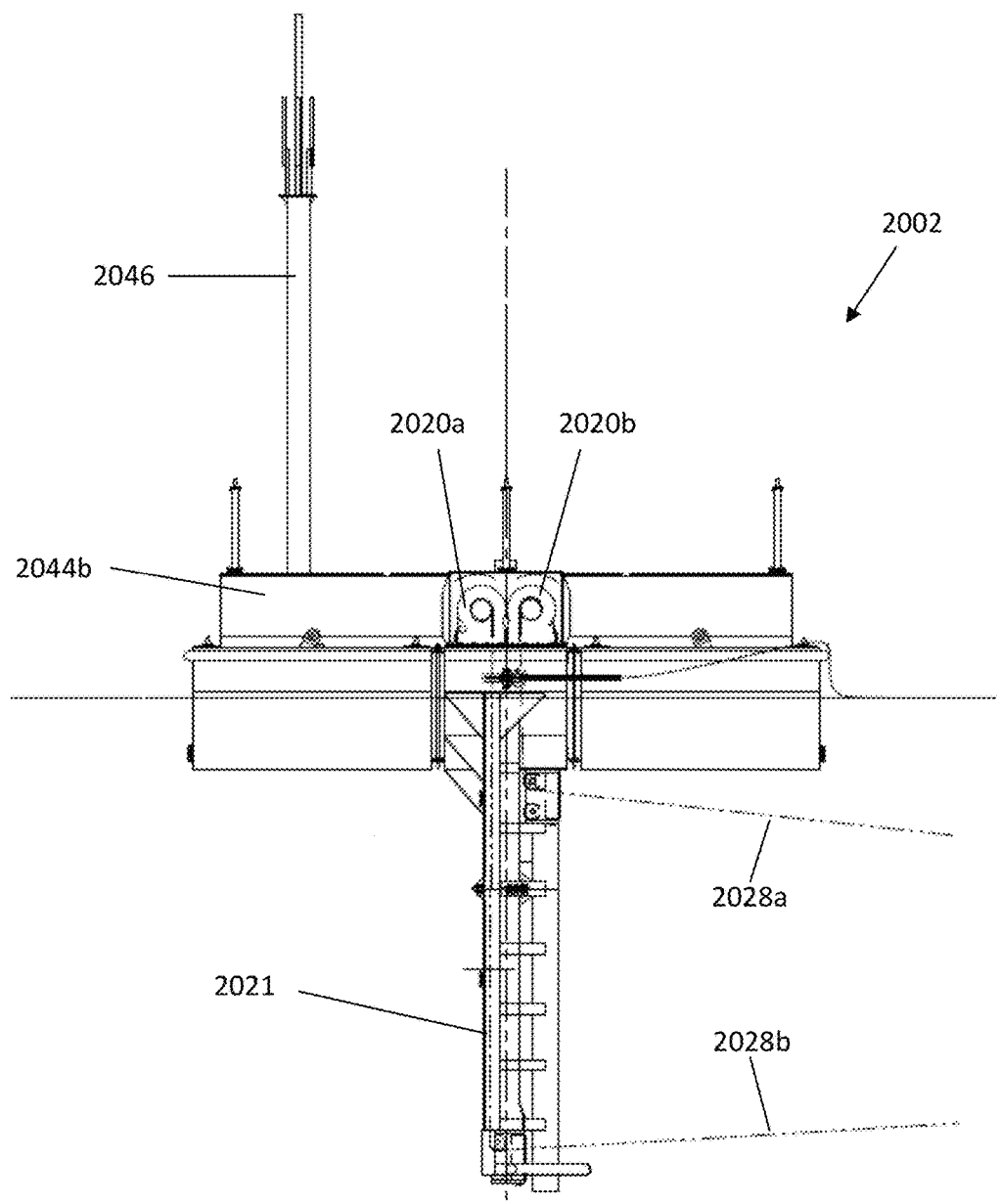
FIG. 20B shows a side view of an exemplary displacement vessel.

FIG. 20B shows a side view of an exemplary displacement vessel 2002 with a drag panel 2021. As illustrated in FIG. 20B, the displacement vessel 2002 may include two or more control cables 2028a and 2028b where each control cable 2028a and 2028b is connected to a respective control mechanism 2020a and 2020b configured to wind/unwind its control cable. The control cables 2028a and 2028b may be further connected to an anchor cable and a directional converter similar to the embodiments described above.

Figure 21A:
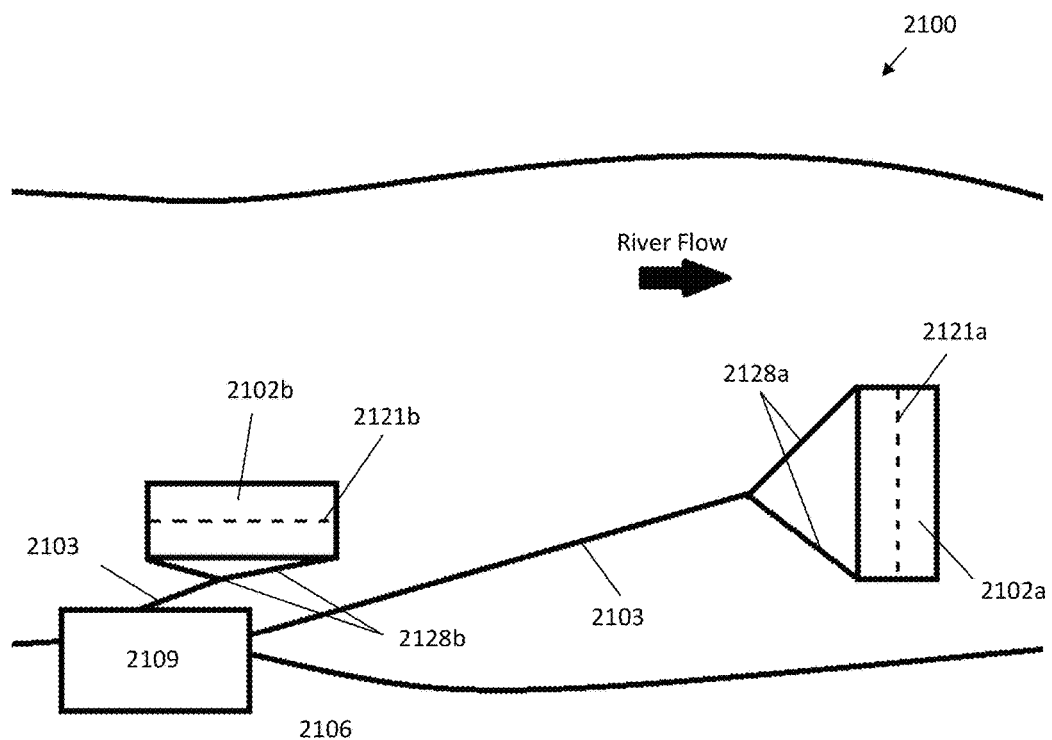
FIG. 21A shows a tidal energy generation system configured to capture river currents.
Figure 21B:
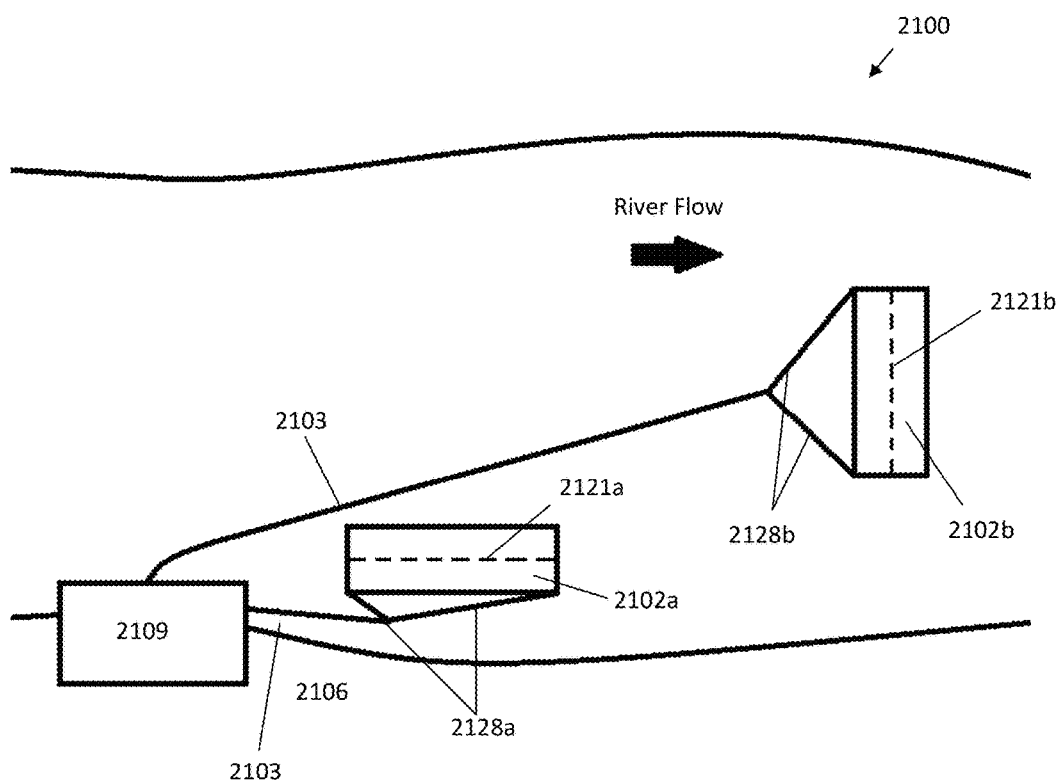
FIG. 21B shows a tidal energy generation system configured to capture river currents.

FIG. 21A shows a tidal energy generation system 2100 that includes a first displacement vessel 2102a at one end of an anchor cable 2103 and control cables 2128a and a second displacement vessel 2102b at the other end of the anchor cable 2103 and control cables 2128b. The displacement vessels 2102a and 2102b may be substantially similar to those displacement vessels described above configured to capture drag (e.g., FIGS. 5A-5C, 6C, 10-14, and 20). In this embodiment (which may be particularly useful where water flows in a single direction, such as in rivers, for example), the first displacement vessel 2102a is released from a directional converter 2109 housed at a stationary location 2106, such as land. The first displacement vessel 2102a travels downstream with the flow of water and generates electricity by rotating a drum that is coupled to an electric generator in the directional converter 2109 as described above. After the first displacement vessel 2102a is released and travels downstream, the second displacement vessel 2102b is released from the directional converter 2109. The second displacement vessel 2102b also travels downstream and generates electricity in the same manner as the first displacement vessel 2102a. However, because the second displacement vessel 2102b is connected to the anchor cable 2103, the second displacement vessel 2102b pulls the first displacement vessel 2102a back to the directional converter 2109 (i.e., upstream) as the second displacement vessel 2102b travels downstream. FIG. 21B shows a snapshot in time where the second displacement vessel 2102b has been released and has "rewound" the first displacement vessel 2102a upstream back to the directional converter 2109. During rewinding of either the first displacement vessel 2102a (or the second displacement vessel 2102b), the displacement vessel being rewound may be rotated such that the drag panel is parallel to the flow of water to reduce drag during the rewinding. This process of letting out one displacement vessel while the other is rewound may be repeated any number of times to generate electricity in any suitable body of water, such as a river. It will be understood that in order to optimally cause a displacement vessel to travel downstream and generate electrical power, the drag panel 2121a of that displacement vessel 2102a is oriented perpendicular to the river flow, while the drag panel 2121b of the other displacement vessel 2102b is oriented parallel to the river flow, as illustrated in FIG. 21A.

Figure 23A:
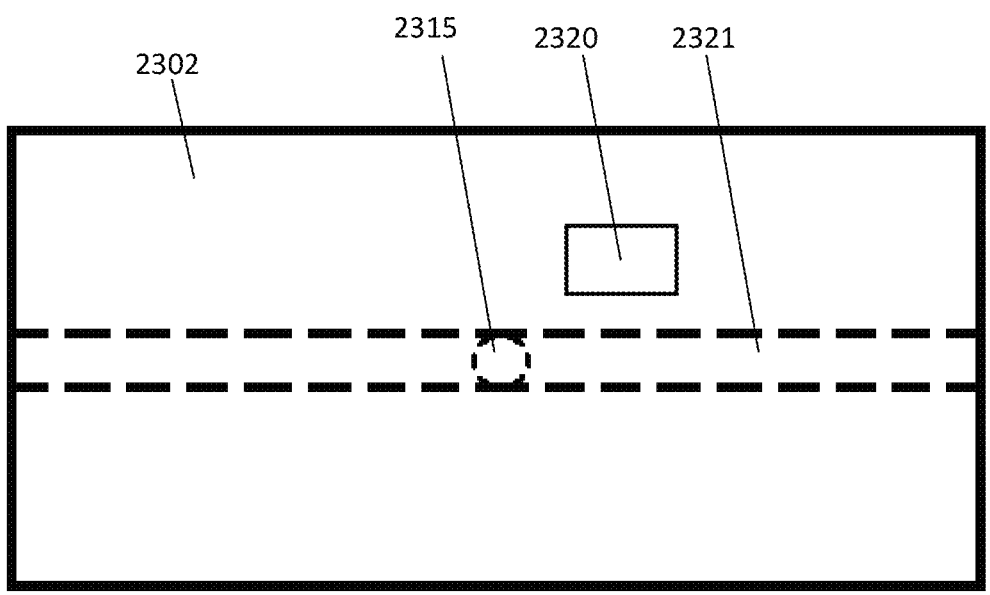
FIG. 23A shows a displacement vessel having a rotatable drag panel.

FIG. 23A shows a displacement vessel 2302 having a rotatable drag panel 2321. In particular, the rotatable drag panel 2321 may be coupled to and freely rotatable about a vertical axis of the displacement vessel 2302 via an axle 2315. The axle 2315 may be coupled to a control mechanism 2320, such as a motor, for example, that may be configured to control the angle of rotation of the drag panel 2321.

Figure 23B:
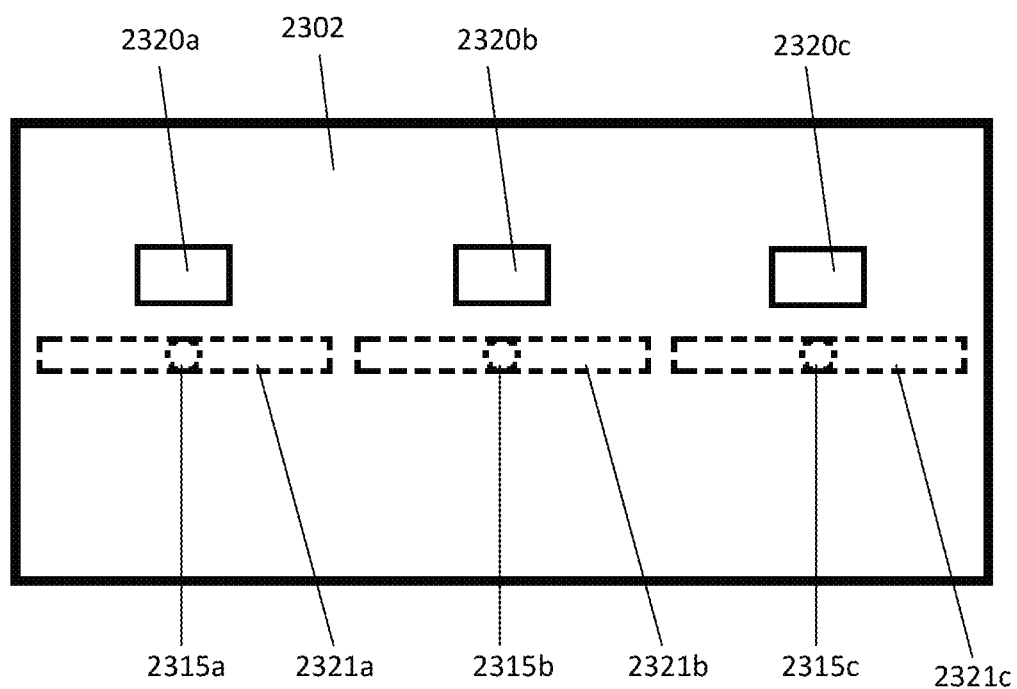
FIG. 23B shows a displacement vessel having multiple rotatable drag panels.

FIG. 23B shows a displacement vessel 2302 having multiple rotatable drag panels 2321a-2321c. In particular, the rotatable drag panels 2321a-2321c may be coupled to and freely rotatable about respective vertical axes of the displacement vessel 2302 via axles 2315a-2315c. Each axle 2315a-2315c may be coupled to a respective control mechanism 2320a-2320c, such as a motor, for example, that may be configured to control the angle of rotation of its respective drag panel 2321a-2321c. These configurations will function to control, or assist in controlling, the orientation of the displacement vessel, whether in conjunction with one or more control cables or independently of control cables.

Drag forces may be calculated for a single displacement vessel 502 from the ebb and flow of the water due to tidal action. As can be appreciated by one of skill in the art, the retractable drag panel as described above may increase the area of the side of the displacement vessel that experiences the drag forces, thus increasing the energy captured. Eqn. 4 shows an equation for calculating force on a side displacement vessel due to drag, where $F_D$ is drag force, $p_f$ is density of the fluid, $C_D$ is coefficient of drag, and A is the underwater area of the displacement vessel, $V_W$ is the velocity of the water, and $V_B$ is the velocity of the displacement vessel.

$$F_D = 0.5 * p_f * C_D * A * (V_W - V_B)^2 \qquad \text{(Eqn. 4)}$$

Eqn. 5 shows an equation for calculating the power (P) of the drag force on the displacement vessel.

$$P = F_D * V_B \qquad \text{(Eqn. 5)}$$

For example, assuming an underwater area of 660 ft² for the displacement vessel, a drag coefficient of 1.2, a density of water at 20° C. of 1.99 slugs/ft³, a water velocity of 12 knots, and a velocity of the displacement vessel of 2 knots, the theoretical power generated by a single displacement vessel would be about 1028 kW. Table 1 shows additional example calculations (using Eqns. 4 and 5) of the theoretical power produced by a displacement vessel utilizing a directional converter having a drag energy converter as the water speed is varied between 4 knots and 12 knots.

TABLE 1

| Velocity of Water $V_W$ | Velocity of Vessel $V_B$ | | Velocity of Vessel Relative to Water V | | Drag D | Power P | | Vessels/ MW |
|---|---|---|---|---|---|---|---|---|
| knots | knots | ft/s | knots | ft/s | lbs | ft-lbs/s | kW | |
| 12 | 2 | 3.4 | 10 | 16.9 | 224489 | 757792 | 1028 | 1.0 |
| 11 | 2 | 3.4 | 9 | 15.2 | 181836 | 613811 | 832 | 1.2 |
| 10 | 2 | 3.4 | 8 | 13.5 | 143673 | 484987 | 658 | 1.5 |
| 9 | 2 | 3.4 | 7 | 11.8 | 110000 | 371318 | 504 | 2.0 |
| 8 | 2 | 3.4 | 6 | 10.1 | 80816 | 272805 | 370 | 2.7 |
| 7 | 2 | 3.4 | 5 | 8.4 | 56122 | 189448 | 257 | 4 |
| 6 | 2 | 3.4 | 4 | 6.8 | 35918 | 121247 | 164 | 6 |
| 5 | 2 | 3.4 | 3 | 5.1 | 20204 | 68201 | 92 | 11 |
| 4 | 2 | 3.4 | 2 | 3.4 | 8980 | 30312 | 41 | 24 |

In another aspect of the present invention, the displacement vessel 502 may include a rolling mechanism (not shown) to make more efficient use of the drag forces on the displacement vessel. The rolling mechanism is located on at least one surface of the displacement vessel, such as a bottom surface of the displacement vessel 502, and may comprise wheels, rollers, or a track. The rolling mechanism may be connected to anchor cable 503, which extends from the rolling mechanism to the anchor 508 attached to the stationary location 506. When the ebb and flow of the tide causes the displacement vessel 502 to drift in a lateral direction relative to the stationary location 506, the anchor cable 503 engages the rolling mechanism, causing it to shift along the surface of the displacement vessel 502. The rolling mechanism may further be connected to an electrical power generator to power the electrical power generator and generate electricity.

In another aspect, a method according to the invention involves converting the lateral motion caused by the ebb and flow of water due to tidal action into energy. The ebb and flow of the water due to tidal action causes a body in the bay/ocean to drift laterally and change its position with respect to a fixed location on the seabed. This change in lateral distance may be converted into rotational energy that is used to energize the electrical power generator to generate electricity. Specifically, the method of generating electricity from drag of the tides comprises the steps of: providing a displacement vessel housing a directional converter coupled to a generator, said displacement vessel being directly above a stationary location; providing an anchor cable having a first end and a second end, whereby said second end is attached to said directional converter and said anchor cable extends to an anchor secured at said stationary location, the anchor cable having a first length between said directional converter and said anchor; causing said displacement vessel to move laterally from said stationary location and activating said directional converter; and energizing said generator.

In another aspect, a method according to the invention involves converting into energy the lateral motion of a displacement vessel using an array of directional converters and generators at a stationary location, such as land or a platform in the ocean. The displacement vessel may be connected to the array of directional converters via a plurality of anchor cables, and the directional converters may be operatively coupled to a plurality of generators. In this embodiment, the number of directional converters outnumber the number of displacement vessel. The ebb and flow of the water due to tidal action causes the displacement vessel to drift laterally and change its position with respect to the stationary location. The change in lateral distance causes the anchor cables to exert forces on a multitude of directional converters, which may be initiate rotational energy that is used to energize the generators. Each of the generators may have a similar or different electrical output rating. Accordingly, the use of one displacement vessel provides power to a multitude of generators.

Each directional converter and/or generator in the array may be controllably operated to produce electricity based on environmental factors such as, for example, the speed of the ocean currents. In one example, when the currents become faster, the method is capable of creating more energy by engaging a larger number of generators, while when the current is slow, fewer generators may be required to capture the kinetic energy of the tides. In another example, when the currents become faster, the method is capable of creating more energy by operating the generators at a faster RPM, while when the current is slow, the generators may be operated at a slower RPM (or disengaged completely). In a typical tidal cycle, the speed of the ocean currents generally resembles a sine wave. As an example, one directional converter and generator may be engaged to produce electrical energy as the tidal cycle begins and the speed of the ocean currents is slow. As the tide changes and the magnitude of the current speed increases, other directional converters and/or generators may be engaged all at once or sequentially to produce electrical energy. As the tide changes and the magnitude of the current speed decreases, one or more directional converters and/or generators may be disengaged. As another example, one or more generators may be operated at a slower RPM, such as one that is a quarter of the maximum rated RPM of the generator, to produce electricity as the tidal cycle begins and the speed of the ocean currents is slow. As the tide changes and the magnitude of the current speed increases, the one or more generators may be operated at a faster RPM to generate more electrical power from the ocean currents.

Manufacture of Displacement Vessels

One of skill in the art will recognize that the displacement vessel may be manufactured having any suitable dimensions or shape to float at the water surface and/or capture the drag cause by the ebb and flow of tidal action. Exemplary, but non-limiting, dimensions for height, width, and length of a displacement vessel or barge may range between 1 m and 100 m, with a volume ranging between 1 $m^3$ and 1,000,000 $m^3$. The displacement vessel may be manufactured using materials such as polymer (e.g., polyethylene terephthalate), concrete, cement, fiberglass, pumice, steel, amorphous metal alloys, or other suitable materials. Furthermore, the displacement vessel may be manufactured using any suitable manufacturing technique such as injection molding, blow molding, casting, joining, or 3D printing. An external surface of the displacement vessel may provide an ecologically-friendly environment for marine life so as to minimally disrupt ocean organisms in their natural habitat. For example, the displacement vessel may include a porous exterior surface structure that is substantially similar or mimics a coral reef structure. A coral reef structure may serve as a home to fish and other ocean-life to integrate the tidal energy conversion assembly into the natural environment. For example, a soft limestone surface such as that described in U.S. Pat. No. 7,513,711 may be provided to allow marine life to attach to the surface, the disclosure of which is incorporated by reference herein. Additionally, a concrete surface mixed with stones or rocks may be used to produce an irregular surface similar to coral reef as described in U.S. Pat. No. 5,215,406, the disclosure of which is incorporated by reference herein. The displacement vessel may be manufactured with a corrugated hull such as described in U.S. Pat. Nos. 1,722,516; 1,808,599; and 3,126,557, the disclosures of which are incorporated by reference herein. A corrugated hull may increase structural strength by providing a greater resistance to buckling forces when compared to a hull that is not corrugated (e.g., a flat sheet).

Furthermore, the displacement vessel may be manufactured in any suitable shape, such as a box, cube, sphere, or cylinder suitable for maintaining buoyancy and/or capturing drag caused by tidal movements. The displacement vessel has a volume, and may optionally be suitable for containing a fluid, e.g., a gas or liquid. Depending on the type of material used, the thickness of the walls of the displacement vessel may be varied as is known in the art to maintain buoyancy and resist water pressure. Generally, the wall thicknesses of the displacement vessel of the present invention may be between 0.1 inch and 6 inches, but one of skill will understand that any suitable thickness may be used to withstand drag forces caused by the ebb and flow of tidal action or hydrostatic pressure.

In one case, the displacement vessel may be constructed underwater. In this case, a wall thickness of the displacement vessel may be substantially thinner than the wall thickness required if the displacement vessel was to be inflated at atmospheric pressure. When inflated under water, the compression pressure on the exterior of the displacement vessel is much greater than the pressure on the exterior of the displacement vessel if it was to be inflated at atmospheric pressure. When underwater, depending on the depth of inflation, the displacement vessel would expand to a smaller volume for an amount of fluid injected into the displacement vessel as compared to expansion at atmospheric pressure. Stresses within the displacement vessel wall due to the inflation would be decreased due to the smaller strains in the displacement vessel wall, thus allowing the walls to be manufactured thinner than the thickness which would be required if the displacement vessel was to be inflated at atmospheric pressure. Nonetheless, the displacement vessel may be inflated with air or another suitable gas or fluid while the displacement vessel is under water. This process may allow for a manufacturer to save on materials by producing displacement vessels using a smaller quantity of raw input materials.

As alternative embodiments to the anchors shown in the figures above, the anchor may be secured into the stationary location, and may be constructed of any suitable shape such that it would not be dislodged from the stationary location upon the movement of the displacement vessel. The anchor may be constructed such that an anchor cable may be threaded therethrough or permit an anchor cable to be fixedly attached thereto. In one non-limiting embodiment, the anchor may have a pointed end that is secured to a stationary location and a looped end such that an anchor cable may be added therethrough. The anchor may be composed of any customary and suitable material, for example, steel, and/or concrete. The anchor may also comprise a pulley mechanism that may be used to reduce or minimize friction between the anchor cable and anchor as the displacement vessel rises and falls with the tide and/or drifts due to the ebb and flow of the water during tidal action. The pulley mechanism may be particularly beneficial when an anchor cable is connected to the displacement vessel, threaded through the anchor, and connected to the directional converter, such as anchor cables 103a-103c because friction between the anchor cable and anchor may cause wear, and ultimately failure, of the anchor and/or cable.

In another aspect of the invention, the tidal energy conversion assembly may comprise a positioning system, for example, a global position system (GPS) receiver, and associated logic modules, such as computer processors, wherein the tidal energy conversion assembly is capable of determining its current position following the drift of the displacement vessel relative to the position of the stationary location to which it is anchored. The positioning system permits the tidal energy conversion assembly to return to a position over the stationary location by winding the anchor cable back into the spindle. The tidal energy conversion assembly may comprise a bidirectional hydraulic winch for winding the anchor cable and returning the displacement vessel back to a position over the stationary location. In another embodiment, the tidal energy conversion assembly may comprise a thruster, such as a pump jet or hydraulic pump, to power the displacement vessel back to a position over the stationary location. In another embodiment, the logic modules of the tidal energy conversion assembly may be programmed with locations where strong currents exist within a body of water. The tidal energy conversion assembly may use this information in addition to location information from the GPS to direct itself, using a thruster and/or rudder mechanism, towards the currents or maintain a specific location within currents to generate electrical power.

In one aspect of the present invention, the electrical power generator may also be coupled to an electricity storage component, e.g., a battery, which may be housed within each displacement vessel or at a central location. The electricity storage component in each displacement vessel may be adapted to store up to any suitable amount of electricity, for example, 1 to 10 MW, so long as the buoyancy of the displacement vessel is maintained. The skilled person understands that the electricity storage component may be increased beyond 10 MW depending on the buoyancy of the displacement vessel. The electricity storage component may be configured to release the stored electrical energy at a desired time. Furthermore, the electricity storage component may be coupled to a motor within the displacement vessel. The motor may be connected to the drive gear and be configured to wind up excess slack in the anchor cable.

In one embodiment, an ocean-going freighter or barge may function as an on-site manufacturing facility for the pumice-based displacement vessels. Pumice from submarine volcanic activity may be collected by the freighter or barge, processed on-site (e.g., 3D printed or molded) to form a hollow displacement vessel, and coated with a polymer so that the pumice does not waterlog. By manufacturing the displacement vessels on-site, shipping costs, set-up time, and set-up expenses may be significantly reduced. Additionally, larger displacement vessels can be manufactured on the freighter since the vessels will not need to be shipped to the operating site.

Variations and modifications will occur to those of skill in the art after reviewing this disclosure. The disclosed features may be implemented, in any combination and subcombination (including multiple dependent combinations and subcombinations), with one or more other features described herein. The various features described or illustrated above, including any components thereof, may be combined or integrated in other systems. Moreover, certain features may be omitted or not implemented. Additionally, in any of the embodiments described above, the displacement vessel, directional converter(s), and generator(s) may rely on both lateral and vertical displacement due to both the rise/fall and ebb/flow of tidal action.

Examples of changes, substitutions, and alterations are ascertainable by one skilled in the art and could be made without departing from the scope of the invention disclosed herein. All references cited herein are incorporated by reference in their entirety and made part of this application.

What is claimed is:

1. A tidal energy conversion assembly comprising:
   a displacement vessel for capturing drag forces caused by water flow occurring in a generally lateral direction, the displacement vessel including a drag panel extending downwardly from the displacement vessel and oriented generally perpendicular to the direction of water flow for driving the displacement vessel in said water flow direction;
   a directional converter operatively coupled to a generator, wherein said directional converter and said generator are positioned at a stationary location; and
   an anchor cable having a first end, a second end, and a length in between the first end and the second end, wherein said first end is connected to the directional converter and said second end is connected to said displacement vessel;
   wherein said displacement vessel is spaced from the stationary location at a distance, and
   wherein said directional converter activates said generator to generate electricity when the displacement vessel changes position relative to said stationary location.

2. The tidal energy conversion assembly of claim 1, further comprising at least two control cables coupled to the drag panel, wherein the control cables are configure to rotate the displacement vessel about a vertical axis.

3. The tidal energy conversion assembly of claim 1, wherein the drag panel is rotatable about an axis.

4. The tidal energy conversion assembly of claim 3, further comprising a control mechanism coupled to the rotatable drag panel.

5. The tidal energy conversion assembly according to claim 1, wherein the anchor cable passes through an anchor member located on a seabed.

6. The tidal energy conversion assembly according to claim 1, wherein the water flow is due to tidal action.

7. The tidal energy conversion assembly according to claim 1, wherein the water flow is due to river flow.

8. A tidal energy conversion assembly comprising:
   a displacement vessel for capturing drag forces caused by water flow occurring in a generally lateral direction, the displacement vessel including a drag panel extending downwardly from the displacement vessel, said drag panel having at least one non-flat surface which is oriented generally perpendicular to the direction of water flow for driving said displacement vessel in said water flow direction;

a directional converter operatively coupled to a generator for converting translational movement of an anchor cable into rotational energy to drive the generator, wherein said directional converter and said generator are positioned at a stationary location; and the anchor cable having a first end, a second end, and a length in between the first end and the second end, wherein said first end is connected to the directional converter and said second end is connected to said displacement vessel;

wherein said displacement vessel is spaced from the stationary location at a distance, and wherein said directional converter activates said generator to generate electricity when the displacement vessel changes position relative to said stationary location.

9. The tidal energy conversion assembly of claim 8, wherein the displacement vessel further comprises a first arm extending from the displacement vessel, wherein the first arm is rotatable about a first hinge coupled to the drag panel and wherein the first arm is coupled to a first control cable extending from the displacement vessel to the anchor cable.

10. The tidal energy conversion assembly of claim 9, wherein the displacement vessel further comprises a second arm extending from the displacement vessel, wherein the second arm is rotatable about a second hinge coupled to the drag panel and wherein the second arm is coupled to a second control cable extending from the displacement vessel to the anchor cable.

11. The tidal energy conversion assembly of claim 10, wherein the first arm and the second arm are disposed on opposite sides of the drag panel and said control cables are coupled to said anchor cable for controlling the orientation of the drag panel.

12. The tidal energy conversion assembly of claim 9, further comprising a stopping mechanism that is configured to limit the range of motion of the first arm.

13. The tidal energy conversion assembly of claim 10, further comprising a third arm extending from the displacement vessel, wherein the third arm is rotatable about a third hinge coupled to the drag panel and wherein the third arm is coupled to a third control cable extending from the displacement vessel to the anchor cable.

14. The tidal energy generation assembly of claim 13, wherein the first arm, second arm, and third arm are coupled to the anchor cable via said first, second and third control cables for controlling the orientation of said drag panel.

15. The tidal energy conversion assembly of claim 8, wherein the non-flat surface is selected from at least one of a group consisting of: a parabolic shape, a concave shape, and a lofted cut.

16. The tidal energy conversion assembly of claim 8, wherein the non-flat surface is a first non-flat surface on a first side of the drag panel and the drag panel further comprises a second non-flat surface on a second side of the drag panel.

17. The tidal energy conversion assembly of claim 8, further comprising a first control cable and a second control cable, wherein the second end of the anchor cable is connected to the displacement vessel via the first control cable and the second control cable.

18. The tidal energy conversion assembly of claim 17, wherein the displacement vessel comprises a floatation device.

19. The tidal energy conversion assembly of claim 18, further comprising a control mechanism housed within the floatation device configured to controllably wind the first control cable and/or the second control cable and effect rotation of the displacement vessel about a vertical axis.

20. The tidal energy conversion assembly of claim 19, wherein the control mechanism comprises a motor, a winch, or a drum and a spring affixed to an axle.

21. The tidal energy conversion assembly according to claim 8, wherein the directional converter comprises a rotating drum operatively coupled to the generator, wherein at least a portion of the anchor cable is wrapped around the drum, and unwinding of the anchor cable causes the drum to rotate and thereby convert lateral movement of the displacement vessel into rotational energy.

22. The tidal energy conversion assembly according to claim 8, wherein the water flow is due to tidal action.

23. The tidal energy conversion assembly according to claim 8, wherein the water flow is due to river flow.

24. A tidal energy conversion assembly comprising:

a displacement vessel for capturing drag forces caused by water flow occurring in a generally lateral direction, the displacement vessel including a drag panel extending downwardly from the displacement vessel and oriented generally perpendicular to the direction of water flow for driving said displacement vessel in said water flow direction;

a directional converter comprising a rotating drum operatively coupled to a generator for converting translational movement of an anchor cable into rotational energy to drive the generator, wherein said directional converter and said generator are positioned at a stationary location; and the anchor cable having a first end, a second end, and a length in between the first end and the second end, wherein said first end is connected to the directional converter and said second end is connected to said displacement vessel, and at least a portion of the of the anchor cable is wrapped around the drum, and unwinding of the anchor cable on the drum causes the drum to rotate and thereby convert lateral movement of the displacement vessel into rotational energy;

wherein said displacement vessel is spaced from the stationary location at a distance, and wherein said directional converter activates said generator to generate electricity when the displacement vessel changes position relative to said stationary location.

\* \* \* \* \*